United States Patent
Cronin

(10) Patent No.: US 9,962,677 B2
(45) Date of Patent: *May 8, 2018

(54) METHODS OF EVOLUTIONARY SYNTHESIS INCLUDING EMBODIED CHEMICAL SYNTHESES

(71) Applicant: The University Court of the University of Glasgow, Glasgow (GB)

(72) Inventor: Leroy Cronin, Glasgow (GB)

(73) Assignee: The University Court of the University of Glasgow (GB)

(*) Notice: Subject to any disclaimer, the term of this patent is extended or adjusted under 35 U.S.C. 154(b) by 0 days. days.

This patent is subject to a terminal disclaimer.

(21) Appl. No.: 15/669,080

(22) Filed: Aug. 4, 2017

(65) Prior Publication Data

US 2017/0354946 A1    Dec. 14, 2017

Related U.S. Application Data

(62) Division of application No. 14/402,943, filed as application No. PCT/GB2013/051390 on May 24, 2013, now Pat. No. 9,757,706.

(30) Foreign Application Priority Data

May 25, 2012    (GB) .................................. 1209239.1

(51) Int. Cl.
  *B01J 19/00* (2006.01)
  *C40B 50/04* (2006.01)
  *C40B 60/08* (2006.01)

(52) U.S. Cl.
  CPC ........... *B01J 19/0046* (2013.01); *C40B 50/04* (2013.01); *C40B 60/08* (2013.01);
  (Continued)

(58) Field of Classification Search
  CPC .......... B01J 19/0046; B01J 2219/00704; B01J 2219/00283; B01J 2219/00286;
  (Continued)

(56) References Cited

U.S. PATENT DOCUMENTS 5,463,564 A    10/1995  Agrafiotis
5,985,356 A *  11/1999  Schultz ................ B01J 19/0046
                                                    257/E43.005

(Continued)

FOREIGN PATENT DOCUMENTS

DE    10246740         4/2004
DE    10246740 A1     4/2004
(Continued)

OTHER PUBLICATIONS

Chinese Office Action for corresponding Chinese Application No. CN 201380039456.2 dated Dec. 3, 2015.
(Continued)

*Primary Examiner* — Shogo Sasaki
(74) *Attorney, Agent, or Firm* — Tarolli, Sundheim, Covell & Tummino LLP

(57) ABSTRACT

The invention provides a method for preparing a compound or a product having one or more characteristics that meet or exceed a user specification, the process comprising the step of selecting a first combination of chemical inputs, optionally together with physical inputs, and supplying those inputs to a reaction space, thereby to generate a first product; analyzing one or more characteristics of the product generated; comparing the one or more characteristics against a user specification; using a genetic algorithm selecting a second combination of chemical inputs, optionally together with physical inputs, wherein the second combination differs from the first combination, and supplying those inputs to the reaction space, thereby to generate a second product; ana- (Continued)

lyzing one or more characteristics of the second product generated; comparing the one or more characteristics generated against the user specification; repeating the selecting and analyzing steps for further individual combinations of chemical and/or physical inputs, to provide an array of products wherein the flow chemistry system operates continuously to provide the first, second and further products, thereby to identify one or more products meeting or exceeding the user specification.

20 Claims, 11 Drawing Sheets

(52) U.S. Cl.
CPC .. *B01J 2219/007* (2013.01); *B01J 2219/0059* (2013.01); *B01J 2219/00283* (2013.01); *B01J 2219/00286* (2013.01); *B01J 2219/00353* (2013.01); *B01J 2219/00479* (2013.01); *B01J 2219/00495* (2013.01); *B01J 2219/00599* (2013.01); *B01J 2219/00689* (2013.01); *B01J 2219/00695* (2013.01); *B01J 2219/00698* (2013.01); *B01J 2219/00702* (2013.01); *B01J 2219/00704* (2013.01); *B01J 2219/00738* (2013.01); *B01J 2219/00747* (2013.01); *B01J 2219/00756* (2013.01)

(58) Field of Classification Search
CPC .... B01J 2219/00353; B01J 2219/00479; B01J 2219/00495; B01J 2219/0059; B01J 2219/00599; B01J 2219/00689; B01J 2219/00695; B01J 2219/00698; B01J 2219/007; C40B 60/08; C40B 50/04
See application file for complete search history.

(56) References Cited

U.S. PATENT DOCUMENTS

| | | | | |
|---|---|---|---|---|
| 6,030,917 | A * | 2/2000 | Weinberg | C07F 15/0066 435/4 |
| 6,806,087 | B2 * | 10/2004 | Kibby | B01J 19/0046 422/129 |
| 2001/0039330 | A1 * | 11/2001 | Schunk | B01J 19/0046 530/350 |
| 2003/0035756 | A1 * | 2/2003 | Nelson | B01J 19/0046 436/37 |
| 2003/0077206 | A1 * | 4/2003 | Metz | B01J 19/0046 422/400 |
| 2004/0132103 | A1 | 7/2004 | Haubs et al. | |
| 2004/0147393 | A1 * | 7/2004 | Hibst | B01J 23/002 502/302 |
| 2005/0170376 | A1 | 8/2005 | Liu et al. | |
| 2006/0177370 | A1 | 8/2006 | Hibst et al. | |
| 2008/0269948 | A1 | 10/2008 | Solomon | |
| 2010/0010946 | A1 | 1/2010 | De Winter et al. | |

FOREIGN PATENT DOCUMENTS

| | | |
|---|---|---|
| WO | 0186591 | 11/2001 |
| WO | 2004010347 | 1/2004 |
| WO | 2006038014 A1 | 4/2006 |

OTHER PUBLICATIONS

Japanese Examination Report dated Mar. 14, 2017 and English translation thereof, for corresponding Application No. 2015-513279.
European Examination Report dated Mar. 14, 2017 for corresponding Application No. 13726818.1.
Muller et al., "Thirty Electrons 'Trapped' in a Spherical Matrix: A Molybdenum Oxide-Based Nanostructured Keplerate Reduced by 36 Electrons" Angew Chem. Int. Ed., vol. 39, No. 9, 2000, pp. 1614-1616.
Muller et al., "Inorganice Chemistry Goes Protein Size: A Mo368 Nono-Hedgehog Initiating Nanochemistry by Symmetry Breaking" Angew Chem. Int. Ed., vol. 41, No. 7, 2002, pp. 1162-1167.
Muller et al., "Drawing Small Cations into Highly Charged Porous Nanocontainers Reveals 'Water' Assembly and Related Interaction Problems" Angew Chem. Int. Ed., vol. 42, 2003, pp. 2085-2090.
Muller et al., "Giant Metal-Oxide-Based Spheres and Their Topology: From Pentagonal Building Blocks to Keplcrates and Unusual Spins Systems" Coordination Chemistry Reviews, vol. 222, 2001, pp. 193-218.
Muller et al., "Soluble Molybdenum Blues—'Des Pudels Kern'" Accounts of Chemical Research, vol. 33, No. 1, 2000, pp. 2-10.
Murrie, "Cobalt(II) Single Molecule Magnets" Chem. Soc. Rev., vol. 39, 2010, pp. 1986-1995.
Nelder et al., "A Simplex Method for Function Minimization" Comput. J., vol. 7, 1965, pp. 308-313.
Parrott et al., "Self-Optimizeing Continuous Reactions in Supercritical Carbon Dioxide" Angew. Chem. Int. Ed., vol. 50, 2011, pp. 3788-3792.
Pham, "Using Fuzzy Logic to Tune an Evolutionary Algorithm for Dynamic Optimization of Chemical Processes" Computers and Chemical Engineering, vol. 37, 2012, pp. 136-142.
Rasheed et al., "Intelligent Microflow: Development of Self-Optimizing Reaction Systems" Angew. Chem. Int. Ed., vol. 50, 2011, pp. 357-358.
Ronen et al., "Optimization of Feeding Profile for a Fed-Batch Bioreactor by an Evolutionary Algrothim" Journal of Biotechnology, vol. 97, 2002, pp. 253-263.
Sans et al., "SE(R)RS Devices Fabricated by a Laser Electrodispersion Method" Analyst. vol. 136, 2011, pp. 3295-3302.
Seeberger, "Scavengers in Full Flow" Nature Chemistry, vol. 1, 2009, pp. 258-260.
Shishido et al., "The pH Dependent Nuclearity Variation of {Mo154-x}-type Polyoxomolybdates and Tectonic Effect on Their Aggreations" J. Am. Chem. Soc., vol. 130, 2008, pp. 10588-10595.
Small et al., "Efficient Discovery of Anti-Inflammatory Small-Molecule Combinations Using Evolutionary Computing" Nature Chemical Biology, vol. 7, 2011, pp. 902-908.
Teixido et al., "Evolutionary Combinatorial Chemistry, a Novel Tool for SAR Studies on Peptide Transport Across the Blood-Brain Barrier, Part 2. Design, Synthesis and Evaluation of a First Generation of Peptides" Journal of Peptide Sciences, vol. 11, 2005, pp. 769-804.
Toma et al., "Efficient Water Oxidation at Carbon Nanotube-Polyoxometalate Electrocatalytic Interfaces" Nature Chemistry, vol. 2, 2010, pp. 826-831.
Urkawa et al., "On-Chip Raman Analysis of Heterogeneous Catalytic Reaction in Supercritical Co2: Phase Behaviour Monitoring and Activity Profiling" Analyst, vol. 133, 2008, pp. 1352-1354.
Valero et al., "DoE Framework for Catalyst Development Based on Soft Computing Techniques" Computers and Chemical Engineering, vol. 33, 2009, pp. 225-238.
Wang et al., "Molecular Magnetic Materials Based on 4d and 5d Transition Metals" Chem. Soc. Rev., vol. 40, 2011, pp. 3213-3238.
Weber, "Evolutionary Combinatorial Chemistry: Application of Genetic Algorithms" DDT, vol. 3, No. 8, 1998, pp. 379-385.
Weber, "Multi-Component Reactions and Evolutionary Chemistry" DDT, vol. 7, No. 2, 2002, pp. 143-147.
Weber et al., "Optimization of the Biological Activity of Combinatorial Compound Libraries by a Genetic Algorithm" Angew. Chem. Int. Ed. Engl., vol. 34, No. 20, 1995, pp. 2280-2282.
Wegner et al., "Ten Key Issues in Modern Flow Chemistry" Chem. Commun., vol. 47, 2011, pp. 4583-4592.
Yu et al., "Introduction to Evolutionary Algorithms", Springer-Verlag, London, 2010.
Zheng et al., "Co-Ln Mixed-Metal Phosphonate Grids and Cages as Molecular Magnetic Refrigerants" J. Am. Chem. Soc., vol. 134, 2012, pp. 1057-1065.

(56) References Cited

OTHER PUBLICATIONS

Zhu et al., "Genetic Algorithm for Innovative Device Designs in High-Effeciency III-V Nitride Light-Emitting Diodes" Applied Physics Express, vol. 5, 2012, pp. 012102-1-012102-3.
GB Search Report to GB11013600, dated Nov. 9, 2012.
ISR for PCT/GB2013/051390, dated Aug. 5, 2013.
Abou-Hassan et al. "Microfluids in Inorganic Chemistry" Angew. Chem. Int. Ed. vol. 49, 2010, pp. 6268-6286.
Banzhaf et al., "From Artificial Evolution to Computational Evolution: A Research Agenda" Nature Reviews Genetics, vol. 7, 2006, pp. 729-735.
Bogani et al., "Molecular Spintronics Using Single-Molecule Magnets" Nature Materials, vol. 7, 2008, pp. 179-186.
Boldini et al., "Polyoxometalates: Powerful Catalysts for Atom-Efficient Cyclopropanations" Adv. Synth. Catal., vol. 352, 2010, pp. 2365-2370.
Booker et al., "Classifer Systems and Genetic Algorithms" Artificial Intelligence, 1969, pp. 235-262.
Brixner et al., "Feedback-Controlled Optimization of Amplified Femtosecond Laser Pulses" Appl. Phys. B., vol. 68, 1999, pp. 281-284.
Chen et al., "From Prelife to Life: How Chemical Kinetics Become Evolutionary Dynamics" Accounts of Chemical Research, 2011, 9 pages.
Chu et al., "A Knowledge-Based Approach for Screening Chemical Structures within de novo Molecular Evolution" J. Chemometrics, vol. 24, 2010, pp. 399-407.
Coello et al., "Evolutionary Algorithms for Solving Multi-Objective Problems" Springer Science+Business Media, LLC, Ed. Goldberg, 2007.
Corma et al., "Heterogeneous Combinatorial Catalysis Applied to Oil Refining, Petrochemistry and Fine Chemistry" Catalysis Today, 107-108, 2005, pp. 3-11.
Corma et al., "Application of Artificial Neural Networks to Combinatorial Catalysis: Modeling and Predicting ODHE Catalysts" Chemphyschem, vol. 3, 2002, pp. 939-945.
Corma et al., "Optimization of Olefin Epoxidation Catalysts with the Application of High-Throughput and Genetic Algorithms Assisted by Artificial Neural Networks (Softcomputing Techniques)" Journal of Catalysis, vol. 229, 2005, pp. 513-524.
Eliseev et al., "Use of Molecular Recognition to Drive Chemical Evolution. 1. Controlling the Composition of an Equilibrating Mixture of Simple Arginine Receptors" J. Am Chem Soc., vol. 119, 1997, pp. 1147-1148.
Evangelisti et al., "Recipes for Enhanced Molecular Cooling" Dalton Trans., vol. 39, 2010, pp. 4672-4676.
Evangelisti et al., "Magnetothermal Properties of Molecule-Based Materials" J. Mater. Chem., vol. 16, 2006, pp. 2534-2549.
Furtuna et al., "An Elitist Non-Dominated Sorting Genetic Algorithm Enhanced with a Neural Network Applied to the Multi-Objective Optimization of a Polysiloxane Synthesis Process" Engineering Applications of Artificial Intelligence, vol. 24, 2011, pp. 772-785.
Gobin et al., "Multi-Objective. Optimization in Combinatorial Chemistry Applied to the Selective Catalytic Reduction of NO with C3H6" Journal of Catalysis, vol. 252, 2007, pp. 205-214.
Miras et al., "Solutin-Phase Monitoring of the Structural Evolution of a Molybdenum Blue Nanoring" Journal of the American Chemical Society, vol. 134, 2012-3816-3824.
Haskenknopf, "Polyoxometalates: Introduction to a Class of Inorganic Compounds and Their Biomedical Applications" Frontiers in Bioscience, vol. 10, 2005, pp. 275-287.
Henry et al., "Chameleon Water: Assemblies Confined in Nanocapsules" Journal of Molecular Liquids, vol. 118, 2005, pp. 155-162.
Hibbert "Genetic Algorithms in Chemistry" Chemometrics and Intelligent Laboratory Systems, vol. 19, 1993, pp. 277-293.
Holena "Present Trends in the Application of Genetic Algorithms to Heterogeneous Catalysis" High-Throughput Screening in Chemical Catalysis, 2004 WILEY-VCH, pp. 153-173.
Holena et al., "Generator Approach to Evolutionary Optimization of Catalysts and its Integration with Surrogate Modeling" Catalysis Today, vol. 159, 2011, pp. 84-95.
Inglis et al., "Enhancing SMM Properties via Axial Distortion of MnIII3 Clusters" Chem. Commun., 2008, pp. 5924-2926.
Inglis et al., "Twisted Molecular Magnets" Chem. Comm. vol. 48, 2012, pp. 181-190.
Inglis et al., "Attempting to Understand (and Control) the Relationship Between Structure and Magnetism in an extended Family of Mn6 Single-Molecule Magnets" Dalton Trans. 2009, pp. 3403-3412.
Inglis et al., "Twisting, Bending, Stretching: Strategies for Making Ferromagnetic [MnIII3] Triangles" Dalton Trans., 2009, ages 9157-9168.
Karotsis et al., "[MnIII4LnIII4] Calix[4]arene Clusters an Enhanced Magnetic Coolers and Molecular Magnets" J. Am Chem. Soc., vol. 132, 2010, pp. 12983-12990.
Kheawhom et al., "Efficient Constraint Handling Scheme for Differential Evolutionary Algorithm in Solving Chemical Engineering Optimization Problem" Journal of Industrial and Engineering Chemistry, vol. 16, 2010, pp. 620-628.
Kozoni et al., "The First Amino Acid Manganese Cluster: a [MnIV2MnIII3] DL-Valine-Cage" Dalton Trans., 2009, pp. 9117-9119.
Krebs et al., "Structure and Bonding in the High Molecular Weight Isopolymolybdate Ion, [Mo36O112(H2O)16]18—The Crystal Structure of Na8[Mo36O112(H2O)16], 58H2O" Eur. J. Solid State Inorg. Chem., vol. 28, 1991, pp. 883-903.
Kreutz et al., "Evolution of Catalysts Directed by Genetic Algorithms in a Plug-Based Microfluidic Device Tested with Oxidation of Methane by Oxygen" J. Am Chem. Soc., vol. 132, 2010, pp. 3128-3132.
Kuo et al., "A Hybrid of Genetic Algorithm and Particle Swarm Optimization for Solving Bi-Level Linear Programming Problem—A case Study on Supply Chain Model" Applied Mathematical Modeling, vol. 35, 2011, pp. 3905-3917.
Lange et al., "A Breakthrough Method for the Accurate Addition of Reagents in Multi-Step Segmented Flow Processing" Chemical Science, 2011, pp. 765-769.
Lehar et al., "Combination Chemical Genetics" Nature Chemical Biology, vol. 4, No. 11, 2008, pp. 674-681.
Lehmann et al., "Spin Qubits with Electrically Gated Polyoxometalate Molecules" Nature Nanotechnology, vol. 2, 2007, pp. 312-317.
Leuenberger et al., "Quantum Computing in Molecular Magnets" Nature, vol. 410, 2001, pp. 789-793.
Long et al., "Polyoxometalate Clusters, Nanostructures and Materials: From Self Assembly to Designer Materials and Devices" Chem. Soc. Rev., vol. 36, 2007, pp. 105-121.
Long et al., "Poloxometalates: Building Blocks for Functional Nanoscale Systems" Angew. Chem. Int. Ed., vol. 49, 2010, pp. 1736-1758.
Ludlow et al., "Systems Chemistry" Chem. Soc. Rev., vol. 37, 2008, pp. 101-108.
Maier et al., "Combinatorial and High-Throughput Materials Science" Angew. Chem. Int. Ed., vol. 46, 2007, pp. 6016-6067.
McMullen et al., "An Integrated Microreactor System for Self-Optimization of a Heck Reaction: From Micro-to Mesoscale Flow Systems" Angew. Chem. Int. Ed., vol. 49, 2010, pp. 7076-7080.
McMullen et al., "An Integrated Microreactor System for Self-Optimization of a Heck Reaction: From Micro-to Mesoscale Flow Systems" Angew. Chem. Int. Ed., vol. 122, 2010, pp. 7230-7234.
Miras et al., "Unveiling the Transient Template in the Self-Assembly of a Molecular Oxide Nanowheel" Science, vol. 327, 2010, pp. 72-74.
Moore, et al, "Universal Characteristics of Chemical Synthesis and Property Optimization" Chem. Sci., vol. 2, 2011, pp. 417-414.
Moushi et al., "Inducing Single-Molecule Magnetism in a Family of Loop-of-Loops Aggregates: Hetermetallic Mn40Na4 Clusters and the Homometallic Mn44 Analogue" J. Am. Chem. Soc., vol. 132, 2010, pp. 16146-16155.
Muller et al., "Rapid and Simple Isolation of the Crystalline Molybdenum-Blue Compounds with Discrete and Linked

(56) References Cited

OTHER PUBLICATIONS

Nanosized Ring-Shaped Anions: Na15[MoVII26O462H14(H2O)-70]0.5 [MoVI124MoV28O457H14(H2O)68]0.5.ca.400H2O and Na22[MoVI118MoV28O422H14(H2O)58]28.ca.250H2O"  Z. Anorg. Alleg. Chem., vol. 625, 1999, pp. 187-1192.

Muller et al., [Mo154(NO)14O420(OH)28(H2O)79](25 ±5)—: A Water-Soluble Big Wheel with More than 700 Atoms and a Relative Molecular Mass of About 24000° Angew Chem. Int. Ed. Engl., vol. 34, No. 19, 1995 pp. 2122-2124.

Muller et al., "Molybdenum Blue: A 200 Year Old Mystery Unveiled" Angew Chem. Int. Ed. Eng., vol. 35, No. 11, 1996, pp. 1206-1208.

Muller et al., "Organizational Forms of Matter: An Inorganic Super Fullerene and Kepierate Based on Molybdenum Oxide" Angew Chem. Int. Ed., vol. 37, No. 24, 1998, pp. 3359-3363.

\* cited by examiner

Figure 2

| Ratios of Water Flow Rates to Reagent Flow Rates | | Ratios of Acid Flow Rates to Molybdenum Flow Rates | | | | | | | | | |
|---|---|---|---|---|---|---|---|---|---|---|---|
| | | 0:10 | 1:9 | 2:8 | 3:7 | 4:6 | 5:5 | 6:4 | 7:3 | 8:2 | 9:1 |
| | | A | B | C | D | E | F | G | H | I | J |
| 8:2 | a | | | | | | | | | | |
| 6:4 | b | | | | | | | | | | |
| 4:6 | c | | | | | | | | | | |
| 2:8 | d | | | | | | | | | | |
| 0:10 | e | | | | | | | | | | |

METHODS OF EVOLUTIONARY SYNTHESIS INCLUDING EMBODIED CHEMICAL SYNTHESES

This application is a divisional of U.S. patent application Ser. No. 14/402,943, filed on Nov. 21, 2014, now U.S. Pat. No. 9,757,706, which is the U.S. National phase entry of PCT/GB2013/051390, with an international filing date of May 24, 2013, which claims priority from GB Application Serial No. 1209239.1, filed May 25, 2012, all of which are incorporated by reference herein.

FIELD OF THE INVENTION

The present invention provides a process for the generation of a product having a series of properties desired by a user. The invention provides an investigative tool to allow the user to explore many possible product forms, and to identify the product having a desirable combination of chemical and physical features. The exploration of the product structural and compositional space is guided by automated evolutionary processing.

BACKGROUND TO THE INVENTION

Present discovery strategies for the identification of useful products are intrinsically time consuming processes. Whilst predictive in silico screening can provide some guide as to the products that are likely to be useful, such methods have not yet fully developed. It is still necessary to prepare a range of products in order to determine which products actually have the appropriate characteristics to make them useful. Thus, typical discovery processes invariably require the preparation of many products, each of which is individually analysed and tested.

The traditional discovery process will generally take the form of a series of batch processes. An initial group of products will be prepared, and a subset of products will be identified having promising characteristics. These products will inform the preparation of a second group of products, with the expectation that further promising products will be identified, some of which will be superior to the originally identified subset of products. Further sets of products may be prepared, and each subsequent preparation is intended to identify products of superior activity. Once a product is identified as having the right combination of features for use, a subsequent scale up synthesis is undertaken to provide useful quantities of material, for example for further testing or for use. Discovery processes that look to identify improved methods of synthesis are conducted in a similar manner.

It has long been recognised that the discovery process requires improvement. One of the more productive areas of development in recent years has been the way in which the data obtained from the initial lead set of products is used to inform the preparation of later products. Here, researchers are making increasing use of sophisticated data mining and management techniques in order to develop an understanding of product features that are likely to contribute to a desirable activity. Thus, there is a recognition that discovery techniques require robust procedures to administer and schedule the large amounts of experimental data that are generated. Moreover it is necessary to comprehend and model this organized data, and provide a global search strategy for identifying potentially useful products (see Corma et al. *Chem. Phys. Com.* 2002, 3, 939-945).

Genetic algorithm search methods are now increasingly used as a tool to direct the production of useful products. The genetic algorithm is inspired by the natural evolutionary concepts of selection and reproduction. In a discovery process the user sets a specific set of performance criteria for the idealised product he wishes to prepare. A series of test products is prepared and analysed, and each product is assigned a fitness value against the performance criteria. The value forms the basis for the natural selection made by the algorithm: products having a particular fitness value will be selected, whilst others will be discarded. Reproduction is accomplished by cloning, crossover, and mutation of product inputs in order to generate new and unexpected solutions that meet or exceed the performance criteria set by the user. The genetic algorithm approach to product design has been shown to work well in complex and coupled multivariable systems (see Zhu et al. *Appl. Phys. Express* 2012, 5, 012102). These methods attempt to balance speed, robustness and versatility in discovery processes (see Pham *Comp. Chem. Eng.* 2012, 37, 136-142). The use and refinement of genetic algorithms in chemical and engineering processes is now well established.

The use of genetic algorithms to inform future product preparations has undoubtedly assisted the discovery process. However, problems still remain. It is still the case that the researcher uses a batch synthesis approach to develop his product. Here, the researcher may prepare a training set of products, which are subsequently suitably analysed and tested. From this set, the genetic algorithm is provided with the information necessary for the subsequent batch preparation. A typical batch process employing a genetic algorithm is described by Zhu et al. in their preparation of a high-efficiency III-V nitride light-emitting diode (Zhu et al. *Appl. Phys. Express* 2012, 5, 012102). Another example includes the work of Kreutz et al. on the development of methane oxidation catalysts (Kreutz et al. *J. Am. Chem. Soc.* 2010, 132, 3128-3132). Fundamentally, the batch preparation is still cumbersome and time consuming, even though it is intelligently directed.

Moreover, genetic algorithms are usually employed in optimisation processes, which may be regarded as a form of a limited discovery process. An optimisation procedure takes an original lead product and attempts to improve its properties. The process of optimisation is usually a conservative one: the new products that are produced share many of the structural and compositional parts of the original lead. The optimisation processes is rarely permitted to explore product space that is structurally and compositionally diverse.

There remains a need to further rationalise the discovery process, particularly to increase throughput, and to decrease the time from the generation of the first test product through to the generation of a lead product in useful quantities. There is also a need to provide discovery processes that allow the user to explore a true breadth and depth of product.

SUMMARY OF THE INVENTION

The present invention generally provides a process for generating a product having characteristics that meet a user's specification. In particular, the process of the invention allows the development of inorganic structures through an inorganic evolutionary process. Here, the components driving the evolution are inorganic materials, however co-evolution with organic or biological materials is also possible.

The process of the invention is an exploratory system that allows the user to prepare many different products. The preparation of a diverse product range allows the process control system to generate an understanding of which inputs may provide desirable traits and which do not. In this way, the system is capable of finding products having the physical and chemical characteristics that are set by the user in the specification. The exploration and generation of new products for use may be referred to as an evolution.

The invention allows evolved chemical reactions to be investigated. This is broadly achieved using three elements: (i) a chemical process system including a sensor array, (ii) a feedback simplex/GA-managed control system, and (iii) chemical building blocks that can be explored over a large parameter space. By combining these three elements the system can utilise feedback and selection mechanisms based on spectroscopic properties of the system, molecules or materials that are evolved. The system identifies a route to explore and ultimately climb the fitness landscape and thereby discovering the best solution for the fitness function. Advantageously the optimal molecule or material is prepared by the system meaning that the discovery stage does not need to be translated from a computer model to the laboratory as a separate step.

This is of benefit because the system will (i) investigate only those compounds that can actually be synthesised; (ii) provide real-time screening of a structure or property within a physical system; and (iii) does not reject complex molecules having properties that cannot be easily coded or predicted.

The elements of the platform are a population of building blocks (chemical inputs), a reactor/reaction to connect the blocks, optionally in the presence of physical inputs, a kinetic system to move the blocks, a sensor system and interrogator to detect a property of the connected blocks, and a decision system, such as a genetic algorithm to control the reaction of building blocks on the basis of sensor feedback.

The platform may be used in a discovery process which, in real time, embodies the evolutionary process by coupling computational (in silico) with physical (in materio) events and processing. This allows chemical exploration to begin from a random start point and to move through a combinatorial parameter space using continuous evaluation of the outputs from the reactor system.

In a general aspect, the present invention provides a process that utilises flow chemistry techniques for the generation of products. The flow chemistry methods are used in combination with analytical methodologies and computer controlled feedback steps to provide a complete and integrated discovery system. The process allows a continuous production of product material to rapidly generate product collections. The system is highly adaptable, and may be used to generate a wide range of product forms. The flow system also permits the generation of sizable quantities of product, and may be used to scale up the production of desirable product forms as they are identified. The integration of a flow chemistry system together with an analytical system and a control system in a self-contained discovery set up is believed to provide a useful technical contribution over the art.

Accordingly, in a first aspect of the invention there is provided a process for the generation of a product having one or more characteristics that meet or exceed a user specification, the process comprising the steps of:

(i) providing:
  (A) a user specification, which is one or more characteristics that is desirable for a product to have;
  (B) a flow chemistry system, wherein the system comprises a series of chemical inputs in fluid communication with a reaction space, and the system optionally comprises one or more physical inputs, wherein the physical inputs are deliverable to one or more of the chemical inputs and/or are deliverable to the reaction space;
  (C) an analytical system adapted for interaction with the flow chemistry system, wherein the analytical system is for the measurement of one or more characteristics of a product;
  (D) a control system adapted for controlling the delivery of chemical and physical inputs to the reaction space, and for comparing the one or more characteristics measured by the analytical system against the user specification, wherein the control system is provided with a genetic algorithm for selecting combinations of chemical and physical inputs;
(ii) selecting a first combination of chemical inputs, optionally together with physical inputs, and supplying those inputs to the reaction space, thereby to generate a first product;
(iii) analysing one or more characteristics of the product generated;
(iv) comparing the one or more characteristics against the user specification;
(v) selecting a second combination of chemical inputs, optionally together with physical inputs, wherein the second combination differs from the first combination, and supplying those inputs to the reaction space, thereby to generate a second product;
(vi) analysing one or more characteristics of the second product generated;
(vii) comparing the one or more characteristics generated against the user specification;
(viii) repeating steps (v) to (vii) for further individual combinations of chemical and/or physical inputs, to provide an array of products,
thereby to identify one or more products meeting or exceeding the user specification.

The first combination is a subset of all the available physical and chemical inputs. The first combination may be regarded as the initial input population. Similarly, the second and subsequent combinations are subsets of all the available physical and chemical inputs, and each combination is unique.

The flow chemistry system operates continuously to provide the first, second and further products.

The selection of the second combination in step (v), and further combinations in step (viii), is a selection made by the control system in response to the characteristics of earlier products, and their fitness against the user specification. The control system, over a series of product preparations, will explore the product space through the addition, replacement or removal of chemical and physical inputs, either randomly or by design. Random changes may be useful in exploring alternative product space. Designed changes are those changes that are made where the control system identifies a correlation between an input or a combination of inputs and a desirable product characteristic. Changes may be made to bring together inputs that are recognised as resulting in useful products. Step (v) therefore permits the genetic algorithm to select a second combination of chemical inputs.

Step (v) may only be undertaken once the preceding steps (iii) and (iv) are complete. Thus, the step of selecting a second combination of chemical inputs, optionally together with physical inputs, is directly responsive to the product prepared in step (ii). Similarly, step (viii) may only be undertaken once the preceding steps (vi) and (vii) are complete. Thus, the step of selecting a subsequent, such as third or fourth, combination of chemical inputs, optionally together with physical inputs, is directly responsive to the product prepared in step (v). As noted above, throughout this sequence, the flow system operates continuously.

The first combination of chemical and physical inputs may be a random selection from the series of chemical and physical inputs. Thus, the user allows the system to select a starting point from which to explore the available product space. Thus, the user does not bias the process by applying his prejudices to the system.

The product of the first combination of chemical and physical inputs is assessed against the user specification. If the first product meets or exceeds a minimum threshold, the system may select, using the genetic algorithm, a second combination of chemical and physical inputs. However, where the first product does not meet a minimum threshold, the system may select, such as randomly select, a further combination that is randomly removed from the first combination of chemical and physical inputs.

The second and subsequent products may differ from the first product and from each other in one or more of the measured characteristics. These differences may be substantial or they may be marginal.

The composition or structure of the products may be different. It is preferred that the process permits the production of products having large differences in structure or composition. The process should also permit the preparation of products having subtle differences in structure or composition. By allowing the formation of subtly and widely different products in one process, the process attempts to maximise the chances of finding a product that will meet the user specification.

The process may further comprise the step of (ix) producing further quantities of a product meeting or exceeding the user specification. By providing this step (ix) the user thereby provides a scale up synthesis of the desirable product. Thus, the process of the invention may be used to identify and provide meaningful quantities of material, for use or for further confirmatory analysis.

The present invention also provides the products obtained or obtainable from the processes of the invention.

In a further aspect of the invention there is provided a process for the generation of a method for producing a product, the method having one or more parameters that meet or exceed a user specification, the process comprising the steps of:
(i) providing:
  (A) a user specification, which is one or more characteristics that is desirable for the method to have;
  (B) a flow chemistry system, wherein the system comprises a series of chemical inputs in fluid communication with a reaction space, and the system optionally comprises one or more physical inputs, wherein the physical inputs are deliverable to one or more of the chemical inputs and/or are deliverable to the reaction space;
  (C) an analytical system adapted for interaction with the flow chemistry system, wherein the analytical system is for the measurement of one or more characteristics of the method or the product;
  (D) a control system adapted for controlling the delivery of chemical and physical inputs to the reaction space, and for comparing the one or more characteristics measured by the analytical system against the user specification, wherein the control system is provided with a genetic algorithm for selecting combinations of chemical and physical inputs;
(ii) selecting a first combination of chemical and physical inputs and supplying those inputs to the reaction space, thereby to generate a first method producing a product;
(iii) analysing one or more characteristics of the method and/or the product generated;
(iv) comparing the one or more characteristics against the user specification;
(v) selecting a second combination of chemical and/or physical inputs, wherein the second combination differs from the first combination, and supplying those inputs to the reaction space, thereby to generate a method producing a product;
(vi) analysing one or more characteristics of the method and/or the product generated;
(ix) comparing the one or more characteristics generated against the user specification;
(x) optionally repeating steps (v) to (vii) for further individual combinations of chemical and/or physical inputs.

The invention also provides apparatus for use in the methods of the invention. In one aspect the apparatus comprises a flow chemistry system, an analytical system and a control system, as described in detail herein.

In a further aspect there is provided a control system which is suitably programmed to control the steps of the process of the invention.

DESCRIPTION OF THE FIGURES

FIG. 2 is a table depicting relative flow rates for the reagents used in the preparation of nanoscale polyoxomolybdates in the system shown schematically in FIG. 1. Moving down rows a-e the concentration of reagent increases as the flow rate of the water input is decreased relative to the other reagents. The increased concentration of reagent is shown as an increase in shading down the columns. Moving across columns A-J the ratio of the acid to the molybdate reagent increases. The increased concentration of acid is shown as a colour gradient across the columns. It can be seen that changes in the flow rates of a few reagents provide as many as 50 reaction products, where each product is prepared from a reaction mixture having a distinct combination of reagent concentration and pH.

DETAILED DESCRIPTION OF THE INVENTION

Figure 1:
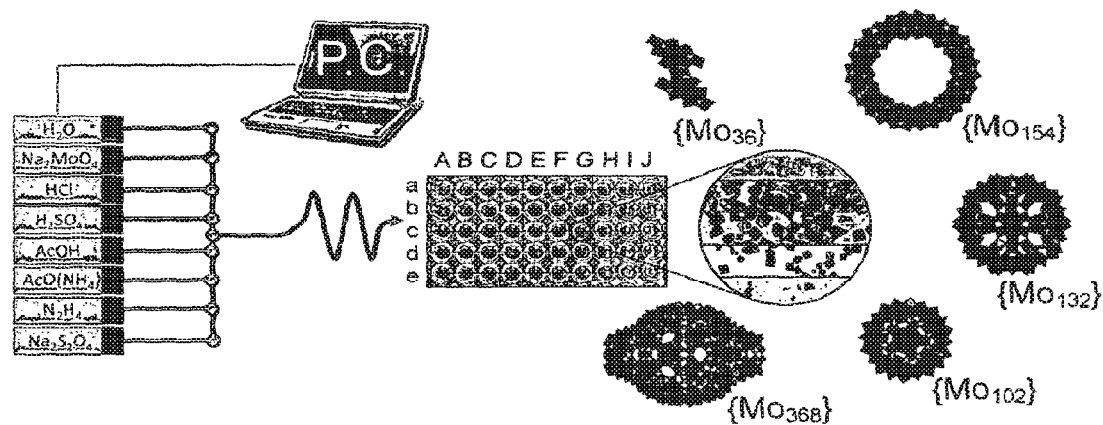
FIG. 1 is a schematic of a flow chemistry system for use in the process of the invention. The system illustrated is for use in the preparation of crystalline polyoxomolybdate compounds. The system is shown with a series of chemical inputs in fluid communication and under the control of a computer control system (left). The products from individual combinations of chemical inputs are collected separately in a 5×10 grid of test tubes (middle). A sample crystal product is shown for one of the nanoscale polyoxomolybdates obtained (middle). The polyoxomolybdates structures identified include {Mo36}, {Mo154}, {Mo132}, {Mo102} and {Mo368} (right). The clusters are shown roughly to scale. The {Mo36} and {Mo368} products are 1.9 and 5.7 nm in diameter respectively. The analytical system is not shown.

The inventor has developed a process for preparing compounds, materials, and compositions ("products") that have a desired collection of chemical and/or physical properties. This desired collection of properties may be regarded as a specification which is set by a user prior to the initiation of a discovery process. Typically the process of the invention involves a series of trial product preparations from which an automated analytical and control system may gather information for the preparation of further, ideally improved products. Thus, the preparation of trial products having properties that fulfill some portion of the specification may be used to inform the preparation of later compounds.

The exploration of the product structural and compositional space is guided by automated evolutionary processing which is physically implemented and, in some respects, ultimately guided by the chemistry of the system as the algorithm. In this way, the processes described herein use chemical genetic algorithms that are directly informed, or guided, by the products produced. Such guidance is based on the reality of the products actually produced and is not completely embodied in the computer software package employed.

The process of the invention allows a user to provide a chemically-encoded fitness function to an autonomous chemical evolutionary system, such as an inorganics system, which utilises a physical phase space.

The process of the invention may be referred to as evolutionary for the way that a product is developed through changes to the preparation methods, which includes changes to the chemical and physical inputs, and the resultant changes to the products produced. The term evolution also indicates that the synthesis is driven to produce a product having altered or improved properties. In the present invention, the term evolution may also be used to refer to the development of the preparation techniques themselves, which may provide a particular product in a more efficient way. The evolution of a process may also refer to adaptations that lead to new materials. Importantly, the process of the present invention permits a user to access these new materials without the need for direct user control or intervention. Instead, the process is controlled by a control system which independently explores the product space for a product that meets the user specification.

The process of the invention is intended to be driven by the specification desired by the user. Thus, the process may be blind to the structural groups and components that are present in the products and formulations. As such, the process may be run without any user preconceptions about what sort of products are likely to meet the specification. Ultimately the user desires having a product that will fulfill a function, and the functional features of the product are therefore of importance.

In this way, it is recognised that traditional methods of preparation may be influenced by the prejudices of the user, who may discard certain starting materials, certain methods and certain postulated products on the basis that (traditionally) such materials, methods and products are considered poorly reactive, low yielding or variable, or inactive, for example. Such considerations, whilst they may be valid, may not necessarily be universal. Thus, it may be beneficial to explore areas that are normally considered unprofitable, in order to fully explore the full product space.

In discovery programs the term serendipitous may be used to refer to the identification of products that have surprising or unexpected properties. However, these surprising or unexpected properties are often only so because of a user's lack of understanding of the chemistries and physics involved in the preparation and use of a product. The present invention therefore looks to increase the number of "serendipitous" discoveries by exploring a broad product space.

In many optimisation methodologies there is the risk that a product that is found to meet a user specification is merely a local maximum in the broader product space. In this scenario, there is a risk that other products meeting the specification go unrecognised. Thus, the opportunity to identity other products, which may have superior characteristics which exceed the specification, or are more readily prepared, may be lost.

The present invention provides the user with the opportunity to explore a broad product space. The use of flow chemistry techniques, as described herein, allows a user to quickly change one, two, three or more flow inputs simultaneously, sequentially and randomly, thereby providing the possibility of making small and large changes to the product produced. The effect of making such changes is to allow the system to jump to areas of the product map that are separate from the area previously explored. New areas of the map are therefore opened up for exploration, and the chances of identifying other maxima on the map are increased.

Suitably controlled flow methods allow the products produced to be analysed and distributed and separated into collection vessels (e.g. for later use or further analysis). Thus, product collection is not hindered, and large collections of products may be prepared.

The use of a flow chemistry system allows a user to provide multiple inputs to a reaction space, thereby allowing a large number of different reaction procedures to be explored. As part of the present invention, it is necessary to analyse the output from the reaction space in order to determine the outcome of a particular pathway. This analysis is a part of the procedure that looks to identify products and methods that meet the user specification. The information gathered in the analysis is also used as feedback, for example via a genetic selection algorithm, to influence the changes made to the chemical or physical inputs into the system.

The benefits of continuous flow processing in synthetic organic chemistry have been well researched and documented in recent years (Seeberger *Nature Chemistry* 2009, 1, 258-260). Key advantages of the flow systems include higher efficiencies of heat transfer and rapid homogeneous mixing, leading to increased reaction rates, yields and selectivities (see Wegner et al. *Chem. Commun.* 2011, 47, 4583-4592).

Continuous flow process techniques have also proven useful in inorganic synthesis. However working examples are generally limited to the production of metallic and semiconductor nanoparticles and quantum dots (for example, Abou-Hassan et al. *Angew. Chem. Int. Ed.* 2010, 49, 6268-6286).

In contrast, other major materials of interest in inorganic chemistry, such as polyoxometalates (POMs) and Single Molecule Magnets (SMMs), typically utilize batch syntheses and purification via crystallization (POMS—Long et al. *Chem. Soc. Rev.* 2007, 36, 105-121; Long, et al. *Angew. Chem. Int. Ed.* 2010, 49, 1736-1758; SMMs—Evangelisti et al. *Dalton Trans.* 2010, 39, 4672-4676; Inglis et al. *Chem. Commun.* 2012, 48, 181-190; Moushi et al. *J. Am. Chem. Soc.* 2010, 132, 16146-16155; Murrie *Chem. Soc. Rev.* 2010, 39, 1986-1995; Wang et al. *Chem. Soc. Rev.* 2011, 40, 3213-3238).

A screening method must identify conditions suitable for product formation and, for inorganic compounds in particular, it must also identify conditions suitable for product crystallization as well. Large reaction arrays are therefore an inevitable and required aspect of the discovery process. The preparation and analysis of such arrays is an extremely laborious and time consuming task when working solely under batch conditions, especially when exploring delicate multiparameter self-assembly reactions aiming to produce complex nanomolecular architectures. The provision of a flow chemistry system in combination with analytical and control systems, as described herein, is believed to address the issues that have previously hindered discovery processes.

The present invention is discussed in more detail below, with further advantages highlighted throughout. As a demonstration of the invention, the inventor has provided detailed examples relating to the preparation of polyoxometallate structures.

Self-assembly reactions play a crucial role in polyoxometalate (POM) chemistry (Long et al. *Chem. Soc. Reviews* 2007, 36, 105-121). These self-assembly reactions can be seen as complex dynamic systems under thermodynamic control, where very subtle variations can dramatically influence the outcome of the reaction (Ludlow et al. *Chemical Society Reviews* 2008, 37, 101-108).

POMs are a class of materials based on mixed metal oxides with applications in catalysis, electrochemistry, biomedicine and materials science (see, for example, Toma et al. *Nat. Chem.* 2010, 2, 826-831; Boldini et al. *Advanced Synthesis & Catalysis* 2010, 352, 2365-2370; Hasenknopf *Front. Biosci.* 2005, 10, 275-287; Rodriguez-Albelo et al. *J. Am. Chem. Soc.* 2009, 131, 16078-16087).

The development of novel self-assembled systems is an arduous and labour intensive process, which requires a very delicate refinement of the reaction parameters. This represents an important limitation for practical implementation and scale-up of these materials to a preparative or industrial scale. The implementation of flow enabling techniques, as described herein, is an important development in addressing these limitations.

The inventor has previously described the development of continuous-flow reaction systems that have permitted the identification of transient states in the self-assembly of POMs (Miras et al. *Science* 2010, 327, 72-74).

Despite the huge potential of such systems, there is a limitation in that a user must set the reaction conditions, analyse the reaction products and interpret the results. A step further in the development of such systems is the implementation of optimization algorithms, such as genetic algorithms, which would enable the optimization of the systems in an evolutionary fashion (Booker et al. *Artificial Intelligence* 1989, 40, 235-282).

Optimization approaches have been employed in analytical chemistry and materials science, for the development of heterogeneous catalysts and for the optimization of chemical processes (Maier et al. *Angew. Chem. Int. Ed.* 2007, 46, 6016-6067; McMullen et al. *Angew. Chem. Int. Ed.* 2010, 122, 7230-7234; Rasheed et al. *Angew. Chem. Int. Ed.* 2011, 50, 357-358). Optimization algorithms and artificial neural networks have been applied to discover novel heterogeneous catalysts for olefin epoxidation (Corma et al. *Journal of Catalysis* 2005, 229, 513-524).

The combination of genetic algorithms, microfluidic devices and in-situ UV-Vis characterization has been recently reported for the batchwise evolutionary development of homogeneous catalysts (Kreutz et al. *J. Am. Chem. Soc.* 2010, 132, 3128-3132). Parrot et al. have described a large scale self-optimizing reaction system, where reaction, analytics and the control algorithm are integrated in an autonomous unit (Parrott et al. *Angew. Chem. Int. Ed.* 2011, 50, 3788-3792). In these cases the objective of the researchers was to optimize parameters such as reaction yield, a physicochemical property of a material or a maximum activity of a catalyst. However, the products produced by the researchers are substantially the same, and there is no real drive to identify new products that are structurally unrelated to the lead compounds on which the discovery is based. The authors do not describe a system having feedback between individual reaction runs.

Researchers, such as Kreutz et al., describe the use of microfluidic devices in the evolutionary process. However, the microfluidic device is not used to generate the individual combinations of chemical inputs. Rather, Kreutz et al. construct a population of combinations and each individual combination is delivered into the microfluidic device where its catalytic activity is tested. Thus, the microfluidic device has nothing to do with the generation of the population itself. Kreutz et al. explore the product catalyst space in a series of stages, where each stage is presented as a distinct generation of a product population. Thus an initial batch of catalysts is prepared and tested, and further batches of material are prepared in subsequent and separate steps. The discovery process is therefore a batch synthesis operation that requires user intervention at each preparation step.

The possibility of using evolutionary algorithms to direct chemical systems, leading to different products depending on the requirements of the fitness function, is believed to be a new approach to discovery chemistry.

The present inventor has also identified as advantageous the use of the direct product output as a direct determinant of the subsequent chemical and physical inputs for a particular preparation. In this way, the process is engineered around, and directly responsive to, the actual products produced. The evolutionary calculations are therefore based on the physical parameter space of the system.

Described herein is a process for preparing self-assembled nanoclusters with minimum human input. The use of computer-controlled evolutionary algorithms is an enabling technology for the development of self-assembled nanostructures in an evolutionary fashion.

From a random starting point, and without any previous synthesis information, the system evolves following a mechanism of 'survival of the fittest' towards a product that satisfies the specification of the maker. The set-up comprises a fully automated system under the control of a simplex or genetic algorithm. The system developed by the inventor is capable of synthesizing two different and complex POMs with minimum user interaction. In-situ analytical techniques are used to monitor the reaction and provide feedback to the control system providing the decision making inputs for the process. As a result, the chemical fitness landscape corresponding to the reaction conditions necessary to self-assemble each compound has been determined. This is believed to be the first example of a synthesis of a self-assembled nanomaterial directed by an evolutionary algorithm.

Process

The process of the invention includes the step of providing a series of chemical inputs to a reaction space of a flow chemistry system. The series of chemical input flows is a selection from a broader series of available chemical inputs. Additionally or alternatively, the process includes the step of supplying one or more physical inputs which may be selected from a broader range of available physical inputs. The physical inputs are deliverable to the reaction space, or they may be applied to one or more of the chemical inputs prior to the delivery of that input to the reaction space.

The chemical and physical inputs may be regarded as the genetic encoding of a product phenotype. Thus, each available input may be referred to as a gene, and the combination of inputs may be referred to as a genotype. Different genotypes, which are different combinations of chemical and physical inputs ("genes"), may lead to the same expressed product. Thus, like the biological system from which the nomenclature is taken, there may be genetic redundancies present.

Flow chemistry techniques are particularly suitable for use in the evolutionary development of a product. Importantly, the flow chemistry procedures may be used to prepare larger quantities of desirable product as soon as a product meeting the user specification is identified. Thus, where a product is identified from a particular combination of input flows, those inputs may be maintained in order to provide greater quantities of material. The ability of the flow techniques described here to provide larger quantities of material may be referred to as scale up.

The use of a flow chemistry system also permits the steps in the process to be run continuously and automatically, without the need for stoppages. Typically batch discovery processes include pauses in the product preparation whilst analytical and decision steps are made. The production of future products is only resumed once the analysis and decision steps are complete. The present system avoids delaying the analytical and decision making steps by integrating the analytical system and the control system with the inputs and the outputs of the flow chemistry system.

This scale up feature provides an advantage over other syntheses which rely on methods providing only a limited quantity of product. Once a product of interest is identified, the materials necessary for the synthesis must be manually identified and brought together, typically using traditional synthetic techniques. This batch approach to scale up from product identification to larger batch production is inherently inefficient due to the laboratory time that is required.

Each of the chemical inputs represents a reagent, catalyst, solvent, or component for use in the preparation of product. Thus, a series of chemical inputs is intended to be a collection of reagents, catalysts, solvents, and/or components that could lead or will likely lead to the formation of a product having a desired characteristic or a desired series of characteristics. Likewise, the physical inputs are intended to be used, in combination with the chemical inputs, to prepare a product having a desired characteristic or a desired series of characteristics.

The physical and/or chemical properties of a product are analysed and compared against the user specification. Each product may be assigned a fitness value which is a measure of the product's ability to meet the requirements set out in the specification. The properties of that product may then be used to inform the synthesis of later products. Those products that are seen as having a greater fitness function may provide a greater influence on the preparation of later products compared to those products having a lesser fitness function.

The preparation of a later product may differ from an earlier product in that the series of chemical and/or physical inputs flows into the reaction space is altered. Altered may mean that a chemical or physical input is removed from a previous series of inputs. Altered may mean that a chemical or physical input is replaced with an alternative chemical or physical input. Altered may also mean that an additional chemical or physical input is provided.

Over the course of the product generation process, a large number of different combinations of chemical and/or physical inputs may be used. The variety and number of different combinations will increase the chances of producing a product that meets or exceeds the user specification.

It is foreseeable that a change in one or more of the input flows may not lead to a change in the product or may lead to an alternative product having similar or identical characteristics to an earlier formed product. Such information may be of use, as the evolvable synthesis may develop with a better understanding of the influence provided by a particular input or combination of inputs to the product characteristics. The present invention also finds use in the identification of alternative products having comparable characteristics to a reference product. The present invention also finds use in the identification of alternative methods for the preparation of a particular product.

Specification

The process of the invention allows a user to identify products having a series of desirable physical and/or chemical characteristics. The process of the invention also allows a user to identify improved processes for the preparation of target products.

The specification set by the user is ultimately translated into a physical product that has a fitness function that meets or exceeds the characteristics that are deemed desirable by the user.

A specification represents a collection of one, or typically two or more, characteristics that is desirable for a product to have. What constitutes a desirable characteristic will be dictated by the intended use of the product. The characteristics may be those chemical or physical characteristics that are known to produce a particular effect, or the characteristics that are thought or suspected by the user to produce a particular effect.

A product produced in the process of the invention may be regarded as having met the requirement of the specification if it has all of the physical and/or chemical characteristics that are set out in the specification. In some embodiments, the method may be useful for identifying products having characteristics that exceed the specification.

The specification may also set certain limits or ranges for a particular characteristic. Thus, a product may meet the specification if, with regards to this particular characteristic, its properties lie at, above or below the limits (as specified) or within the range (optionally including at the limits of the range).

A characteristic may be a desirable physical characteristic of the product. The nature of the physical characteristic and the magnitude (or parameters) will be dictated by the intended use of the product. Examples of physical characteristics which may be explored by the methods of the present invention are set out below.

A physical property of the product may be a characteristic selected from the group consisting of:
optical property,
mass property,
electrochemical property, and
rheological property.

A physical property of the product may be a characteristic selected from the group consisting of:
Colour
Refractive index
Optical rotation
Absorbance maximum; Wavelength of absorbance maximum
Emission wavelength
Absorbance value at set wavelength
Molar extinction coefficient
Fluorescence, presence, yield and/or wavelength of
Photoluminescence, presence, yield and/or wavelength of
Non-linear optical properties, presence of
Retention time (for example, in a HPLC)
Mass
Polydispersity Isotopic distribution
Elemental composition, for one or more than one element
Reduction/oxidation potential
pH, for example of an aqueous product mixture
Elongation
Flow
Storage modulus
Loss modulus
Viscosity
Morphology, including crystallinity
Stoichiometry
Size, for example diameter of particles, or pore or cavity size
Shape
  and optionally together with the above, surface texture, harness and surface tension,
Conductance
Magnetic properties
Melting point, including Tg
Boiling point
Solubility, for example in a set solvent or series of solvents Methods for the measurement of the physical and chemical parameters above are described in further detail in the analytical section below.

A particular physical property of the product may be a requirement for a product in the context of how that product is to be used. Thus, for example, it may be necessary for a product to have a melting temperature above a certain value, or a particular rheological property (e.g. certain storage or loss module values). Such parameters may be associated with the physical integrity of the product in its intended use.

A parameter may be a chemical characteristic of the product. The chemical characteristic may be a functional group that is suitable for use in a particular reaction. The presence of that functional group may be determined by spectroscopy, for example, or may be surmised by the use of the product itself, where the successful use indicates the presence of the functionality.

The chemical characteristic may also be a biological characteristic, such as a biological activity.

The chemical property of the product may be a characteristic selected from the group consisting of:
pKa
KD
IC50
MIC (minimum inhibitory concentration)
catalytic ability The process of the invention may also be used to explore possible preparation procedures with the aim of identifying those procedures that yield a product under optimal conditions. Thus, a user may look to identify improved methods for making a particular product. The present invention allows new procedures to be identified by exploring the effects that particular chemical and physical inputs have on a reaction outcome.

In this embodiment, the specification represents a user's desired characteristics for a particular reaction. The characteristics of the reaction may relate to characteristics associated with the product produced. Examples of such characteristics include one or more characteristics selected from the group consisting of product yield, by-product yield, yield based on recovered starting material, product purity, product enantiomeric, diastereomeric or regiomeric excess, and the like.

The specification may also include characteristics that relate to the purity of the product, or the ease with which the product may be separated from other components of the reaction mixture. Thus, the discovery process may look to identify products that have desirable physical or chemical properties, and it may look to simultaneously identify the inputs that allow the product to be most easily purified. This is a unique advantage of the present process.

The characteristics of a reaction may relate to the process conditions that are used or are necessary to yield product, for example a set yield of product. These conditions may be related to the chemical engineering aspects of the case, such as amount of starting material, catalyst or solvent required to produce a maximum or a set yield. The characteristic may also relate to the heat gain or loss during the preparation, or the rate or reaction.

The specification may look to minimise or maximise each characteristic, as appropriate and as desired.

The worked examples provided herein provide examples of user specifications. Also exemplified is the way in which a user may determine a fitness value based on the recorded characteristics for a particular product. Whilst the user may set various desired characteristics for the product sought, the individual characteristics may have different weightings in view of their contribution to a single aggregate fitness function. The use of such preference based methods in multi-objective optimization problems has been previously described (see Yu et al. *Introduction to Evolutionary Algorithms* 2010, Springer-Verlag, London). Such preference-based approaches are favoured where a particular analytical technique cannot readily distinguish between different products. In these situations it may be appropriate to include additional analytical techniques to permit a product to be distinguished.

The inventor has also contemplated the use of Pareto-based multi-objective optimization methodologies for use in the processes of the present invention.

Product

The present invention relates to the preparation of a desirable product. The desired product is a product that a user wishes to prepare that will have physical and/or chemical characteristics that meet with the user's needs.

The processes of the invention are not limited to any particular type of desirable product. The product may refer to a particular chemical structure, or the product may be a collection of different structures, such as a polydisperse polymer. The product may be a particle or a quantum dot. The product may be a composition of matter, such as a pharmaceutical composition or a consumer homecare or personal product, such as a detergent mixture, a deodorant, or the like.

The method of the invention allows the production of a plurality of products, where each product has a different chemical structure or a different composition. The characteristics of these products may vary, and some of the products produced will have similar or identical physical and chemical characteristics.

It is an advantage of the invention that it is not necessary for the skilled user to know what the structures or compositions of the products produced are. It is also an advantage of the present invention that the user is not required to predict the structures of the products.

When a combination of chemical and/or physical inputs is supplied to a reaction space a reaction mixture is formed which yields a product. The term product is used broadly to refer to any result from the combination of the inputs. The term product may therefore refer to a mixture containing a product formed from the chemical reaction of components provided by the chemical inputs. The term product may also refer to a product composition that is formed by the admixture of components provided by the chemical inputs.

In one embodiment, the product is an organic molecule. The organic molecule may be a biologically active agent. The organic molecule may be an organic compound having a molecular weight of 1,000 or less, 800 or less, or 500 or less.

In one embodiment, the product is an inorganic molecule.

In one embodiment, the product is a compound comprising a plurality of metal atoms. In one embodiment, the compound comprises 3 or more, 4 or more, 5 or more, 6 or more, 12 or more, 24 or more, 36 or more, 102 or more, 132 or more, 154 or more metal atoms.

The product may be a polyoxometallate, such as a polyoxomolybdate.

The product may be a coordination cluster.

The product may be a single molecule magnet.

The product may be a particle, such as a metallic nanoparticle or an organic nanoparticle.

The product may be a quantum dot.

The product may be a nanostructured material, for example a metallic or polymeric material or a combination of both.

The product may be a dye, which includes organic, inorganic and hybrid organic-inorganic dyes.

The product may be a biologically active agent, which includes those agents having organic, inorganic and/or biological components.

The product may be an electronic material. Such a material is one that is capable of acting as a conductor, magnet, photovoltaic material, or the like.

The product may be a polymer, including but not limited to homopolymers and copolymers formed via polymerisation methodologies known to those skilled in the art.

The product may be an organic molecule.

The product may be a composition. The composition may be a pharmaceutical composition.

The composition may be a personal healthcare product. For example, the compositions may be a cosmetic formulation, a detergent formulation, a paint formulation, or a food stuff.

A composition may comprise any one of the products referred to above.

A product produced in the reaction space is not limited to the direct product of a reaction of one or more of the chemical inputs. The processes described herein encompass the preparation of intermediate materials, which are then reacted further in the reaction space, upon application of appropriate chemical and physical inputs to generate a product material.

Described herein, as an exemplification of the invention, is the preparation of a range of supramolecular complexes. Such complexes may be formed from a common building block starting material, which is generated in a reaction space from a combination of chemical and physical inputs. The building block, optionally together with other components, is capable of forming larger supramolecular structures. The exact form of these structures may be influenced by other chemical and physical inputs into the reaction space. In this way, a range of supramolecular forms may be accessed, and each form may be analysed and reviewed against the user specification. It is apparent also that the system may be used to alter the nature of the building block itself, but may nevertheless be used to prepare supramolecular structures of similar size and shape, regardless of the nature of the building block itself.

The references to a product are references to the desirable product meeting the specification. It will be apparent that some of the reactions undertaken in the process some will not result in the formation of useful product. Some combinations of chemical and physical inputs may not lead to any product, or the product formed may not be suitable for analysis or use. The analytical system is capable of recording the characteristics of each mixture that results from the combination of chemical and physical inputs. Where a particular selection of inputs does not produce a desirable result, this will be detected. The control system will place a low fitness function against the combination that has resulted in poor product. Such a function, which is placed against the relevant chemical and physical inputs, will influence the selection of later combinations of inputs.

Described herein, as an exemplification of the technology, are methods for the preparation of polyoxometallate compounds.

The present invention relates to the use of flow techniques to prepare products of potential use. The product may be a solution or suspension, which may be produced directly in the preparation step. Alternatively, the product may be contained within the fluid that is used in the flow technique. The product may be dissolved or suspended in that fluid. The analytical techniques described for use in the invention include those that are suitable for analysis of product in solution or suspension.

It may be desirable to isolate the product, for example from solvent. Such a step may be necessary where an analytical procedure requires a sample of product to be substantially pure.

A product may be separated from a solvent or carrier fluid (dispersed phase) using techniques familiar to those of skill in the art. Simple filtration techniques may be used to separate a product material where it is insoluble in the fluid. Crystallisation and precipitation techniques may also be used to isolate the product material from the solvent.

Part of the user specification may relate to the purity of the isolated product, the form of the product after it is isolated, and the effort required to reach a certain specified level of purity. Thus the steps mentioned above may form part of the analysis of the product itself.

Method

The present invention also relates to the identification of a desirable preparation method. The desired method is a method that a user wishes to use that will have process characteristics that meet with the user's needs. Such methods are therefore aimed at optimising the production of a particular product. The methods under investigation will necessarily be limited to the extent that they are intended to produce a particular product. However, there is significant scope to alter reaction parameters, reagent choice, catalyst choice and so on, to permit an extended evaluation of the reaction process.

It will be apparent to the skilled person that the techniques employed herein to identify a desirable product may at the same time identify optimised preparation steps for preparing that product.

Flow Chemistry System

The flow chemistry system for use in the invention may be based on standard laboratory flow systems, including microfluidic systems. Such systems may be adapted as described herein.

The flow system comprises a series of chemical inputs in fluid communication with a reaction space. The chemical input may be a reservoir holding a material for use in the preparation of a product. The reservoir may be connected via a fluid channel to the reaction space.

Each chemical input is independently deliverable to the reaction space. The rate of delivery is controllable by the control system. The amount of material delivered is also controllable by the control system.

Typically the reservoir is a syringe, where the plunger is under the control of the control system. The fluid channel, which may be tubing, connects the syringe to the reaction space. Individual channels may lead directly to the reaction space. Two or more of the fluid channels may combine prior to the reaction space, for example to allow pre-mixing of components.

Standard flow chemistry architectures may be used in the present invention. Thus, the fluid flows may pass through a standard microfluidics substrate that has been appropriately patterned with fluid channels and spaces. Alternatively, the flow system may use standard laboratory tubing that is appropriately linked, for example using valves, connectors and manifolds. The use of a tubing system may be preferred over the microfluidics system where larger scale product preparations are desired. In other embodiments, the flow chemistry system is a reaction network that is prepared by a 3D printing method. Such architectures are particularly useful as the precise arrangement and size of flow channels, including reaction spaces, mixing spaces, and input and output channels may be set by the user, allowing precise control of component mixing.

In one embodiment, the combined flow rate in the flow chemistry system is at least 1, at least 5, at least 10, at least 15 or at least 20 mL/min. Using flow rates at these values allows the production of useful quantities of material, for example sufficient quantities for analysis and future use, in relatively quick time. The use of flow rates with these lower limits also allows a user to scale up a particular synthesis thereby to provide meaningful quantities of material directly from the system.

The combined flow rate refers to the total flow rate of the combined chemical inputs into, in or out of the reaction space. The total flow rate may be calculated from the individual flow rates of the chemical inputs.

The flow rate through the system may be kept constant with changes in chemical and/or physical inputs. Alternatively, changes in flow rate may be made, and each flow rate may represent a physical input into the reaction space.

In one embodiment, the reaction volume in the flow chemistry system is at least 1 mL, at least 5 mL, at least 10 mL, at least 15 mL, at least 20 mL. The reaction volume is a function of the combined flow rate over time. The reaction volume refers to the combined volume of the chemical inputs for a particular product preparation. The reaction volume is the volume used when the process is in discovery mode. Thus, the emphasis at this stage is to produce a large variety of different product mixtures, where there is sufficient product for analysis by the analytical system. Once a useful product has been identified, then the process may be switched to scale up mode, where the flow chemistry system is set to produce large quantities of that product. In this mode a particular series of chemical and physical inputs are applied constantly, thereby providing a constant flow of product material.

Flow chemistry techniques may include the step of passing fluid through channels, for example to permit the mixing of components within. Such may be useful in ensuring that materials are well dispersed. Such may ensure quicker and complete reaction or distribution.

The reaction space is not particularly limited and refers to the portion of the system where the product is formed. The reaction space may comprise one or more chambers and/or channels in fluid communication. The reaction space may comprise one or more fluid channels in fluid communication. The shape and size of the chambers is not particularly limited, and may be selected based on the scale at which the user wishes to operate.

The reaction space is in fluid communication with the chemical inputs. It is not necessary that each of the chemical inputs be deliverable directly to the reaction space. Two or more of the chemical inputs may be combined prior to delivery to the reaction space. Such may be useful for premixing or pre-reacting certain chemical inputs prior to their delivery to the reaction space.

The process of the invention operates continuously to provide first, second and further products. The use of, for example, in line analytical systems, permits products to be assessed against the specification in real time, and the preparation of further products may be determined in real time also, without the need to pause the operation of the flow chemistry system. Thus, the discovery process of the invention is not a batch process.

The flow chemistry system is adapted to permit the flow of a fluid through the system in between each of the different combinations of chemical and physical inputs. Such a fluid is provided to separate the product mixtures in the flow system, thereby preventing cross contamination between product samples. The use of such spacing fluid in flow chemistry techniques is well known to those of skill in the art.

The term reaction space may be used to refer to that portion of the flow chemistry system where a product is formed. In certain embodiment of the invention, the product is a molecule that is formed by a chemical reaction in the reaction space. In other embodiments, the product is a composition of components. Such a composition may not be formed by chemical reaction. Rather a composition may be formed by admixture of the various components which are delivered as chemical inputs.

The reaction space has a fluid output which is in communication with an analytical system. The analytical system is therefore in line with the flow chemistry system and may be integral to it.

The reaction space may be in fluid communication, optionally via the analytical system, with a product collection system. The product collection system may include spatially arranged receptacles for receiving individual outputs from the reaction space. In practice, the system may include a series of test tubes or vials, or a well plate, such as a 96 well plate. The product mixture may be dispensed into the receptacles automatically or manually. In either case, the distribution of product mixture may be based on the analysis of the mixture, for example using the analytical system. Additionally or alternatively, the distribution of product mixtures may be based on the expected flow rates of material through the system.

Thus product exiting the reaction space may be analysed then collected, either for later further analysis or for use. Alternatively, the product may be collected, and the analysis may be performed on the collected products.

Where the product is collected, it is preferable to individually collect the products that results from each series of chemical and/or physical inputs. The products may be individually distributed into well plates, vials, test tubes and the like, as well known to the skilled person. In a flow system the separation of products may be undertaken using an appropriate computer control system that monitors flow rates through the flow system. Individual outputs may be collected based on the expected flow of material through the system. The collection of outputs may also be coordinated with the analysis of the product material exiting the reaction space. Changes in the product output may be detected and the products may be distributed accordingly.

Chemical Input

The reference to a chemical input is a broad reference to any material, which may be a reagent, catalyst, solvent, or a component, that may allow the preparation of a product. The chemical input is provided as or in a fluid for transfer to the reaction space.

Where the material is a fluid, it may be supplied in this form to the reaction space. Alternatively, the material may be diluted, dissolved or suspended in a fluid for delivery to the reaction space. Thus the material may be in solution or suspension. The fluid that dissolves or suspends the material is not particularly limited, and may be water or an organic solvent, for example. The fluid may be independently deliverable to the reaction space. The fluid is also used to provide separation between individual combinations of chemical inputs that are supplied to the reaction space thereby preventing contamination between different combinations.

The identity of the chemical inputs will be dependent upon the reaction and formulation steps that are to be employed, and will also be dependent upon the user's intended exploration space. Whilst the present invention allows a user to explore a product map, the user must provide the boundaries to that map by way of choosing a set of reagents, catalysts, solvents, and components, and by selecting possible reaction and formulation pathways. Within those confines, the present invention nevertheless allows the user the possibility of exploring a broad range of product space. The examples in the present case demonstrate the breadth of structural complexity that is available in an inorganic synthesis employing a small range of chemical inputs.

In some embodiments, one or more, such as two or three, chemical inputs may be regarded as essential. Thus, these inputs are always provided into the reaction space. The alteration of other chemical and/or physical inputs provides the variety in the combination that permits an exploration of the product space. The number of essential inputs is less than the total number of available inputs, and is preferably considerably 5 less than the total number of available inputs.

An input may be essential if it is necessary for providing a necessary component of the product, such as a structural component, or a necessary activity of the product. Where the process of the invention relates to the identification of an improved method of synthesising a particular product, it may be that case that a number of the inputs are essential in order to provide the particular product. Other inputs are available and are variable in order to investigate other conditions for preparing the particular product.

A chemical input may be a reagent. A range of reagents may be provided that differ in their structure and functionality.

A chemical input may be a catalyst. A range of catalysts may be provided that differ in their activity, selectivity, or morphology.

A chemical input may be an acid or a base. A range of different acids and bases may be provided, where the acidity differs. Organic and inorganic acids and bases may be selected. Weak and strong acids and bases may be provided.

A chemical input may be a solvent. Organic solvents and water may be used. A range of non-polar, protic and aprotic solvents may be provided. In one embodiment, water is provided as a chemical input.

A chemical input may be a salt. A range of different salt forms of a particular component may be used. A range of organic and inorganic salts may be provided A chemical input may be an active pharmaceutical agent. Other chemical inputs may be pharmaceutical excipients.

A chemical input may be a cosmetic agent for a cosmetic product. Other chemical inputs may be carriers and the like for cosmetic products.

A chemical input may also be a gas. In some embodiments, a chemical input may be an inert gas, such as nitrogen or argon, to supply to the reaction space. In other embodiments, the chemical input is a reaction gas, such as hydrogen, oxygen or carbon dioxide.

A chemical input may be an input that is for useful in the work up of a reaction product, or is useful for quenching a reaction. Such inputs may be provided to the reaction space at some time period after the other inputs have been combined, thereby to quench a reaction or to permit the work up and possible isolation of product material.

The concentration of a material within a solution or in a suspension will be selected appropriately by the user. The effective concentration of the material in the reaction space will depend on the concentration of that material within its individual chemical flow and the volume of other chemical inputs with which it is combined in the reaction space. These volumes are dictated by the flow rates of each of the inputs, which may be varied as appropriate, to alter the effective concentration of a material in the reaction space. Such techniques will be familiar to those with an understanding of flow chemistry techniques.

Preferably, the material that is present as a chemical input is stable. The flow chemistry techniques may require that a chemical input is stored for a time before it is used. Therefore, it is preferred that the chemical input does not decompose in this time. Where appropriate, a chemical output may be stored under an inert atmosphere, may be stored under anhydrous conditions or may be stored at reduced temperature, as required.

In one embodiment, there is provided 5 or more, 8 or more, 10 or more, or 15 or more chemical inputs. For example, the flow chemistry system may comprise a number of controllable syringes equal to the number of specified chemical inputs.

From time to time it may be necessary to replenish a chemical input, for example to refill a syringe with a particular component. The process of the invention need not be halted to allow such replenishment, and the chemical input may be replenished at such a time as it is not required as an input into the reaction space. The control system may be suitably programmed to predict the time at which a chemical input will become depleted. A user may be warned accordingly. The control system may also be suitably programmed to factor in to the decision making and control process the unavailability of an input owing to replenishment. The control system can continue to produce products using inputs other than the input that is being replenished.

The number of chemical inputs may be one, though in this embodiment the number of physical inputs, which may bring about a change in the chemical input, will be large. In one embodiment, there is provided two or more, three or more, four or more, five or more, six or more, ten or more, twenty or more chemical inputs.

Physical Input

In one embodiment, the method also includes the provision of one or more physical inputs which are made available for delivery to the reaction space or for delivery to a chemical input prior to that chemical input entering the reaction space.

A physical input is intended to refer to an input that is not a material such as a reagent, catalyst, solvent, or a component. A physical input may refer to, for example, an input that modulates temperature, such as the temperature of a particular chemical input, or the temperature of the fluids in the reaction space. A modulation in temperature may refer to a physical input than can raise and/or lower temperature. A series of temperature inputs may be provided that is a gradient of temperature increase and/or decreases. The range of temperature inputs may be limited by the boiling and freezing points of the fluid chemical inputs supplied to the reaction space, and the fluid product output. It is noted, however, that the reaction space may be suitably pressurised thereby to effectively alter the boiling and freezing points of the fluid chemical inputs. In this way a greater range of temperature inputs may be supplied to the system.

Temperature inputs may be used to initiate reagents or favour certain reaction pathways. Temperature inputs may also be used to investigate the stabilities of the chemical input and product output.

The physical input may be light. A series of light inputs may be provided that differ in one or more of intensity, wavelength, exposure time and spectrum. Light inputs may be used to initiate reagents or may be used to favour or alter certain reaction pathways. Light inputs may include UV-vis inputs. The physical input may be microwave radiation.

The physical input may be ultrasound. Such may be useful for the generation of reagents or products. Ultrasound may also aid the dissolution of material.

The physical input may be pressure. Pressure changes may be used to alter, for example, solvent boiling points.

The physical input to the system may be a process related input for the reaction mixture. Thus, the input may be a time limited feature for reaction or admixture. After a set time, the reaction mixture may be analysed and the product quantified. Thus, reaction time may be an input. Similarly, other process features such as concentration and ratio of chemical inputs, such as the reagent and catalyst chemical inputs, may be a physical input.

Reaction Mixture

The reaction mixture refers to the combination of chemical inputs that are brought together in the reaction space. The interaction of the components in the reaction mixture provides the product. This interaction may be a chemical reaction and/or an admixture of components.

Changes are made to the reaction mixture, which may be chemical or physical changes, in order to provide alternative products, which products may then be compared to the user specification.

The composition of the reaction mixture may be changed by alterations in the chemical inputs. For example, certain reagents, catalysts and solvents may be replaced, removed, or added to the reaction space through the replacement, removal or addition of chemical inputs.

Within the flow system it is possible to provide further alteration in the composition within the reaction space using standard flow chemistry techniques. The effective concentration of components in the reaction space can be altered by changes in the flow rate of a particular chemical input. Changes in concentration may also be made by the use of a solvent input. Increased flow of this input (in relation to other inputs) has the effect of reducing the effective concentration of those inputs in the reaction space.

The reaction mixture may be subjected to physical inputs, as described above, which may bring about an alteration in the identity of the product produced, or may bring about a change in the process leading to a particular product.

The reaction mixture produces a product, which may be present together with unreacted starting materials (reagents), catalysts, by-products, solvent and so on. The nature of the product mixture may be a part of the user's investigation, as the user may look to investigate not only desirable products, but the composition which the product is provided in. The nature of the product mixture may be important for processing reasons. The product may need to be separated from the other components in the product mixture in order for that product to be used. The ease of this process may be dictated by the product itself, but also the nature of the other components, such as the starting materials, catalyst, by-products, and solvent mentioned above. It may therefore be important to investigate the effects that the chemical and physical inputs have on the separation process, with a view to identifying those inputs that produce a desirable product, and also that the product can be efficiently purified.

As noted above, the reaction mixture may be designed to yield one or more intermediate products, which are intended to react further to produce product material. Such intermediate products may be building blocks, such as monomers or metal complexes, which are capable of interacting with one another to form larger, more complex structures, such as polymers and supramolecular complexes. The building blocks generated during these processes have a profound impact on the final products formed. Thus, the exploration of different amounts and different types of intermediate products may also be factors for exploration and investigation.

Where intermediate products are formed, it will be appreciated that a particular set of chemical and physical inputs may be used to control the formation of a particular type of intermediate. Further sets of chemical and/or physical inputs may be supplied to the reaction space in order to influence the way in which the intermediate product goes on to react, for example the formation of product material through the interaction of the intermediates with one another and/or the interaction with other species. As described herein, the inventor has shown the use of a flow system to generate an intermediate metal source as a building block, which building block may then be used to assemble larger polyoxometallate structures, such as wheels and spherical clusters.

It will be apparent to the skilled person that the interaction between building blocks may be influenced by additional chemical inputs that are provided. It will also be clear that physical inputs, such as temperature, pressure, light, pH, concentration and the like may also be important factors in determining the precise nature of the final product.

The product mixture may also be important if the product is to be used directly in the form in which it is produced. The other components in the product mixture may influence the effect that the product has, and it may be important to investigate the effects that the chemical and physical inputs have on the use of the product, with a view to identifying those inputs that allow the product to be used effectively. Where the process looks to identify compositions for future use, such as pharmaceutical compositions, these considerations will be important aspects in the user specification.

The inventor has recognised that the process of the invention may be used to identify desirable compounds and may be used to identify those reaction conditions, which are the sum of the chemical and physical inputs that allow the desirable product to be purified with most efficiency. As an exemplification of this, the present inventor has shown that a range of inorganic compounds may be produced using a discovery process, and that same discovery process may be used to investigate the product mixtures that are most favourable for allowing the inorganic product to be crystallised from the product mixture.

Analytical System

The analytical system is adapted for interaction with the flow chemistry system. The analytical system is provided for the purpose of analysing product produced in the reaction space. The analytical system is in communication with the control system. Thus, the analytical data is provided to the control system for comparison against the user specification. The analytical system is automated. Thus, the system is adapted such that it is capable of receiving a product mixture, optionally performing any purification, work up or sample preparation steps, analysing the product mixture or any product extracted from it, and supplying the analytical data to the control system.

Additionally, the analytical system may also be used to monitor the chemical inputs into the reaction space, and the progress of the product formation within the reaction space. The analytical system may also be used to monitor the output of the reaction space. The collection of individual products exiting from the reaction space may be based on the results of such analysis.

The analytical system may be integrated with the flow chemistry system. Thus, a fluid flow into or exiting from the reaction space may be directly analysed. In this embodiment, it may not be necessary to individually collect the prepared products. Analysis of the fluid flow in this way allows a rapid determination of the relevant characteristics. However certain product characteristics may not be determined by measurement of a product in a fluid flow. Thus, it may be appropriate to collect individual products, optionally together with some later form of purification, and perform an analysis on each of those products.

The character traits that the user is looking for in a desirable product will dictate the type of analysis to be undertaken by the analytical system. Certain spectroscopic analyses may be performed directly on the fluid as it exits the reaction space. Such analyses include those based on IR, UV-vis, Raman and NMR spectroscopies, retention time (e.g. through an on line column), DLS and the like. The user specification may be drawn up with a knowledge of which analytical techniques may be usefully employed together with a flow chemistry system.

In order to develop high throughput systems, where the process of preparation may be evolved in relatively short time, it is beneficial to couple flow chemistry with efficient in-situ and on-line analytical techniques, such as pH, UV-Vis, Raman and IR. On-line detection systems for flow chemistry systems are described in the art (see, for example, Kreutz et al. *J. Am. Chem. Soc.* 2010, 132, 3128-3132; Urakawa et al. *Analyst* 2008, 133, 1352-1354; Sans et al. Analyst 2011, 136, 3295-3302; Lange et al. *Chemical Science* 2011, 2, 765-769).

Preferably, the analytical technique is passive or non-destructive. Thus, the sample may be tested without requiring any physical or chemical degradation of the product. In this way a sample may be tested by many different methods.

The analytical techniques may include those techniques that require some form of loss or irreversible depredation of the product produced. Such techniques may require some or all of the product. Examples of techniques that require destruction of material, or may lead to the destruction of material include mass spectrometry, thermal studies (such as melting point analyses), bioactivity assays.

Where a desirable product is identified it may be useful to retest that product in order to confirm the initial positive identification. Additionally or alternatively, it may be beneficial to conduct further analytical tests on a product to confirm its usefulness. These further analyses may require larger quantities of material or may be of a time-consuming nature that is not suitable for use together with a relatively fast changing flow evolution techniques described herein. Such techniques may therefore be conducted on compounds that are identified as desirable by way of other, more immediate analytical techniques.

Fluid exiting from the reaction space may be directed to analytical devices such as mass spectrometers and NMR spectrometers. The fluid may be taken directly from the flow exiting the reaction space. Alternatively, samples may be taken from individually collected products.

In some embodiments the analytical system will test a particular reaction mixture after it exits the product space. The results from the analytical analysis may be supplied to the control system which will respond to the output by altering the inputs into the reaction space. Where the analysis is rapid, the control system will be able to respond rapidly and will be capable of formulating the next series of inputs in direct response to the output.

However, in some embodiments, the analysis may require some time before results can be provided to the control system. Here, the control system may be required to formulate the next series of inputs without knowledge of the results of a previous output. This is not a problem. The control system is capable of formulating a series of inputs from earlier results, and may also generate other series of inputs either randomly or as considered variations of other series of inputs provided to the reaction space. Thus a time lag between product production and product analysis is not a problem and the control system is programmed accordingly to deal with this.

It is an important aspect of the present process that products may be prepared substantially continuously with analytical feedback throughout the product preparation steps. Thus, the process does not look to produce a product then halt future product production whilst the results from the analysis are awaited. In essence this would be akin to a batch process, where there are separate production, analysis and decision making steps. The present invention looks to bring these steps together, and the system is permitted to run continuously and automatically until an end result is achieved.

In one embodiment, the analytical system has a UV-vis detector. In one embodiment, the analytical system has a pH detector. These detectors may be provided in line with the reaction space.

Control System

The control system links the analytical system with the flow chemistry system. The control system controls the chemical and physical inputs into the reaction space. The control system receives the analytical data from the analytical system and assesses whether a product meets the user specification. The control system is provided with an evolutionary algorithm to change the chemical and physical inputs into the reaction space in response to the assessment of a product or series of products against the specification. As explained below, the control system may also make random changes to the inputs and such changes need not be responsive to the assessment of a product.

The control system is suitably programmed to control the steps of the process automatically. Thus, the control system is provided with appropriate decision making elements that are capable of taking the analysis data from the analytical system and comparing that data to the user specification. The control system is capable of assigning fitness functions to a series of chemical and physical inputs that resulted in a product whose analysis data was recorded. The control system is programmed to formulate a future series of inputs into the reaction space based on the fitness functions that have been applied to an earlier series of inputs. Using evolutionary analysis, the control system will look to discard (i.e. not use in future series) those inputs or combinations of inputs that are associated with products having poor fitness functions. The control system will look to perpetuate (i.e. use in future) those inputs or combinations of inputs that are associated with products having good fitness functions.

The control system is suitably programmed to recognise the contribution made by a single input into the reaction mixture, and the contribution made by a combination of inputs into the reaction mixture. Thus, the control system may look to identify combinations of inputs, such as two or three inputs, or more, that provide a synergistic effect. Such combinations may be perpetuated in later product preparations.

In the chemical field the use of evolutionary algorithms is well described. See, for example, Maier et al. (*Angew. Chem. Int. Ed.* 2007, 46, 6016-6067), Kreutz et al. (*J. Am. Chem. Soc.* 2010, 132, 3128-3132), Zhu et al. (*Appl. Phys. Express* 2012, 5, 012102), Pham (*Comp. Chem. Eng.* 2012, 37, 136-142), Lehár et al. (*Nature Chem. Biol.* 2008, 4, 674-681), and the references cited therein.

The present invention may therefore make use of those decision making programmes that are described in the art. Alternatively, the skilled person may adapt these programmes, or prepare bespoke programmes for use, based on the evolutionary methods that are to be employed. Such custom made control elements may take into account the user speciation, the chemistry employed, the chemical and physical characteristics of the product and their contribution to the overall fitness function. The principles of evolving a product production process are therefore understood by the skilled person. As described herein, the chemical and/or physical inputs may be altered to provide a different combination.

The number of inputs that is altered will depend on the algorithm and how it reacts to individual outputs from the reaction space. In one embodiment, an input may evolve by the alteration, such as the change, addition or removal, of a single input at a time. This may be referred to as a mutation of an input. Such changes may be useful where incremental improvements in product characteristics are noted. The mutation may be a random mutation, which may be made to apply a pressure to the system with a view to finding out whether such a change is capable of providing a desirable product. Inputs may also evolve by the alteration of two or more inputs at a time. These alterations may be designed, or may be random.

In one embodiment, an input may evolve by the alteration of multiple inputs at a time. This may be referred to as a crossover. Typically a crossover combines inputs from particular combinations that have been found to provide products having promising characteristics (i.e. having good fitness functions). The crossover therefore combines those parts of two or more combinations that are believed to be associated with a beneficial result, with the aim of production of a superior product.

Within the context of evolutionary methods, the combination of inputs may be referred to as the genotype, and the products that result may be referred to as the phenotype. In the present case the phenotype is the combination of physical and/or chemical characteristics of the product. Different genotypes may produce the same phenotype.

The control system is therefore able to procreate information gained from early product preparations forward in time to inform the preparation of later product preparations.

The application of these decision making algorithms to a flow system is believed to be a point of distinction for the present case.

An example of an evolutionary algorithm for use in the present case is the Nelder-Mead simplex search algorithm. Nelder-Mead is a direction-based search method (Nelder J et al. *Comput. J.* 1965, 7, 308-313) and has proven to be a popular optimization algorithm owing to its ability to explore large regions of the fitness landscape in relatively small time frames (Yu et al. *Introduction to Evolutionary Algorithms* 2010, Springer-Verlag London Limited). Nevertheless, the Nelder-Mead algorithm is capable of directing searches into local optima 'traps' when working with complex problems and multiple fitness landscapes (Moore et al. *Chemical Science* 2011, 2, 417-424). In a large number of chemical systems (in spite of the apparent complexity) optimization of parameters may be achieved with such algorithms due to the absence of local sub-optima (Moore ibid.). Thus, evolutionary algorithms can be very useful in solving problems whose inherent complexity requires the use of multi-objective optimization techniques (Coello Coello et al. *Evolutionary Algorithms for Solving Multi-Objective Problems* 2007, Springer Science+Business Media, LLC, Ed. Goldberg).

The control system will be suitably programmed to recognise whether a particular discovery process is suitable for preparing a product meeting the user specification. The control system may halt the process if it has prepared all possible combinations of chemical and physical inputs. The control system may halt the process if a set number of products has been prepared and none of these products meets the specification or comes close to doing so. The control system may also halt the discovery process if no useful or potentially useful products have been identified after a representative sample of the total product space has been explored. The representative sample is a collection of products that are well dispersed throughout the possible product space. If not one of these products meets the specification or comes close to doing so, there may be a reasonable assumption that no other product (which product would lie in-between the other dispersed products on the product map) would meet the specification or come close to doing so.

The control system may be suitably programmed to finish once a product meeting the specification has been identified. Alternatively once such a product is identified, the control system may instruct the system to produce further quantities of the product for further evaluation or for use.

Although a useful product may be identified the system may be programmed to continue with the discovery process in an attempt to identify further products meeting the specification and specifically to find products having superior characteristics over the originally identified useful product.

The requirements for the control system to halt the process may be dictated to the control system by the user prior to the initiation of the process.

It will be apparent to the skilled person that the evolutionary process will focus later product preparation on those reaction mixtures that employ chemical and physical inputs that are associated with products having the highest fitness functions. In this way, the chemical and physical inputs that provide the most promising products are permitted to survive through their use in the preparation of future products. The chemical and physical inputs that provide the least promising products are discarded, and may be regarded as weak inputs that die under the evolutionary selection process.

The control system may be provided with a suitable filter system for discarding those combinations of inputs that are associated with products having poor fitness functions. The filter system may apply a simple numerical filter in order to discount certain combinations. Alternatively, or additionally, the filter may be applied to those combinations that give rise to a product having a characteristic that does not meet a threshold value (which value may be independent of the value of that characteristic that is specified in the user specification). The application of a filter function in the evolutionary development will be familiar to those of skill in the art.

The process of the invention will typically include the preparation of many reaction mixtures and consequently many products, which may be the same or different. Before the evolutionary algorithm is able to fully drive the later preparation of products, it may be necessary to provide an initial training set of products. This training set may provide an initial indication as to what inputs may be usefully procreated in later syntheses. The training set, which is a plurality of combinations, may be based on products prepared using a series of randomly generated combinations. The combinations may be selected as a representation of the all the available combinations. Alternatively, the combinations may be selected as a cluster in the available combination space. This cluster may represent a starting point from which later evolutionary-lead combinations may develop.

The control system and the analytical system may be integrated. Thus, the decision making elements of the control system and the analytical processing elements of the analytical system may be provided on a single computer, and the software that is provided to the computer may integrate the analytical processing elements with the decision making elements.

Processing

The use of the flow chemistry system to prepare a product meeting a user specification will now be described with reference to the analytical apparatus and the control system.

The starting point for the process is the provision of a specification by the user. The requirements of that specification, expressed in terms of the physical and chemical characteristics that it is desirable for a product to possess, are provided to the control system. The control system is connected to an analytical system which is suitable for measuring the physical and chemical characteristics that are set out in the specification.

The steps taken in the process of the invention comprise the following:

(i) selecting a first combination of chemical and/or physical inputs and supplying those inputs to the reaction space, thereby to generate a first product;

(ii) analysing one or more characteristics of the product generated;

(iii) comparing the one or more characteristics against the user specification;

(iv) selecting a second combination of chemical and/or physical inputs, wherein the second combination differs from the first combination, and supplying those inputs to the reaction space, thereby to generate a product;

(v) analysing one or more parameters of the product generated;

(vi) comparing the one or more parameters generated against the user specification;

(vii) optionally repeating steps (v) to (vii) for further individual combinations of chemical and/or physical inputs.

The first preparation step in the process is the selection of a first combination of chemical and/or physical inputs and supplying these inputs to the reaction space, thereby to generate a first product. The first combination of inputs may be a known combination of inputs for providing a particular product. Subsequent changes in the inputs may then look to find alternative products having superior characteristics. Alternatively, the process may be designed to find alternative products that have comparable characteristics to the first product.

The inputs may also be randomly selected. The random selection may be made by the user as an initiation step to the process. Alternatively, the control system may randomly select the chemical and/or physical inputs.

The steps of the process relate to the generation of a first combination of inputs, then a second combination of inputs, optionally followed by the generation of further combinations of inputs. In practice, it is likely that a discovery process will use many different combinations of inputs in order to fully explore the product space. The total number of available combinations will be dictated by the number of available chemical and physical inputs, and the number of ways these may be combined.

The chemical inputs, optionally in association with physical inputs, are supplied to the reaction space to form a reaction mixture. A product is permitted to form from the reaction mixture. Thus, reagents, optionally in the presence of a catalyst, may react to form a product structure. Reaction may refer to the generation of breaking one or more chemical bonds. Typically, a chemical bond is a covalent bond. However, other bond types may be referred to, such as hydrogen bonding, metal-metal and metal-ligand bonding.

In other embodiments, the product is a composition, and is formed by the admixture of the chemical inputs.

The flow chemistry system is adapted to provide the flow conditions suitable for the formation of products. Thus, the flow channel dimensions, such as length, and flow rates are provided to allow suitable residency time to allow product formation. The flow architecture may also be suitable to permit appropriate mixing for the chemical inputs. The flow architecture may also be adapted to allow the application of physical inputs, such as heat and light, to the reaction mixture.

Optionally factors such as flow rate may be altered as physical inputs to the system, thereby to provide an evolutionary stress, which may result in the formation of alternative products.

The output from the reaction space may be collected. Preferably, the products from each combination of chemical and/or physical inputs are individually collected, and optionally purified. These products may then be analysed. Additionally or alternatively, the products exiting from the reaction space may be analysed directly, prior to collection. The output from the reaction space may be analysed directly by in-line analytical devices that are integrated with the flow chemistry system.

The system may then repeat these steps for different combinations of physical and chemical inputs. A combination may be referred to as an individual where it differs from other combinations in at least one chemical or physical input.

In the process of the invention, each combination may be different. However, the process may also repeat a particular combination of inputs. Such may be useful as a corroboration of an earlier result.

The process of the invention may be concluded when a product is identified as meeting or exceeding the specification. The process of the invention may be concluded when the control system has explored all combinations of chemical and physical inputs. The process of the invention may be concluded if the control system recognises that the fitness functions of later products do not exceed the fitness functions of earlier prepared products. Here, the system may recognise that the product characteristics have plateaued and it is unlikely that further, improved products may be prepared from the available chemical and physical inputs.

The process may be concluded after a set period of time, regardless of the fitness functions awarded to the products produced.

Exemplary Processes

As described herein, the process of the invention may be used to prepare a wide variety of polyoxometallate, including polyoxomolybdate, compounds. The process of the invention may also be used to prepare metal clusters, such as Mn clusters, as described herein. The systems described show the use of in-line UV-vis detection to provide an immediate analysis of the product mixtures produced, which may then be used to provide feedback to the synthesis of later products through appropriate changes to the chemical and physical inputs.

The exemplified processes also demonstrate the effectiveness of using a flow chemistry system to explore the formation of new products within a reaction mixture, and also to explore the effects that the reaction mixture has on the purification of that product. Thus, the inventor is also able to explore the conditions under which a product may be favourably crystallised from the reaction mixture, thereby providing desirable product in isolated, or purified, form.

The processes exemplified herein demonstrate that a flow chemistry system having multiple chemical inputs may be used to generate a variety of individual product mixtures, which are shown to contain a variety of different product structures. Thus, the flow chemistry system is demonstrably able to accommodate a wide range of inputs, which may be controlled as required, to yield the desired breadth of product mixtures. This represents an important reduction of the present system to practice.

Computer Control

The present invention provides a control system for taking the data from the analytical system and comparing it against the user specification. The control system is provided with a suitable evolutionary, or genetic, algorithm for selecting initial combinations of chemical and physical inputs, and for selecting subsequent chemical and physical inputs based on the fitness functions of the initial products against the user specification. The algorithm may be a Nelder-Mead simplex algorithm. The control system is therefore a suitably programmed computer.

The present invention provides a control system suitably programmed to control the process of the invention. Also provided is a computer implemented method for conducting the process of the invention. The computer implemented method may be provided on a suitable memory device, such as a hard disk or flash memory. The computer-implemented method may be made available via the internet.

Other Preferences

Each and every compatible combination of the embodiments described above is explicitly disclosed herein, as if each and every combination was individually and explicitly recited. Various further aspects and embodiments of the present invention will be apparent to those skilled in the art in view of the present disclosure.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

Certain aspects and embodiments of the invention will now be illustrated by way of example and with reference to the figures described above.

EXAMPLES

The following examples are provided solely to illustrate the present invention and are not intended to limit the scope of the invention, as described herein.

All chemicals were of analytical reagent grade purchased from Sigma Aldrich, Fisher Scientific and Alfa Aesar chemical companies and used as supplied, without further purification. The standard stock solutions of each reagent were prepared using standard practices and volumetric glassware. All solutions were prepared with deionised water and stored in plastic labware after preparation, except the reducing agent stocks which were freshly prepared (<1 hr) prior to each experiment run.

The reagents sodium molybdate, hydrazine and sodium dithionate, were purchased from Sigma-Aldrich and used as received.

Pump System

The pump system set-up utilized in the POM and coordination preparations included between 3 and 8 programmable syringe pumps (C3000 model, Tricontinent Ltd, CA, USA) fitted with a 5 mL syringe and a 3-way solenoid valve; a LabVIEW™-based PC interface was used for controlling the pumps. FEP plastic tubing of ⅛ inch (approx. 3 mm) outer diameter was cut to the specified lengths and connected using standard HPLC low pressure PTFE connectors and a PEEK manifold (Thames Restek, UK).

General Procedures for the Generation of Reaction Arrays

All the POM and Coordination Compound reaction arrays were carried out using the following general procedures. Stock solutions of reagents were prepared and connected to the inlets for the assigned pumps. The connective tubing and pumps for all reagents were purged with the reagent solutions (3 mL) and the reactor tubing then flushed clean with fresh solvent (20 mL). The prewritten command scripts were then executed to initiate the pumping sequence. The fifty individual reaction batches were collected, manually changing test tubes at each programmed refill point. To take account of the reactor tubing volume, the first two reaction volumes collected were always discarded and two extra volumes of solvent were used to purge the reactor line at the end of each sequence. The samples collected were then left undisturbed for the specified resting period to allow crystallization of the products.

For the {Mo154} and {Mo132} preparations, the different amounts of reagents were pumped into a 10 mL reaction vessel equipped with a magnetic stirrer (Thermo Scientific), a pH electrode (VWR International) and a UV-Vis reflection probe (TP-300). After a controlled reaction time, the UV-Vis spectrum was acquired employing an Avantes spectrometer Avaspec-2048 equipped with a DH-2000 halogen light source connected by fiber optics to a TP300 fiber probe. The pH was measured using a SevenMulti Mettler-Toledo S80. All the equipment and data were controlled and recorded using Labview™. Afterwards, the reaction mixture was extracted from the reactor and collected for further analysis using an additional pump. The reactor was washed with 6 mL of distilled water 3 times.

DLS experiments were conducted with a Malvern Nano Zetasizer equipped with a 632 nm laser and employing plastic disposable cuvettes.

Raman spectra were acquired using a LabRam from Horiba-Jobin Yvon equipped with a 532 nm laser, 50×LWD objective, 600 l/mm2 grating and 100 um hole. Under these conditions the spectral resolution was 1.7 cm$^{-1}$.

Use of Flow Chemistry System with Multiple Chemical and Physical Inputs

Described below is an autonomous flow processing system with multiple batch crystallization. The method is capable of both the rapid construction of large number reaction arrays for molecular discovery and the continuous generation of batch reactions required during scale-up. As an example, a multiple input reactor setup was used in the preparation of a selection of polyoxomolybdates (POMs) of various sizes and structural complexity; 1, $Na_8[Mo_{36}O_{112}(H_2O)_{16}].58$ $H2O=\{Mo_{36}\}$; 2, $Na_{15}[Mo^{VI}_{126}Mo^{V}_{28}O_{462}H_{14}(H_2O)_{70}]_{0.5}$ $[Mo^{VI}_{124}Mo^{V}_{28}O_{457}H_{14}(H_2O)_{68}]_{0.5}$.ca. 400 $H_2O=\{Mo154\}$; 3, $(NH_4)_{42}[Mo^{VI}_{72}Mo^{V}_{60}O_{372}(CH_3COO)_{30}(H_2O)_{72}]$.ca. 300 $H_2O$.ca. 10 $CH_3COONH_4=\{Mo_{132}\}$; 4, $Na_{12}[Mo^{VI}_{72}Mo^{V}_{30}O_{282}(SO_4)_{12}(H_2O)_{78}]$.ca. 280 $H_2O=\{Mo_{102}\}$; and 5, $Na_{48}[HxMo_{368}O_{1032}(H_2O)_{240}(SO_4)_{48}]$.ca. 1,000 $H_2O=\{Mo_{368}\}$ (see (a) Krebs et al. *Eur. J. Solid State Inorg. Chem.* 1991, 28, 883-903; (b) Müller et al. *Z. Anorg. Allg. Chem.* 1999, 625, 1187-1192; (c) Müller et al. *Angew. Chem. Int. Ed.* 1998, 37, 3359-3363; (d) Müller et al. *Angew. Chem. Int. Ed.* 2002, 41, 1162-1167).

To further demonstrate the scope of the flow chemistry system, the syntheses of a number of coordination clusters with single molecular magnetic (SMM) properties were also explored; 6, Mn3O(Et-sao)3(MeOH)3(ClO4); 7, Mn3O(Et-sao)3(tBuPy)3(ClO4); 8, Mn5O2(Et-sao)6(MeO)(H2O)(MeOH)2; and 9, Mn6O2(Et-sao)6(Piv)2(MeOH)6 (see (a) Inglis et al. *Chem. Commun.* 2008, 45, 5924-5926; (b) Inglis et al. *Dalton Trans.* 2009, 42, 9157-9168; (c) Inglis et al. *Dalton Trans.* 2009, 18, 3403-3412; (d) Kozoni et al. *Dalton Trans.* 2009, 42, 9117-9119).

The setup utilized eight programmable syringe pumps (C3000 model, Tricontinent Ltd, CA, USA), although this is readily extendable to fifteen, and a LabVIEW™-based PC interface for controlling the pumps (FIG. 1.). The pumps are independently controllable are suitable for delivering chemical inputs to a reaction space.

POM Synthesis

The reagent set chosen for POM synthesis consisted of distilled deionized water for dilution, 2.5 M Na2MoO4.2H2O as the molybdenum source, three acid sources (5.0 M HCl, 1.0 M H2SO4, and 50% AcOH), 4.0 M AcO(NH4), and two sources of reducing agent, 0.25 M Na2S2O4 and saturated (0.23 M) N2H2.H2SO4. For the simplest POM target compound, 1 {Mo36}, only three of the eight pumps were required to incrementally vary the relative flow rates of the water, molybdate and HCl stock solutions; for compounds 2 {Mo154}, 3 {Mo132}, 4 {Mo102}, and 5 {Mo368} up to five pumps were required to supply the additional reducing agent and buffer stocks. Thus, the reagent set represents the chemical inputs into the reaction space.

{Mo36}

The first reported synthesis of the {Mo36} structure by Krebs et al. involves acidifying an aqueous solution of sodium molybdate, which subsequently precipitates crystals of the target compound (Krebs et al. *Eur. J. Solid State Inorg. Chem.* 1991, 28, 883-903). However, as with most syntheses, only the best synthetic conditions are reported and the arduous work that went into finding these is little discussed, if even mentioned at all.

The initial focus of the work was therefore to prepare a flow chemistry system that could repeat this screening process, and with minimal human input. The {Mo36} structure was selected as a test compound for the "discovery array". The pumps were programmed to run at a range of flow rates, incrementally increasing both the relative ratio of acid to molybdate, and the overall reagent concentrations (two key parameters of POM formation and crystallization) throughout an experimental scan of production conditions. As shown in FIG. 2, the volume of acid with respect to Mo was varied from 0% to 90% (across rows) and the volume of additional water with respect to the total reagent volume was varied from 80% to 0% (down columns). Independent variation of these two parameters resulted in the creation of fifty distinct reaction mixtures leading to fifty product mixtures, each with the potential to crystallise the {Mo36} target. The relative flow rates and the reagent concentrations represent physical inputs into the reaction space.

The combined flow rate for all pumps running at any specific point was set to 12.5 mL min$^{-1}$ in order to maintain a consistent output flow velocity and reaction volume. The variation of the output flow composition was controlled by varying the flow rates of the individual chemical inputs relative to one another.

A length of tubing (6.22 m) of relatively wide bore (1.6 mm internal diameter) was placed after a mixing manifold to allow dissolution before collection of transient precipitates that are typically observed upon acidification of molybdate salts. The diameter was chosen to be sufficiently wide to avoid blockage of the system upon formation of such precipitates and the tubing length was chosen to coincide with the reaction volumes collected. The relative flow rates were changed every 30 s thus giving a reaction volume of 6.25 mL (i.e. ½ min×12.5 mL min$^{-1}$) for each reaction mixture, and the total volume for the tubing was 12.5 mL (i.e. 2× reaction volumes or 1 min residence time). The individual reaction mixtures were collected every 30 s with a 1.5 s delay to allow for changing of the test tubes during collection. An entire run of fifty reactions, scanning conditions from high to low dilution and high to low pH therefore took less than 35 min to complete.

Figure 3:
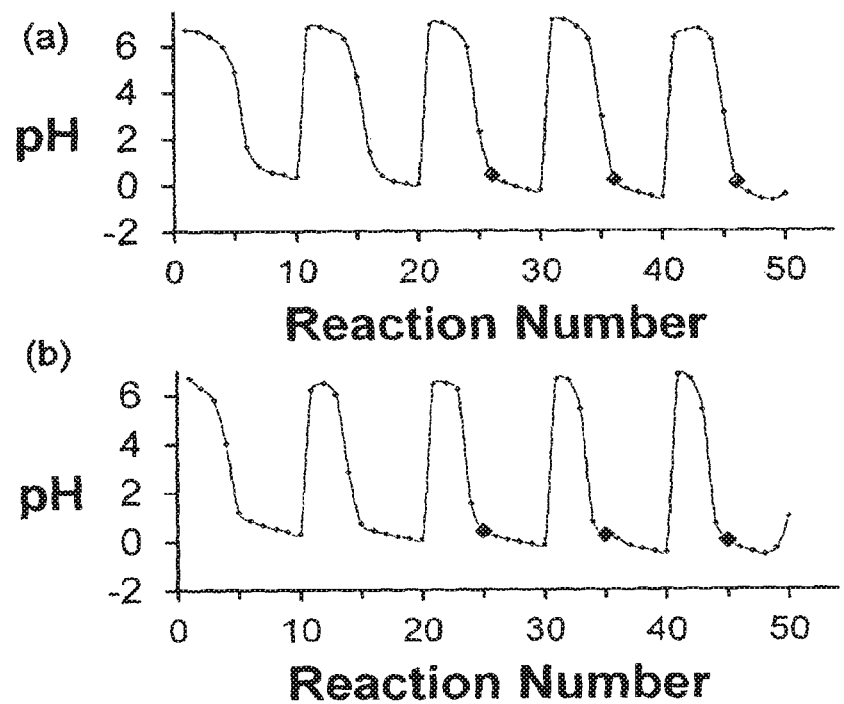
FIG. 3 shows the variation in the pH of the reaction mixture in a reaction sequence for the intended production of (a) {Mo36} and (b) {Mo154}. The pH varies periodically in all cases as the ratios of the flow rates for the acid and molybdate increase for each dilution factor. With each periodic repeat in the pH variation, the acidity of the reaction mixture is changed. Data points for reactions resulting in successful crystallization are highlighted. The reaction numbers correspond to the fractions collected from the first to fifth rows from the table of FIG. 2 (i.e. fractions 1-10 correspond to combinations aA-aJ, 11-20 to bA-bJ, 21-30 to cA-cJ, 31-40 to dA-dJ, and 41-50 to eA-eJ).

As confirmation that the reaction mixture compositions matched the theoretical values from the programmed flow rates, the pH of the individual reactions within the "discovery array" was measured immediately after collection (FIG. 3a). The pH can be seen to fluctuate from high to low periodically across the array of reactions, which maps directly to the conditions imposed by the pre-programmed screening sequence (FIG. 1.). Reaction number 1 (or aA from FIG. 2) contains no acid and the dilution factor is 8:2. Hence 80% of the reaction volume comes purely from the water stock and the remaining 20% from the 2.5 M Na$_2$MoO$_4$.2H$_2$O stock. Thus, the relatively high pH of ca. 6-7 measured is consistent with a solution of this composition.

From reactions 2-10 (or aB-aJ) the overall trend is a gradual decrease in pH as the acid content increases with respect to the Mo, with the dilution factor remaining constant at 8:2. For reaction number 11 (bA) the pH jumps back up as the flow rates revert back to 0% acid, however now at a slightly higher Mo concentration due to the decreased dilution factor of 6:4. This trend is repeated across the remainder of the array as the acid to Mo ratio and dilution factor vary as dictated by the pre-programmed screening sequence.

After leaving the solutions undisturbed and open to air for 24 hours, three out of the fifty reactions precipitated colourless columnar crystals: reaction numbers 26 (cF), 36 (dF) and 46 (eF).

Figure 14:
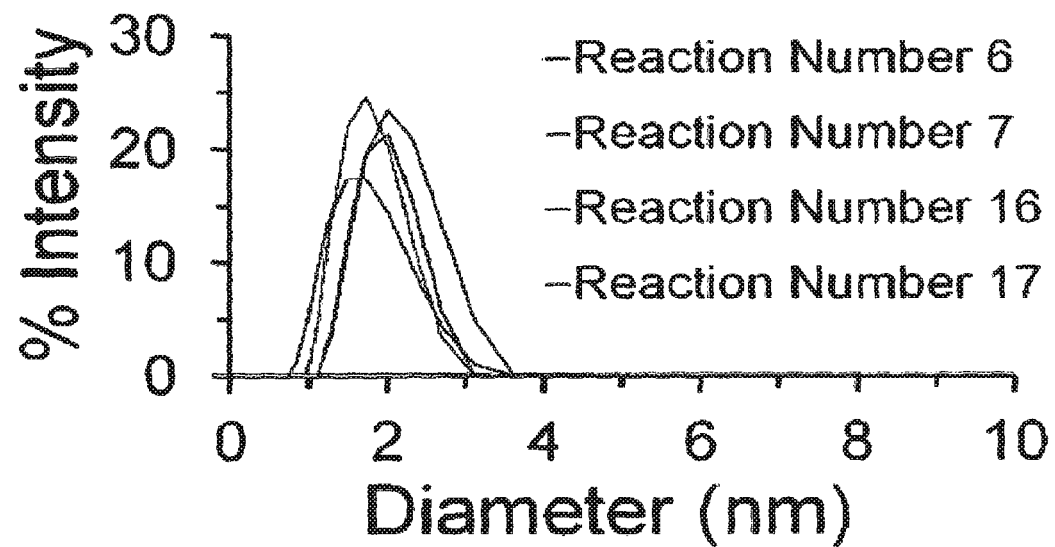
FIG. 14 is a combination of DLS plots for four reaction products in the {Mo36} discovery array (reaction numbers 6 (aF), 7 (aG), 16 (bF) and 17 (bG)). The measured particle diameters of 1.7-2 nm are a close match to the crystallographically determined cluster dimensions of {Mo36}.

Single crystal X-ray diffraction and IR spectroscopy were used to confirm the crystalline product as pure {Mo36}. The conditions leading to crystalline products have low pH and high Mo concentration, which matches the conditions reported for the traditional batch synthesis (Krebs et al. *Eur. J. Solid State Inorg. Chem.* 1991, 28, 883-903). The remaining reaction solutions remained as colourless solutions or precipitated an amorphous white powder. An attempt was made to identify the condensed molybdate species in the colourless solutions using Dynamic Light Scattering (DLS) measurements (see FIG. 14). Particle sizes of 1.7-2.0 nm were consistently observed for the more dilute solutions at low pH, indicating formation of a condensed molybdenum species of similar size to {Mo36}. Indeed, after leaving some of these solutions for a few more days, a handful of colourless columnar crystals formed, which were identified as {Mo36} by crystallographic unit cell matching.

Figure 15:
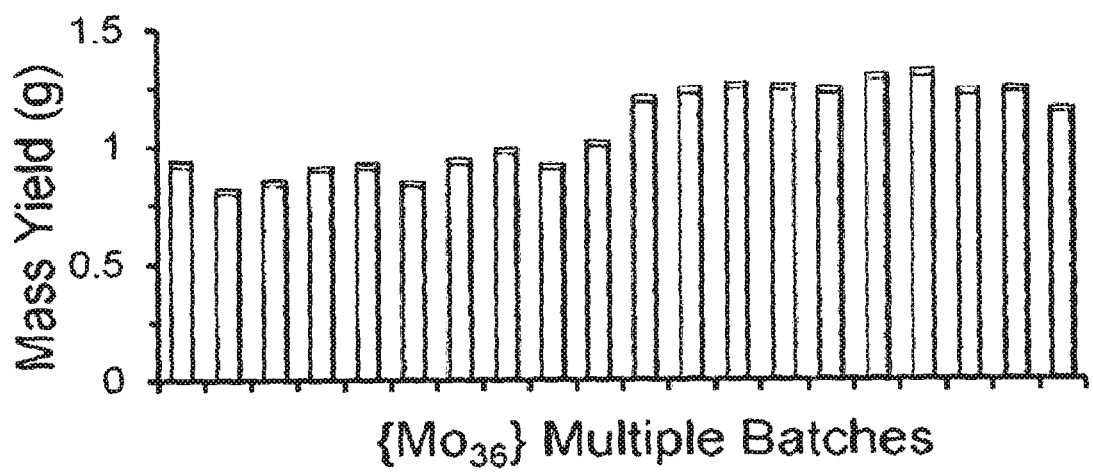
FIG. 15 gives the mass yields for {Mo36} for multiple repeated batches generated using conditions from reaction numbers 36 (left columns) and 46 (right columns). The average yield for the 10 reactions produced using conditions from reaction number 36 (dF)=924±62 mg (0.137 mmol, 78.7%). The average yield for the 10 reactions produced using conditions from reaction number 46 (eF)=1254±43 mg (0.185 mmol, 85.3%).

FIG. 15 gives the mass yields for {Mo36} for multiple repeated batches generated using conditions from reaction numbers 36 (left columns) and 46 (right columns). The average yield for the 10 reactions produced using conditions from reaction number 36 (dF)=924±62 mg (0.137 mmol, 78.7%). The average yield for the 10 reactions produced using conditions from reaction number 46 (eF)=1254±43 mg (0.185 mmol, 85.3%).

{Mo$_{154}$}

The next target structure for the discovery array setup was the reduced "molybdenum blue wheel", 2 {Mo154}, first characterized by Müller et. al. (see (a) Müller et al. *Angew. Chem. Int. Ed.* 1995, 34, 2122-2124; (b) Müller et al. *Angew. Chem. Int. Ed.* 1996, 35, 1206-1208). The reduced wheel is typically produced in batch via the partial reduction of an acidified molybdate solution with a reducing agent (such as sodium dithionite).

The flow chemistry system used above was provided with an additional pump (additional chemical input) containing a solution of 0.25 M Na$_2$S$_2$O$_4$. The pump was programmed to provide 10 mol % reducing agent with respect to the Mo source during the scan of the reaction parameters. In this process, the relative reagent ratios and levels of dilutions were also incrementally altered over the experimental run (as before, these are physical inputs to the reaction space).

The dithionite pump flow rate was set to scale directly with the molybdate pump flow rate to give a constant reduction environment for all fifty reactions. The reducing agent pump flow rate could have been set as a new physical input (i.e. variable paramater), however it is well known that increasing the reducing agent beyond 10 mol % results in increased levels of amorphous polymeric molybdenum oxide species (see Müller et al. *Z. Anorg. Allg. Chem.* 1999, 625, 1187-1192). Providing this additional input would have increased the array dimensions without increasing the potential to isolate high quality crystalline products suitable for structure determination.

A similar pattern in the measured pH values for the {Mo154} discovery array was observed. As expected, the pH fluctuates across the array as the acid content and dilution ratios vary in accordance with the pre-programmed reagent flow rates (see FIG. 3b). The fifty reactions from the array were again left undisturbed for 24 hours to allow for crystallization. Again, three out of the fifty reactions precipitated crystalline material: reaction numbers 26 (cF), 35 (dE) and 45 (eE). The remaining reactions either yielded no precipitate or gave a dark amorphous precipitate that was not suitable for crystallographic analysis.

Figure 4:
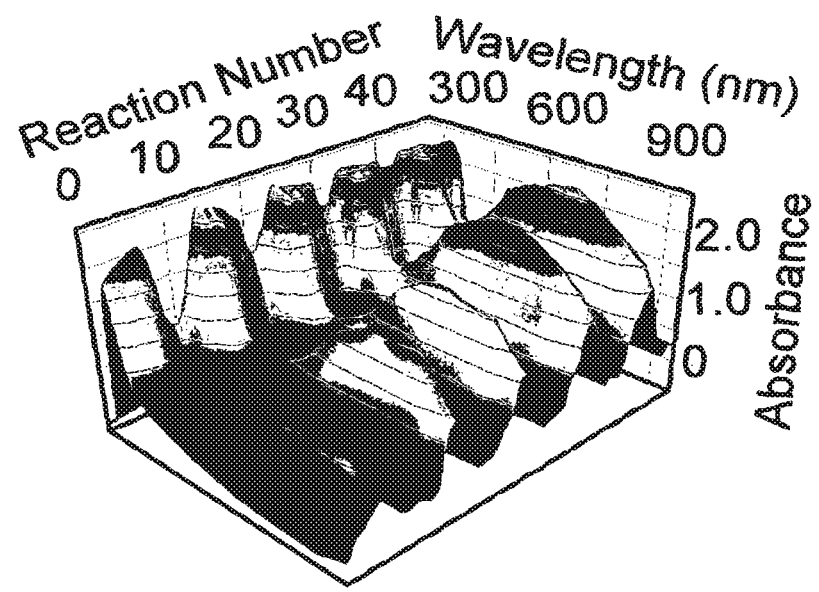
FIG. 4 shows the variation in the absorbance across a range of wavelengths for products collected in a flow synthesis of {Mo154} products. Samples were diluted in a ratio of 1:16 with distilled water and filtered before absorbance measurements. The reaction numbers correspond to the fractions collected from the first to fifth rows from the table of FIG. 2.

As before, the low pH and high Mo concentrations that led to the crystalline products were consistent with the originally reported batch conditions (Müller et al. *Z. Anorg. Allg. Chem.* 1999, 625, 1187-1192). The products were confirmed as {Mo154} by crystallographic unit cell checks, IR and absorbance spectroscopy. In addition to pH measurements, absorbance spectroscopy was also used to monitor the change in the reaction composition across the reaction array. FIG. 4 shows a 3D plot of the absorbance spectra for the 5×10 reaction array. The absorbance at ca. 750 nm (indicative of Mo-blue species) was observed to coincide with the periodic fluctuations in pH, again demonstrating that the resulting reaction conditions were consistent with the pre-programmed flow rates.

Figure 16:
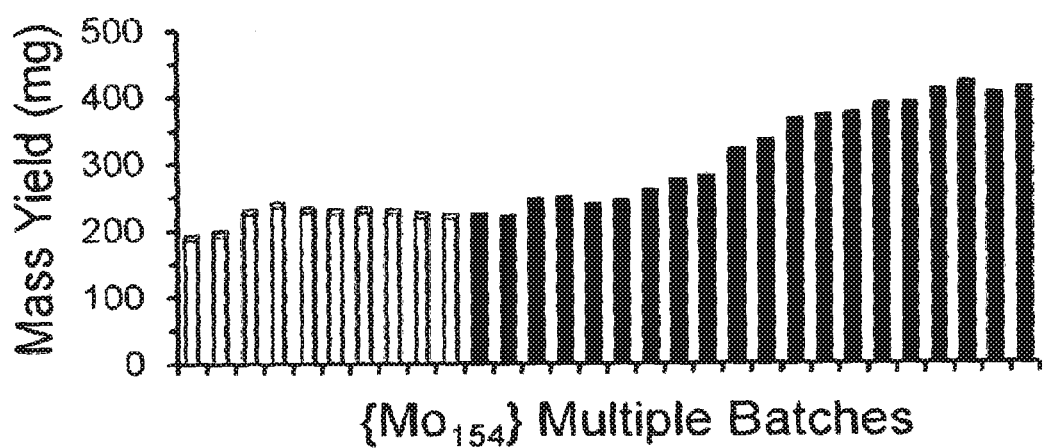
FIG. 16 gives the mass yields for {Mo154} for multiple repeated batches generated using conditions from reaction numbers 25 (left columns), 35 (middle columns) and 45 (right columns). Average yield for the 10 reactions produced using conditions from reaction number (cE)=226±16 mg (7.33×10$^{-3}$ mmol, 39.9%). Average yield for the 10 reactions produced using conditions from reaction number 35 (dE)= 257±29 mg (8.24×10$^{-3}$ mmol, 34.0%). Average yield for the 10 reactions produced using conditions from reaction number (eE)=389±27 mg (1.26×10–2 mmol, 41.1%).

FIG. 16 gives the mass yields for {Mo154} for multiple repeated batches generated using conditions from reaction numbers 25 (left columns), 35 (middle columns) and 45 (right columns). Average yield for the 10 reactions produced using conditions from reaction number (cE)=226±16 mg (7.33×10$^{-3}$ mmol, 39.9%). Average yield for the 10 reactions produced using conditions from reaction number 35 (dE)= 257±29 mg (8.24×10$^{-3}$ mmol, 34.0%). Average yield for the 10 reactions produced using conditions from reaction number (eE)=389±27 mg (1.26×10$^{-2}$ mmol, 41.1%).

{Mo$_{132}$}

Next, compound 3, the {Mo132} Keplerate spherical cluster was targeted (Müller et al. *Angew. Chem. Int. Ed.* 1998, 37, 3359-3363). The flow chemistry system used above was adapted for use in this preparation. Thus, AcOH and AcO(NH$_4$) reagent pumps were used in place of the HCl pump, and a N2H2.H2SO4 pump was used instead of the Na$_2$S$_2$O$_4$ pump. The ratio of (NH4)OAc to AcOH flow rates was set to 1:1 to provide a buffered solution of ca. pH 4.

Figure 13:
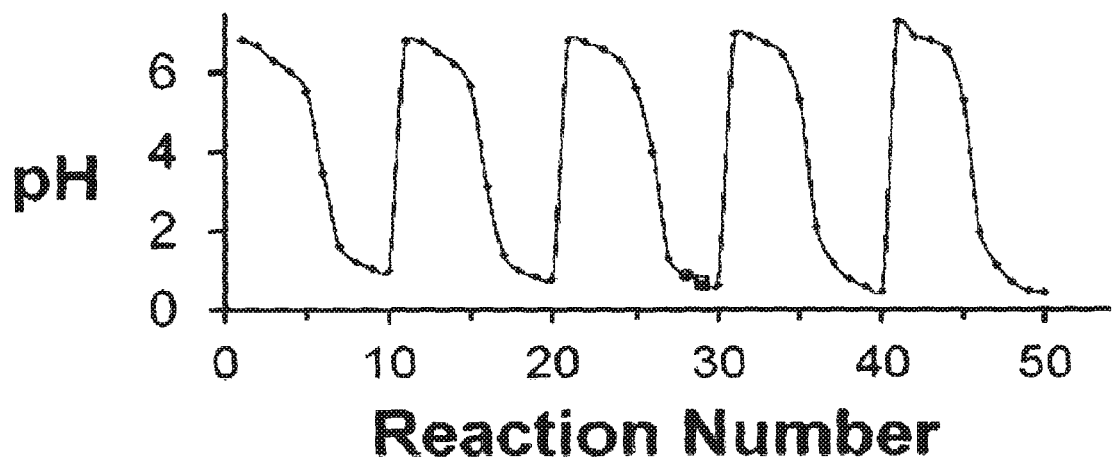
FIG. 13 shows the change in pH for the reactions across a 5×10 discovery array experiment for the preparation of {Mo102}/{Mo368}. The pH varies periodically in all cases as the ratios of the pump rates for the H2SO4/molybdate increase for each dilution factor. Data points for reactions resulting in successful crystallization are highlighted; {Mo102}=bold square; {Mo368}=bold circle. The reaction number corresponds to fractions being collected sequentially as 5 rows of 10 in the 50 reaction array (i.e. 1-10 is aA-aJ, 11-20 is bA-bJ, 21-30 is cA-cJ, 31-40 is dA-dJ, 41-50 is eA-eJ).

The discovery array experiment was run as before, altering the ratio of reduced molybdenum to buffer reagents in addition to the overall level of dilution. The amount of reducing agent was set at 20 mol % in accordance with the approximate ratio of MoV:MoVI in the {Mo132} target. The pH of the reactions within the array again varied periodically (see FIG. 13). In this reaction scan, the pH was generally kept within the narrower pH range of ca. 4-5 due to the use of the acetate buffer stocks in place of a concentrated HCl solution. Inspection of the reactions after a 4 day resting period revealed crystals of the pure {Mo132} target had formed for reaction numbers 29 (cH) and 39 (dH). The small dark brown polyhedral crystals were confirmed as {Mo132} by crystallographic unit cell checks, IR and visible absorbance spectroscopy (Müller et al. *Angew. Chem. Int. Ed.* 1998, 37, 3359-3363).

Compounds 4 and 5 were isolated from the same reaction screen under conditions where the dithionite reducing agent was set at 10 mol % and the ratio of reduced molybdate to H2SO4 was varied across the scan. The original target for this discovery array scan was in fact compound 5, the {Mo368} "lemon", as proof that some of the most complex POM structures could be accessed using this screening methodology (Müller et al. *Angew. Chem. Int. Ed.* 2002, 41, 1162-1167). However in addition to finding conditions that successfully crystallized this product (Fraction 28, cI), conditions which crystallized 4, a {Mo102} Keplerate, directly from the reaction solution were also found (Fraction 29, cJ) (see (a) Müller et al. *Angew. Chem. Int. Ed.* 2000, 39, 1614-1616; (b) Müller et al.*Angew. Chem. Int. Ed.* 2003, 42, 2085-2090; (c) Henry et al. *J. Mol. Liq.* 2005, 118, 155-162)).

Figure 17:
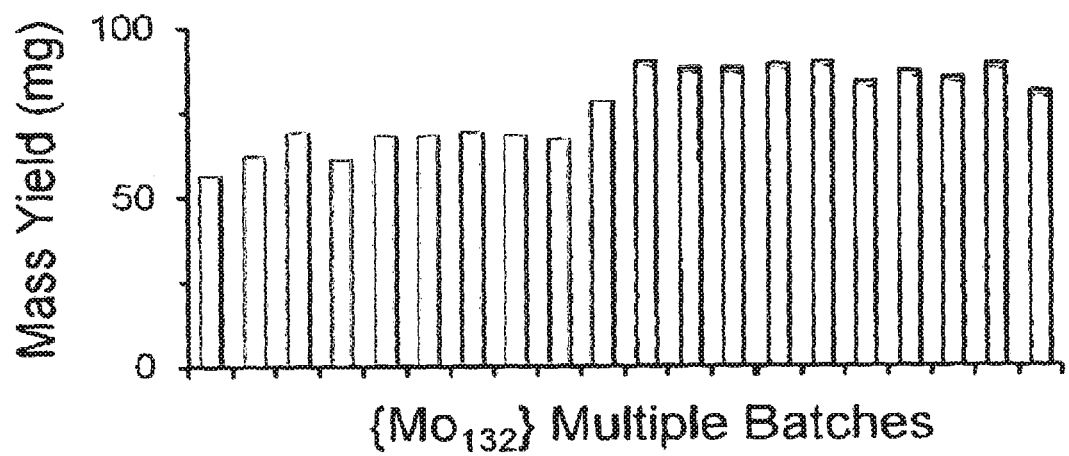
FIG. 17 gives the mass yields for {Mo132} for multiple repeated batches generated using conditions from reaction numbers 29 (left columns), 39 (right columns). The average yield for the 10 reactions produced using conditions from reaction number 29 (cI)=67±6 mg (2.34×10$^{-3}$ mmol, 49.4%). Average yield for the 10 reactions produced using conditions from reaction number 39 (dI)=87±3 mg (3.04× 10$^{-3}$ mmol, 48.2%).
Figure 18:
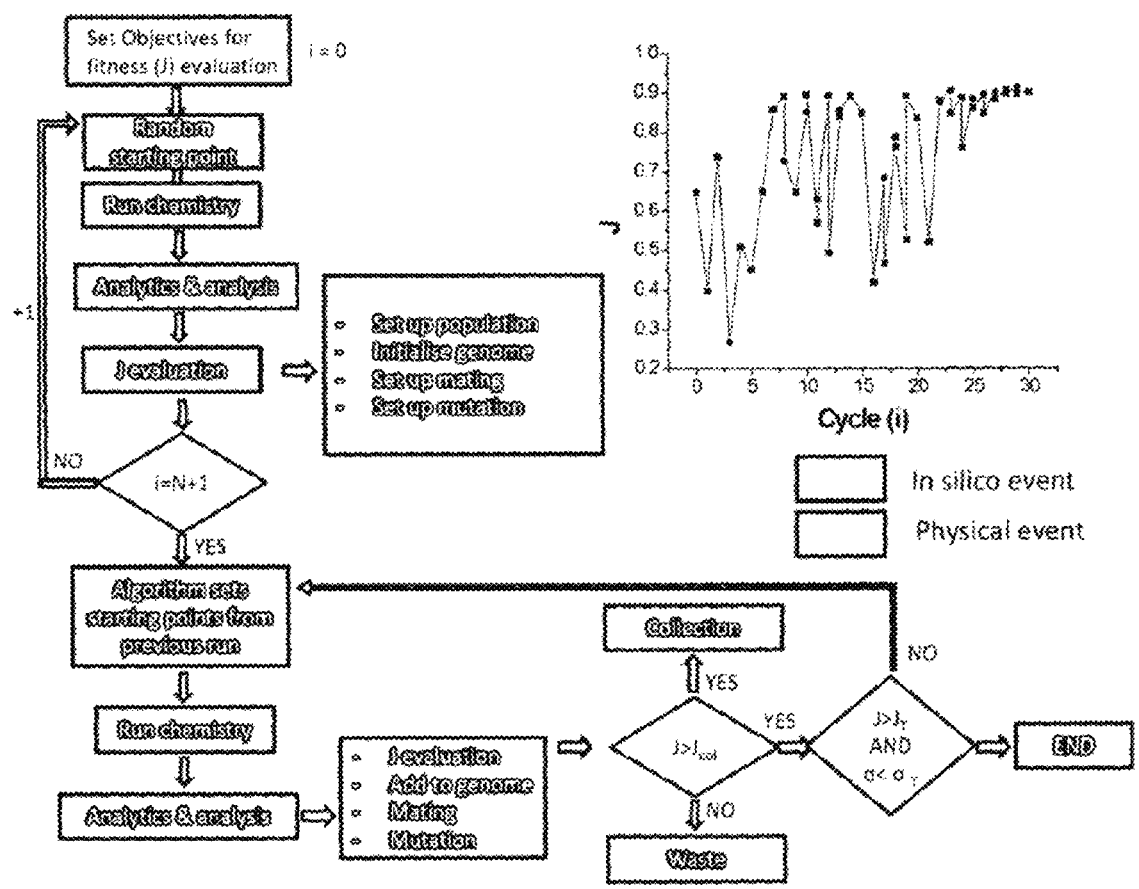
FIG. 18 is a flow diagram setting out the sequence of steps for a method according to an embodiment of the invention. Inset to the flow diagram is a graph showing the increase in the fitness function J at higher cycles of the chemistry loop (bottom loop with run chemistry step). The flow diagram shows the computational and physical flow of the system from the starting point where the fitness objectives are set, a random starting point for the processing followed by the chemistry, analytical measurements and analysis, J evaluation, collection, iteration in a loop until the fitness objectives are achieved.

FIG. 17 gives the mass yields for {Mo132} for multiple repeated batches generated using conditions from reaction numbers 29 (left columns), 39 (right columns). The average yield for the 10 reactions produced using conditions from reaction number 29 (cI)=67±6 mg (2.34×10$^{-3}$ mmol, 49.4%). Average yield for the 10 reactions produced using conditions from reaction number 39 (dI)=87±3 mg (3.04×10$^{-3}$ mmol, 48.2%).

General Reaction Conditions

According to the volume of each reagent dispensed for each reaction number, theoretical compositions and product yields were calculated for successful reactions as follows:

{Mo36}, reaction number 26 (cF) was made up of H2O (2.5 mL), 2.5 M Na2MoO4 (1.875 mL) and 5.0 M HCl (1.875 mL) and produced large colourless columnar single crystals of {Mo36} (unit cell match) after resting for 2 days (284 mg, 4.12×10–2 mmol, 31.6%).

{Mo36}, reaction number 36 (dF) was made up of H2O (1.25 mL), 2.5 M Na2MoO4 (2.5 mL) and 5.0 M HCl (2.5 mL) and produced large colourless columnar single crystals and branched aggregates of {Mo36} (unit cell match) after resting for 2 days (995 mg, 0.147 mmol, 84.7%).

{Mo36}, reaction number 46 (eF) was made up of 2.5 M Na2MoO4 (3.125 mL) and 5.0 M HCl (3.125 mL) and produced large colourless columnar single crystals and branched aggregates of {Mo36} (unit cell match) after resting for 2 days (1.25 g, 0.185 mmol, 85.2%).

{Mo154}, reaction number 25 (cE) was made up of H2O (2.5 mL), 2.5 M Na2MoO4 (1.125 mL), 0.25 M Na2S2O4 (1.125 mL) and 5.0 M HCl (1.5 mL) and produced large black-blue square single crystals of {Mo154} (unit cell match) after resting for 2 days (221 mg, 7.17×10–3 mmol, 39.0%).

{Mo154}, reaction number 35 (dE) was made up of H2O (1.25 mL), 2.5 M Na2MoO4 (1.5 mL), 0.25 M Na2S2O4 (1.5 mL) and 5.0 M HCl (2.0 mL) and produced large black-blue square single crystals of {Mo154} (unit cell match) after resting for 2 days (297 mg, 9.63×10–3 mmol, 39.3%).

{Mo154}, reaction number 45 (eE) was made up of 2.5 M Na2MoO4 (1.875 mL), 0.25 M Na2S2O4 (1.875 mL) and 5.0 M HCl (2.5 mL) and produced large black-blue square single crystals (plus a small amount of powdery precipitate) of {Mo154} (unit cell match) after resting for 2 days (368 mg, 1.19×10–2 mmol, 38.9%).

{Mo132}, reaction number 29 (cI) was made up of H2O (2.5 mL), 2.5 M Na2MoO4 (0.25 mL), 0.23 M N2H4.HSO4 (0.5 mL) 50% AcOH (1.5 mL) and 4.0 M AcO(NH4) (1.5 mL) and produced small brown cubic single crystals of {Mo132} (unit cell match) after resting for 4 days (61 mg, 2.13×10–3 mmol, 45.0%).

{Mo132}, reaction number 39 (dI) was made up of H2O (1.25 mL), 2.5 M Na2MoO4 (0.333 mL), 0.23 M N2H4.HSO4 (0.667 mL) 50% AcOH (2.0 mL) and 4.0 M AcO(NH4) (2.0 mL) and produced small brown cubic single crystals of {Mo132} (unit cell match) after resting for 4 days (87 mg, 3.04×10–3, 48.2%).

{Mo102}, reaction number 29 (cI) was made up of H2O (2.5 mL), 2.5 M Na2MoO4 (0.375 mL), 0.25 M Na2S2O4 (0.375 mL) and 1.0 M H2SO4 (3.0 mL) and produced large black-blue square single crystals of {Mo102} after resting for 2 weeks (5.2 mg, 2.345×10–4 mmol, 2.5%).

{Mo368}, reaction number 28 (cH) was made up of H2O (2.5 mL), 2.5 M Na2MoO4 (0.562 mL), 0.25 M Na2S2O4 (0.562 mL) and 1.0 M H2SO4 (2.625 mL) and produced small black-blue elongated hexagon single crystals of {Mo368} (unit cell match) after resting for 2 weeks (12 mg, 1.5×10–4 mmol, 3.9%).

{Mo154} with Parallel UV-vis Analysis

Aliquots (0.2 mL) of each reaction collected for the {Mo154} discovery array were diluted with fresh deionised water (3 mL) and the UV spectra immediately measured. The complete dataset of 50 spectra was then used to compile the 3D spectrum shown herein.

Analysis

X-ray diffraction structure analysis and crystallographic data: Suitable single crystals were selected and mounted onto the end of a thin glass fibre using Fomblin oil. X-ray diffraction intensity data for compound 4 and 8 were measured on an Bruker Apex II Quasar x-ray Diffractometer with enhanced x-ray beam [λMo-Kα=0.71073 Å, graphite monochromated] at 150 K. Data reduction was performed using the Apex2 software package and structure solution and refinement were carried out using SHELXS-97 and SHELXL-97 via WinGX. Corrections for incident and diffracted beam absorption effects were applied using analytical numeric absorption correction using a multifaceted crystal model.

In the crystal structure of {Mo102}, the Mo atom positions are fairly well defined position disorder of the sulfate ligands. Oxo and sulfate ligands on the cluster, solvent molecules and Na atoms are difficult to fully resolve by crystallography alone. Therefore, the final molecular formula has been determined by a combination of elemental analysis, thermogravimetric analysis and crystallography. Due to the large solvent content of the structure the reflection data is weak which give rises to several checkcif alerts. The data has been collected several times on multiple batches, and the structure is very well defined and reproducible.

In the {Mn5}, all atoms on the clusters were very well defined with disorder only in solvent part, and the main structure is very well defined. The overall compound formula was determined majorly by crystallography and CHN analysis. Bond valence calculations were performed to determine the oxidation states of Mn centers.

X-Ray Data

H716Mo102Na12O688S12, Mr=22176.2 g mol-1; crystal size 0.09×0.08×0.04 mm3; hexagonal system, space group, R-3m, a=32.2189(13), c=54.059(2) Å, V=48598(4) Å 3, Z=3, T=

150 K, ρcalcd=2.273 g cm$^{-3}$, μ(Mo Kα)=2.078 mm$^{-1}$, 113168 reflections measured, 10858 unique (Rint=0.177) which were used in all calculations; structure solution and refinement were performed using WINGX. Final R1=0.121 and wR2=0.389 (all data).

C60H78Mn5N6O21, Mr=1493.98 g mol$^{-1}$; crystal size 0.30×0.10×0.04 mm$^3$; Orthorhombic system, space group, Pca21, a=22.3613 (3), b=15.2985 (3), c=42.4185 (7) Å, V=14511.1 (4) Å 3, Z=8, T=150 K, ρcalcd=1.368 g cm−3, μ(Mo Kα)=0.917 mm−1, 55250 reflections measured, 22958 unique (Rint=0.054) which were used in all calculations; structure solution and refinement were performed using 5 WINGX[S4]. Final R1=0.065 and wR2=0.188 (all data).

Elemental Analysis of Compounds—Calcd. (Found)

[Mn3O(C9H9NO2)3(OH2)3(ClO4)], C, 39.36 (39.53), H, 4.04 (4.01), N, 5.10 (5.13);

[Mn3O(C9H9NO2)3(C9H13N)3(ClO4], C, 55.18 (55.19, H, 5.66 (5.68), N, 7.15 (7.19);

[Mn5O2)C9H9NO2)6(CH3O)(H2O)3], C, 48.19 (47.24), H, 4.63 (4.24), N, 6.13 (5.94);

[Mn6O2(C9H9NO2)6(C5H9O2)2(H2O)6], C, 46.56 (46.99) H, 5.13 (4.62), N, 5.09 (5.15).

Yields

The preparation of crystals of compounds 1 to 5 provided a direct link to the flow rates used to generate the solutions from which the target compounds crystallized. Thus the pumps could then be programmed to run at these rates in a repetitive fashion, collecting multiple batches of each of the desired solution compositions, thereby directly scaling-up the production of each of the target products.

Over the multiple batches of crystallizations collected for compounds 1-3 the yields of crystalline material obtained remained consistently high throughout each set of batches. The average yield of {Mo36} from repeated batches of conditions 36 (dF) was 78.7±5.3% over 10 reactions, the average yield of {Mo154} from repeated batches of conditions 25 (cE) was 39.9±2.8% over 10 reactions, and the average yield of {Mo132} from repeated batches of conditions 29 (cI) was 49.4±4.4% over 10 reactions. This is consistent with the single batch procedures previously reported in the literature (see (a) Inglis et al. *Chem. Commun.* 2008, 45, 5924-5926; (b) Inglis et al. *Dalton Trans.* 2009, 42, 9157-9168; (c) Inglis et al. *Dalton Trans.* 2009, 18, 3403-3412; (d) Kozoni et al. *Dalton Trans.* 2009, 42, 9117-9119). The individual batch yields are shown in FIGS. 15-17.

Coordination Compounds

To further demonstrate the general scope of the combined discovery and scale-up approach to synthesis, a range of coordination compounds was targeted. The compounds selected were of the form: $Mn_3O(Et-sao)_3(MeOH)_3(ClO_4)$ 6, $Mn_3O(Et-sao)_3(tBuPy)_3(ClO_4)$ 7, $Mn_5O_2(Et-sao)_6(MeO)(H_2O)(MeOH)2$ 8, and $Mn_6O_2(Et-sao)_6(Piv)_2(MeOH)_6$ 9. These compounds are notable for their interesting magnetic properties as the oxime-based {Mn3} to {Mn6} clusters have been known to exhibit single molecule magnetic (SMM) behavior (see (a) Inglis et al. *Chem. Commun.* 2008, 45, 5924-5926; (b) Inglis et al. *Dalton Trans.* 2009, 42, 9157-9168; (c) Inglis et al. *Dalton Trans.* 2009, 18, 3403-3412; (d) Kozoni et al. *Dalton Trans.* 2009, 42, 9117-9119). The synthesis and physical analysis of SMMs is an area of intensive research within coordination chemistry due to the potential applications these materials may have in information storage, molecular spintronics, quantum computing and magnetic refrigeration (see (a) Bogani et al. *Nat. Mater.* 2008, 7, 179-186; (b) Evangelisti et al. *J. Mater. Chem.* 2006, 16, 2534-2549; (c) Zheng et al. *J. Am. Chem. Soc.* 2012, 134, 1057-1065; (d) Leuenberger et al. *Nature* 2001, 410, 789-793; (e) Lehmann et al. *Nat. Nano* 2007, 2, 312-317; (f) Karotsis et al. *J. Am. Chem. Soc.* 2010, 132, 12983-12990). However as with POMs, this increased attention has not led to the development of new synthetic methods outwith standard bench-top batch procedures, despite SMM discovery and synthetic scale-up being a major bottleneck preventing the wider exploitation and investigation of such systems.

Figure 5:
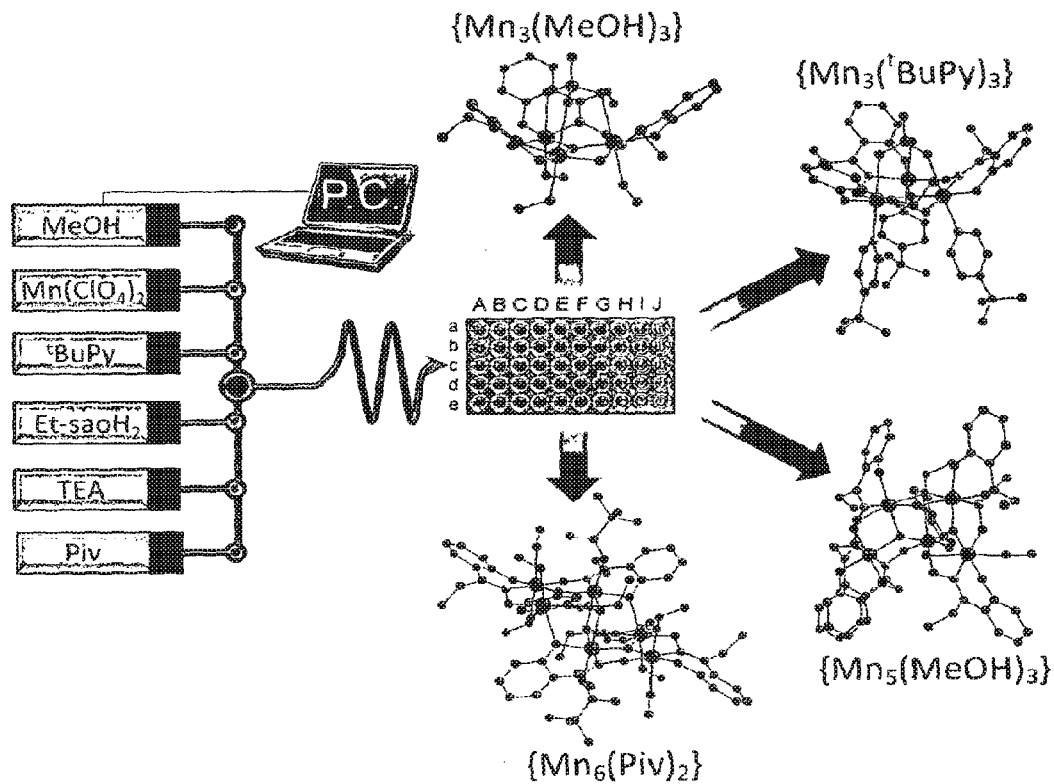
FIG. 5 is a schematic of a flow chemistry system for use in the process of the invention. The system illustrated is for use in the preparation of Mn clusters. The system is shown with a series of chemical inputs in fluid communication and under the control of a computer control system (left). The products from individual combinations of chemical inputs are collected separately in a 5×10 grid of test tubes (middle). The Mn clusters identified are shown as ball and stick representations where Mn, magenta; Cl, green; N, light blue; O, red; C, grey; and hydrogen atoms are omitted for clarity. The analytical system is not shown.

The flow chemistry system used, comprising pumps and tubing, remained unchanged from the previous POM examples, with the exception that the POM reagent set (i.e. the chemical inputs) was replaced by a set relevant to the various SMM syntheses (see FIG. 5). The reagent set chosen for the SMM syntheses consisted of reagent grade MeOH for dilution; 0.5 M Mn(ClO4)2.6 H2O in MeOH as the Mn source; 0.5 M triethylamine (TEA) in MeOH as the base; and 0.25 M ethyl salicyloxime (Et-saoH2) in MeOH, 1.5 M 4-tert-butylpyridine (tBuPy) in MeOH, 0.125 M pivalic acid (Piv) in MeOH, and 0.125 M 2-hydroxymethylpyridine (HMP) in MeOH as ligands. Similar to the POM-based processes, the family of coordination clusters was obtained in a straight forward and rapid fashion.

Mn3O(Et-sao)3(MeOH)3(ClO4)

Figure 6:
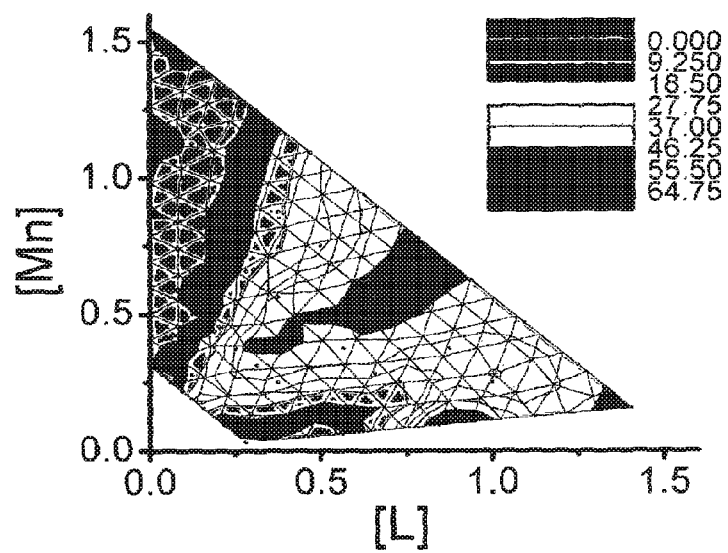
FIG. 6 is a contour plot of percentage yield of Mn$_3$O(Et-sao)3(MeOH)3(ClO4) (6) as a function of Mn concentration ([Mn]) and ligand concentration ([L]). The trend shows that optimum yields are obtained where the ratio of [Mn] to [L] is 1:1 and each is present at a concentration greater than 0.25 mol L$^{-1}$. Mn$_3$O(Et-sao)3(MeOH)3(ClO4) is prepared in the flow chemistry system of FIG. 5.

To scan the reaction parameters surrounding the SMM compound Mn3O(Et-sao)3(MeOH)3(ClO4) (6), a similar scanning program to the POM discovery was applied. The starting point (reaction number 1, aA) was set at an initial dilution ratio of 8:2 (i.e. 80% MeOH and 20% reagent solutions, by volume), the Mn to TEA ratio was set at a constant 1:1 ratio by volume, and the Et-saoH2 ligand was initially set at 0%. The Et-saoH2 content, with respect to Mn, was then increased to 90% by volume in increments of 10% across the first row. The second row (row b) in the array began with the dilution ratio set to 6:4 and the Et-saoH2 content reset to 0%. The ratio of Et-saoH2 with respect to TEA and Mn then increased across each row of the array as the dilution factor decreased down the columns. Surprisingly, almost half of the fifty reactions in the array resulted in the formation of dark square/rectangular block crystals after resting for 4 to 5 days (characterized as compound 6 via crystallographic unit cell checks and CHN elemental analysis). Due to the large number of successful crystallizations from the array, a yield map for the product was calculated based on the theoretical Mn content for each reaction (see FIG. 6). Inspection of the yield map graphic shows a general trend of product yield increasing with concentration, but only whilst the ligand to Mn ratio is maintained at 1:1. This is consistent with the product structure and with the conditions of the originally reported batch preparation (see Inglis et al. *Chem. Commun.* 2008, 45, 5924-5926).

Other Clusters

To extend the cluster process, similar flow chemistry systems were set up for compound 7, Mn3O(Et-sao)3(tBuPy)3(ClO4), compound 8, Mn5O2(Et-sao)6(MeO)(H2O)(MeOH)2 and compound 9, Mn6O2(Et-sao)6(Piv)2(MeOH)6.

For compound 7, the starting point (reaction number 1, aA) was set at an initial dilution ratio of 8:2 (i.e. 80% MeOH and 20% reagent solutions by volume), the ratio of Et-saoH2 to Mn to TEA was set at a constant 2:1:1 by volume, and the amount of ligand with respect to Mn was initially 0%. Variation of the tBuPy amount (by volume, with respect to Mn) and the dilution ratio subsequently led to the successful crystallization of compound 7 for a number of reactions in the array output.

Compounds 8 and 9 were similarly obtained by variation of the other ligand sources with respect to Et-saoH2, Mn and TEA inputs.

Conclusions

Described above is a flow chemistry system for the molecular discovery of inorganic clusters. The system uses automated adjustment of flow rates of the chemical input reagent solutions. The system also permits desirable products to be scaled-up immediately after identification.

A selection of highly challenging nanoscale polyoxomolybdate structures were synthesised as an initial proof of concept for the automated discovery of directly scalable reaction conditions. Application of the synthetic approach to obtain a small family of oxime-based Mn SMMs further demonstrates the scope for the possible expansion and use of this technology across the entire field of coordination chemistry. The ability to use such methods in cluster synthesis demonstrates the potential of this approach to revolutionise the way in which complex supermolecular and supramolecular systems are discovered and their syntheses optimised. As described herein, and exemplified below, the adoption of this technology, together with online solution-based analytical techniques (see (a) Lange et al. *Chemical Science* 2011, 2, 765-769; (b) McMullen et al. *Angew. Chem. Int. Ed.* 2010, 49, 7076-7080; (c) Parrott et al. *Angew. Chem. Int. Ed.* 2011, 50, 3788-3792; (d) Rasheed et al. *Angew Chem. Int. Ed.* 2011, 50, 357-358; (e) Miras et al. *Science* 2010, 327, 72-74), leads to a fully automated reaction setup capable of the discovery, optimisation and scale-up of syntheses of desirable products, such as inorganic nanomaterial systems and complex organic reaction systems.

Self-Assembled Nanoclusters

Described below is a process for the preparation of self-assembled nanoclusters with minimum human input. The use of a computer-controlled evolutionary algorithm is a key enabling technology for the development of self-assembled nanostructures in an evolutionary fashion. Starting from a random basis, and without any previous information, the system evolves following a mechanism of 'survival of the fittest' towards a product that satisfies the requirements of the user. As a proof of concept, the inventor has developed a set-up where a fully automated system controlled by a simplex based algorithm is capable of synthesizing two different complex POMs with minimum human interaction.

In-situ analytical techniques have been developed to monitor the reaction product mixture, providing feedback to a control system operating with an evolutionary algorithm, where the control system is capable of decision making to direct later preparations. The chemical fitness landscape corresponding to the reaction conditions necessary to self-assemble each compound has been determined. This is believed to be the first example of a process where an evolutionary algorithm has been employed to direct the synthesis of self-assembled nanomaterials.

Figure 20:
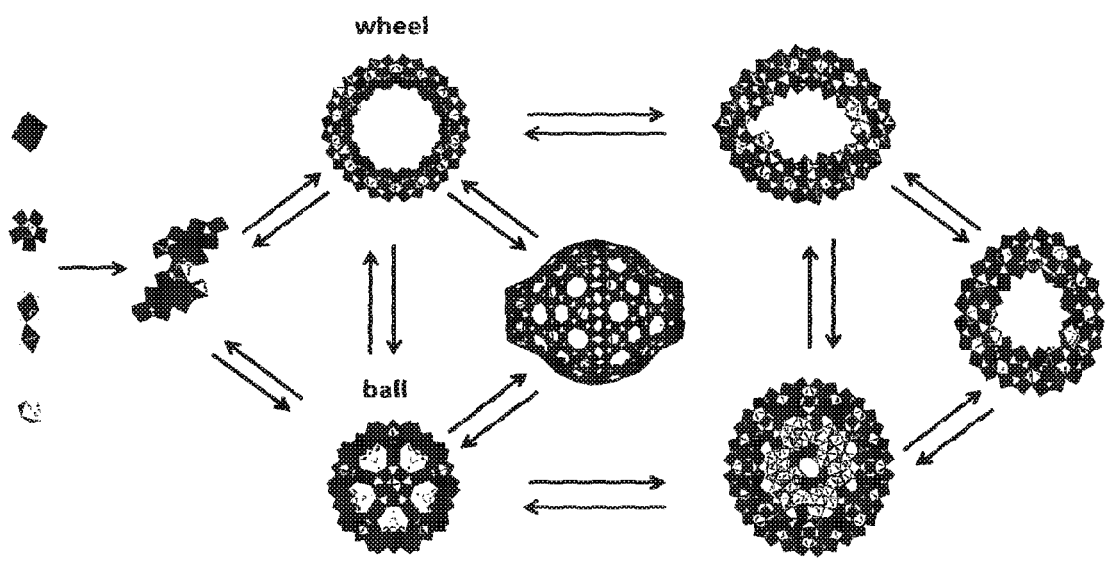
FIG. 20 shows the structures of a sample of the vast library of metal oxide POMs including the Molybdenum wheel {Mo$_{154}$} and the Keplerate ball {Mo$_{132}$} of FIG. 7, which are prepared from the experimental set-up of FIG. 19. The clusters are all made of Mo-oxide with different building block types shown by the variously coloured polyhedra.

In this example it is shown that it is possible to use a computer controlled reaction system to selectively produce two different complex self-assembled nanostructured materials from a vast combinatorial library of other possibilities, such as shown in FIG. 20. In this system two polyoxometalates (POMs), namely the big Molybdenum wheel $\{Mo_{154}\}$ and the Keplerate ball $\{Mo_{132}\}$ have been synthesized using minimum human input.

In different reaction set-ups, three and four parameters, consisting of the building blocks of the POMs, were simultaneously optimized employing a direction-based Nelder-Mead simplex algorithm to selectively produce each compound. In-situ UV-Vis spectroscopy and pH measurements were employed to monitor the progress of the reactions. The acquired data was used to calculate the fitness of each cycle of evolution and this was fed into the algorithm to intelligently evolve towards the desired product.

Figure 19:
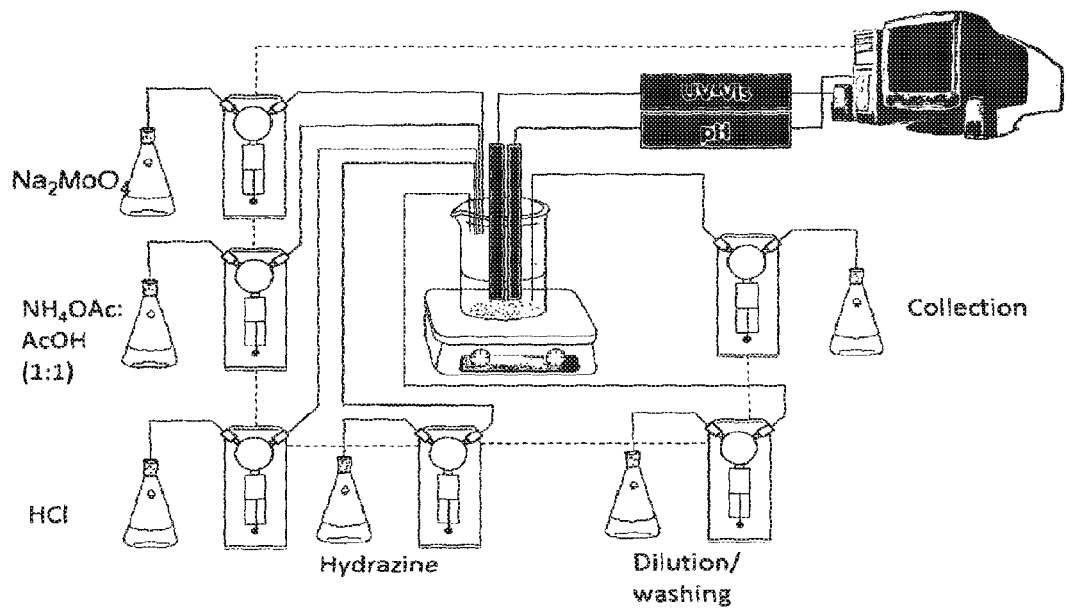
FIG. 19 is a schematic of the experimental set-up for the evolutionary synthesis of the self-assembled nanoclusters, the Molybdenum wheel {Mo$_{154}$} and the Keplerate ball {Mo$_{132}$} of FIG. 7.

The fitness function for the wheel is optimal at pH 1 and the colour is blue, and the fitness function for the ball is optimal at pH 4 and the colour is brown. Both parameters were normalized and aggregated to confirm a single objective optimization problem. Additional characterization by DLS and Raman spectroscopy validated the experimental results. The schematic of the flow system set up is shown in FIG. 19.

Targets

Figure 7:
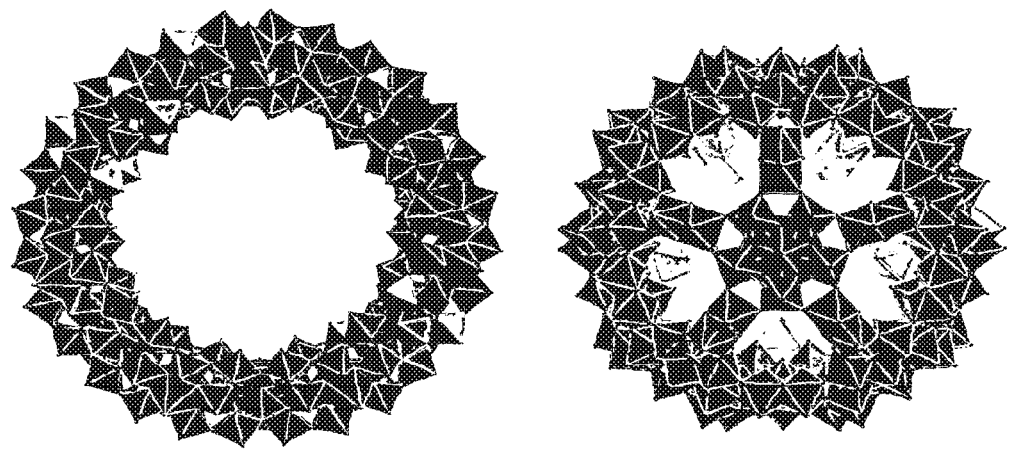
FIG. 7 shows the structures corresponding to the polyoxometalate structures synthesized in one example of the invention. Left: {Mo154} wheel. Right: {Mo132} keplerate. See also Müller et al. *Acc. Chem. Res.* 1999, 33, 2-10 and Müller et al. *Angew. Chem. Int. Ed.* 1995, 34, 2122-2124.

In a parallelism to natural evolution the chromosome in the system is composed of four parameters, or genes. These parameters include the four chemical inputs required to synthesize the different products, namely molybdenum, acid, reducing agent and buffer. An aqueous solution of Na2MoO4.2H2O was employed as a source of molybdenum; Na2S2O4 and hydrazine were employed as reducing agents. The pH was regulated by means of HCl and a buffer solution formed by mixing AcOH and NH4OAc. The target polyoxometallates were 10 Na15[MoVI126MoV28O-462H14(H2O)70]0.5[MoVI124MoV28O457H14(H2O)68] 0.5.ca. 400 H2O, referred to as $\{Mo154\}$, and 11 (NH4)42[MoVI72MoV60O372(CH3COO)30(H2O)72] .ca. 300H2O.ca. 10 CH3COONH4, referred to as $\{Mo132\}$ (see FIG. 7).

Process Steps

Initially, random amounts of the chemical inputs were mixed in the reaction space. The addition speed was linked to the volume introduced to ensure that all the reagents were mixed at the same time, eliminating mixing problems. This process was repeated N+1 time (where N is the number of chemical inputs i.e. the number of pumps). Afterwards, the system was allowed to decide the amounts of reagents to be added into the reaction space. Each pump was allowed to provide to any reaction mixture any volume of reagent ranging from 0 to 5 mL. This may be regarded as a further and physical input into the system.

TABLE 1

Different experimental set-up employed for the synthesis of POMs

| | | Concentration (M) | | |
|---|---|---|---|---|
| Pump | Reagent | Set-up A | Set-up B | Set-up C |
| 1 | Na$_2$MoO$_4$•2H$_2$O | 0.02 | 0.04 | 0.5 |
| 2 | HCl | 0.08 | — | 1 |
| 3 | HOAc:NH$_4$OAc[a] | — | 6.13[b] | 6.13[b] |
| 4 | Reducing agent[c] | 0.004 | 0.008 | 0.23 |

[a]AcOH (50%):NH4OAc (4M) (1:1 v:v).
[b]Concentration is calculated as the molar sum of both compounds.
[c]In set-up A and B, the reducing agent employed was an aqueous solution of sodium dithionate. In set-up C a saturated aqueous solution of hydrazine sulphate was employed.

Initially, each compound was synthesized varying three parameters only as shown in Table 1 above for set-ups A and B. Three chemical inputs (three pumps) were employed using, initially, relatively dilute conditions. The reaction mixture for set-up A consisted of a combination of aqueous solutions of the molybdenum source, HCl and sodium dithionate (as the reducing agent). Set-up B was very similar, changing the acid solution with the buffer, which was obtained by mixing a solution of AcOH (50%) and NH4OAc (4M) (1:1 v:v).

UV-Vis spectroscopy was selected as the analytical system to characterise the reaction and to calculate the fitness function, denoted by J1. Relatively diluted conditions were needed to obtain suitable spectra. The fitness function was based on a single measurement. Indeed, it was defined as $$I_1 = A_{max} - A_{min} \qquad [1]$$

where Amax and Amin correspond to the absorbance at the wavelengths where the compounds are expected to absorb. By definition, the simplex algorithm is designed to minimize functions. Nevertheless, in this system the aim was to maximize the amount of compounds 10 and 11. Therefore, the algorithm was modified to maximize the fitness function.

The pH of the different reaction mixtures was studied for two reasons. In the first place, it gives information about the pH range in which each compound is formed. This information was employed later when a higher number of parameters were simultaneously optimized. Moreover, as the compound preparations have been well described in the literature, the pH was monitored to validate the results of the optimization.

{Mo154}

Figure 8:
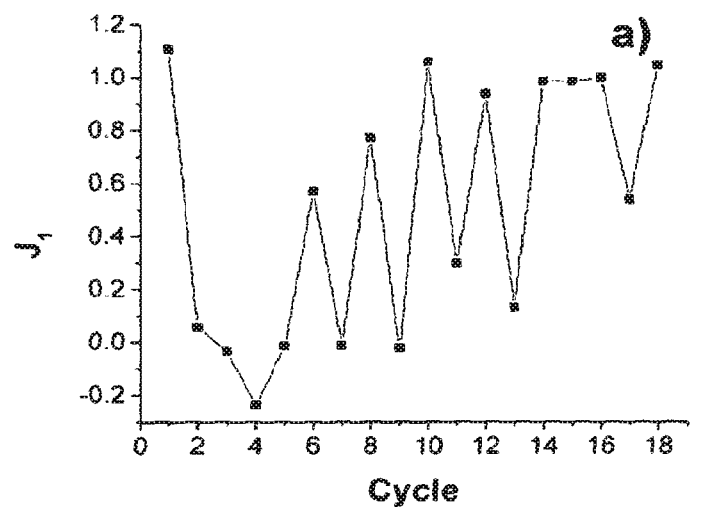
FIG. 8(*a*) shows the variation in J1 values for 18 products obtained in the synthesis of a {Mo154} wheel using a flow chemistry system of the invention with a UV-Vis detection system (a). An example of a complete UV-Vis spectrum of the {Mo154} wheel (1) prepared under optimized conditions is also shown in FIG. 8(*b*).
Figure 8:
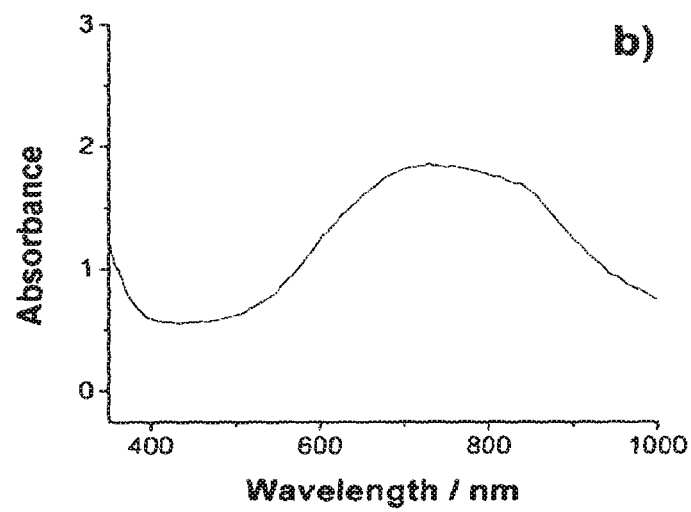

In the case of {Mo154}, the maximum wavelength was set at 750 nm and the minimum at 400 nm. The algorithm found a set of optimal solutions after 18 cycles (FIG. 8a). The UV-Vis spectra showed a broad peak with a maximum at 750 nm. The pH values of the optimized compositions were around pH 2.1±0.1 and the optimal amount of the reducing agent with respect to Mo was found to lie in the range 7.5% to 18%. Under these conditions, {Mo154} compounds should be formed (see (a) Müller et al. *Acc. Chem. Res.* 1999, 33, 2-10;

(b) Müller et al. *Angew. Chem. Int. Ed.* 1995, 34, 2122-2124). FIG. 8 shows an example of a UV-Vis spectrum from cycle 10, which had one of the highest values of J1.

{Mo132}

To synthesize compound {Mo132} under similar conditions, the HCl chemical input was replaced by a buffer solution of acetic acid and ammonium acetate (Table 1, set up B). An absorbance peak corresponding to {Mo132} was expected at a wavelength of 455 nm. Nevertheless, in the initial stages of the reaction a green solution is observed, which turns brown after several hours. Hence, the selected maximum was again 750 nm and the minimum 450 nm. The process managed to produce light green solutions that turned brown over prolonged periods of time (ca. 5 h.). The acidities of the product mixtures obtained were consistently pH 4.3±0.1, which corresponds to the pH expected to form the {Mo132} (Müller et al. *Angew. Chem. Int. Ed.* 1995, 34, 2122-2124). However, the amount of reducing agent with respect to Mo was found to lie in the range 60% to 100%, which is higher than usually reported (Müller et al. *Angew. Chem. Int. Ed.* 1998, 37, 3359-3363.). As a consequence, light brown precipitates were observed, which probably correspond to a mixture of molybdenum species and salts.

DLS Measurements

DLS measurements for the products in set-up A indicated the presence of nanoparticles with a particle size of 3.6 nm, in agreement with the values very recently reported by the inventor and others for the Molybdenum wheel (Miras et al. submitted to *J. Am. Chem. Soc.—Solution Phase Monitoring of the Structural Evolution of a Molybdenum Blue Nanoring*).

Product samples obtained in set-up B showed the presence of nanoparticles with a particle size of 2.8 nm, consistent with the size of {Mo132} (Müller et al. *Coord. Chem. Rev.* 2001, 222, 193-218).

These results prove that the present system is able to synthesis both compounds without any previous knowledge about the composition and pH values at which 10 and 11 are self-assembled, using UV-Vis only. Noteworthy, the experiments with three chemical inputs were useful to find the range of pH in which each compound are formed.

Figure 9:
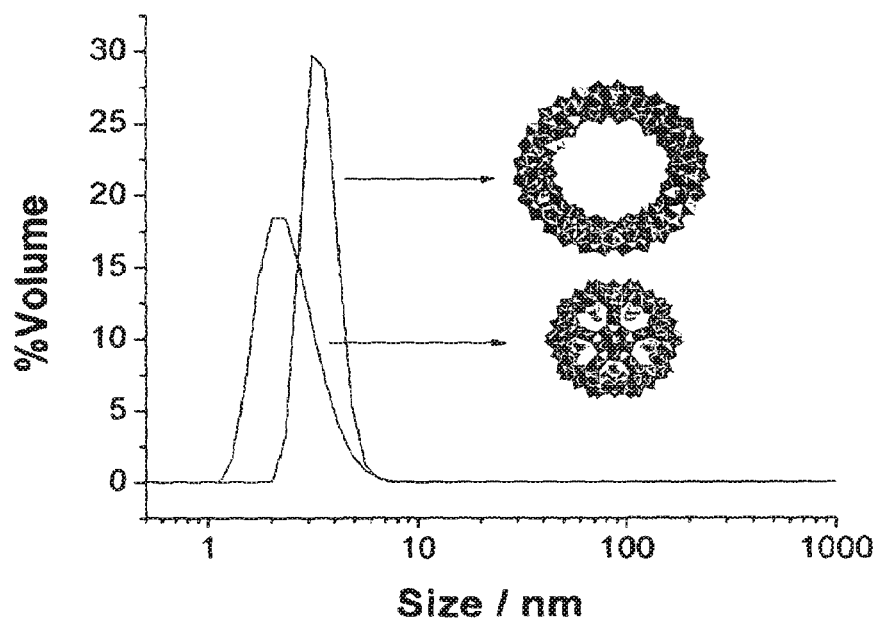
FIG. 9 shows the DLS results for two solutions obtained during the preparation of {Mo154} and {Mo132}. The results show the presence of nanoparticles with a hydrodynamic diameter of 3.6 nm (corresponding to {Mo154}) and 2.8 nm (corresponding to the {Mo132}).

FIG. 9 shows the DLS results for two solutions obtained during the preparation of {Mo154} and {Mo132}. The results show the presence of nanoparticles with a hydrodynamic diameter of 3.6 nm (corresponding to {Mo154}) and 2.8 nm (corresponding to the {Mo132}).

{Mo154} and {Mo132}

After successfully synthesizing both {Mo154} and {Mo132} separately, a more challenging scenario was attempted, where four chemical inputs were provided. Here, four pumps were provided in order to supply the Molybdenum source, the reducing agent, acid and buffer to the reaction space (see Table 1, Set-up C). Higher concentrations of reagents, and the use of hydrazine as reducing agent was expected to favour the crystallization of the desired product. Importantly, under these conditions, it is possible to form both {Mo154} and {Mo132}.

The UV-vis spectra from the initial preparations of compounds 10 and 11 are very similar, and therefore it is not possible to use UV-vis alone to discriminate the products. Hence, a second analytical technique is necessary to build the fitness function. In-situ pH measurement was selected for use in the analytical system, as it has been observed in previous experiments that each compound forms in a well-defined range of pH values.

Multi-objective optimization problems can be solved employing preference based methods (Yu et al. *Introduction to Evolutionary Algorithms* 2010, Springer-Verlag, London). In this way, the results corresponding to the UV-Vis and the pH readings were normalized and added in a single aggregate fitness function [2], using a weight factor X to control the importance of each parameter to the overall J2 value:

$$J_2 = (1-X) \cdot \left( \frac{A_{max} - A_{min}}{A_{range}} \right) + X \cdot \left( 1 - \left| \frac{pH_{exp} - pH_{obj}}{pH_{range}} \right| \right) \quad [2]$$

where X is a weight factor, Amax and Amin correspond to the absorbance at the maximum and minimum wavelengths studied, Arange is the maximum difference expected between the maximum and the minimum absorbance, pHexp is the experimental value of the pH observed, pHobj is the desired pH and pHrange is the expected range of variation. In this way, the algorithm requires the input of the wavelengths where the maximum and minimum absorbances are expected, and the pH at which the different compounds will form. The relative value of each contribution and two range values for the absorbance and pH variation serve to normalize the scales.

If all the parameters are correctly defined, an optimal J should tend to 1. The change in absorbance between the studied wavelengths was not expected to exceed 0.4, as observed in a preliminary experiment. Hence, Arange was set to 0.4. Regarding the range of pH, the initial solution of molybdenum has a pH of 7.3, while the concentration of HCl is 0.1 M. As it was considered unlikely that the algorithm would decide to introduce a large amount of any reagent, pH values were expected to vary by no more than 5. Hence, this was the value employed to normalize the pH results.

TABLE 2

Fitness function parameters employed for the synthesis of compounds 10 and 11

| Entry | Compound | Parameters | | | | Results | | | |
|---|---|---|---|---|---|---|---|---|---|
| | | X | $\lambda_{max}$ | $\lambda_{min}$ | $pH_{obj}$ | cycle[a] | Red. agent/Mo | pH | $J_2$ |
| 1 | 1 | 0.75 | 750 | 400 | 1.7 | 48 | 1.22 | 1.77 | 0.85 |
| 2 | 1 | 0.75 | 750 | 400 | 2 | 55 | 0.25 | 1.30 | 0.87 |
| 3 | 1 | 0.8 | 750 | 990 | 2 | 88 | 0.33 | 2.01 | 0.95 |
| 4 | 2 | 0.75 | 750 | 450 | 4.3 | 23 | 0.45 | 4.34 | 0.98 |

[a]Number of experimental cycles necessary to achieve optimal values of J2.

In previous experiments it has been observed that pH is a determinant factor for the self-assembly of polyoxometalates. As noted above, the U 10 V-Vis spectra of {Mo154} and {Mo132} in the early stages of the self-assembly reaction are very similar. Therefore, a preference-based approach was employed applying a higher weighting to this parameter in all the cases studied.

Initially, the same wavelengths for the UV-Vis analysis were chosen as in previous experiments and the $pH_{obj}$ was set at 1.7 (Table 2, entry 1). Under these conditions, the fitness factor value achieved after 48 cycles was 0.85. Despite the high value of the fitness function, the ratio of hydrazine to molybdenum was found to be excessively high. This can be explained by the observed formation of precipitated Mo species in cycles where the concentration of acid was high, which was compensated by the algorithm by reducing the amount of molybdenum.

A well-known limitation of employing a single aggregated fitness function is the possibility of having contradictory effects. This extent was observed in one experiment (Table 2, entry 2), where a suitable set of results was found with a pH relatively far from the established value. Indeed, the pH stabilized at a value of around pH 1.3 after 55 cycles, due to the optimal values obtained from UV-Vis spectra, which served to maximize the fitness function.

The formation of {Mo154} can occur at a pH starting from 1.4 which is within the error of the measurement (Shishido et al. *J. Am. Chem. Soc.* 2008, 130, 10588-10595). Therefore, even though the values of J2 were lower than expected, the desired product was formed. Another approach to synthesize 10 was attempted setting the minimum wavelength at 990 nm (Table 2, entry 3). The fitness function was maximized at pH values in the range 2.0 to 2.3 and a ratio of reducing agent to Mo of 0.3 to 0.35:1. This is higher than the theoretically expected value where the number of molybdenum centres to be reduced is considered.

Figure 10:
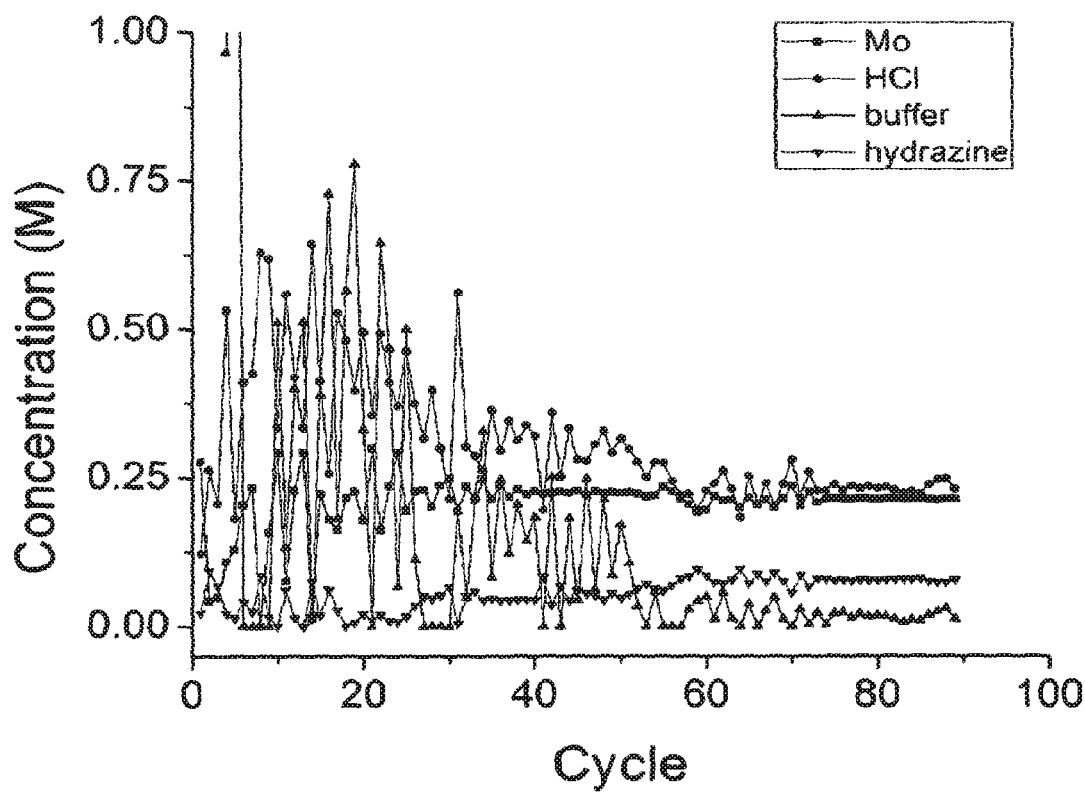
FIG. 10 shows the concentration profiles across 90 different reaction mixtures for four chemical inputs used in the preparation of the {Mo154} wheel.

As shown in FIG. 10, a large variation in the concentration profile of the four parameters scanned was observed during the early stages of the optimization. Afterwards, the system was able to find a suitable composition after ca. 50 cycles and then very little variation was necessary for a fine refinement of the chemical and physical inputs.

The robustness of the optimization algorithm was tested during this test by removing the acid solution at cycle 35 for five cycles). This produced an increase in the experimental pH and consequently a sharp drop in the fitness of the system. Nevertheless, after reconnecting the acid solution, the fitness values recovered within 3 cycles.

The synthesis of compound 11 was achieved by simply setting the minimum wavelength at 450 nm and the pH objective at 4.3. In only 23 cycles, the values of J2 observed were above 0.98. This synthesis was easier compared to 10 due to the high concentration of buffer employed, which facilitated the conversion of the pH to the range necessary to form the {Mo132} cluster. Again, the molar ratio of hydrazine to Mo was around 0.45:1, which is higher than the conditions reported in the literature. This is due to the fact that the formulation is usually optimised for the crystallization of the product. Nevertheless, it has been shown at a higher amount of reducing agent favours the precipitation of a larger amount of product than would be obtained by crystallization, leading to higher yields of isolated material.

The system provided here is designed to maximise the amount of product in solution in the early stages of the reaction. Therefore, it is logical that a high amount of reducing agent should favour the formation of both products, since it favours the reduction of molybdenum centres. Nevertheless, it is interesting to note that the excess of reducing agent could lead to an over-reduction of molybdenum. The formation of both compounds indicates that the self-assembly is fast and efficient.

The combination of the J2 values obtained in the synthesis of both compounds under set-up C shows a chemical fitness landscape with two well-defined areas where each product has been synthesized. {Mo154} may be formed under a wider range of pH values and reagent compositions. This is consistent with the different structural variations reported for these compounds (Shishido et al. *J. Am. Chem. Soc.* 2008, 130, 10588-10595). {Mo132} is formed in a narrower window of conditions. The complexity of the self-assembly processes is reflected by the presence of multiple optimum points, as opposed to other types of chemical systems, where optimization is a relatively simple task due to the absence of multiple solutions (Moore et al. *Chemical Science* 2011, 2, 417-424). Even though both compounds are formed under distinctively different conditions, the employment of a multi-objective optimization approach is fundamental to efficiently synthesize the desired compound. Hence, provided the fitness function [2] is programmed with the correct parameters, the algorithm is able to find suitable solutions in any case studied.

Figure 11:
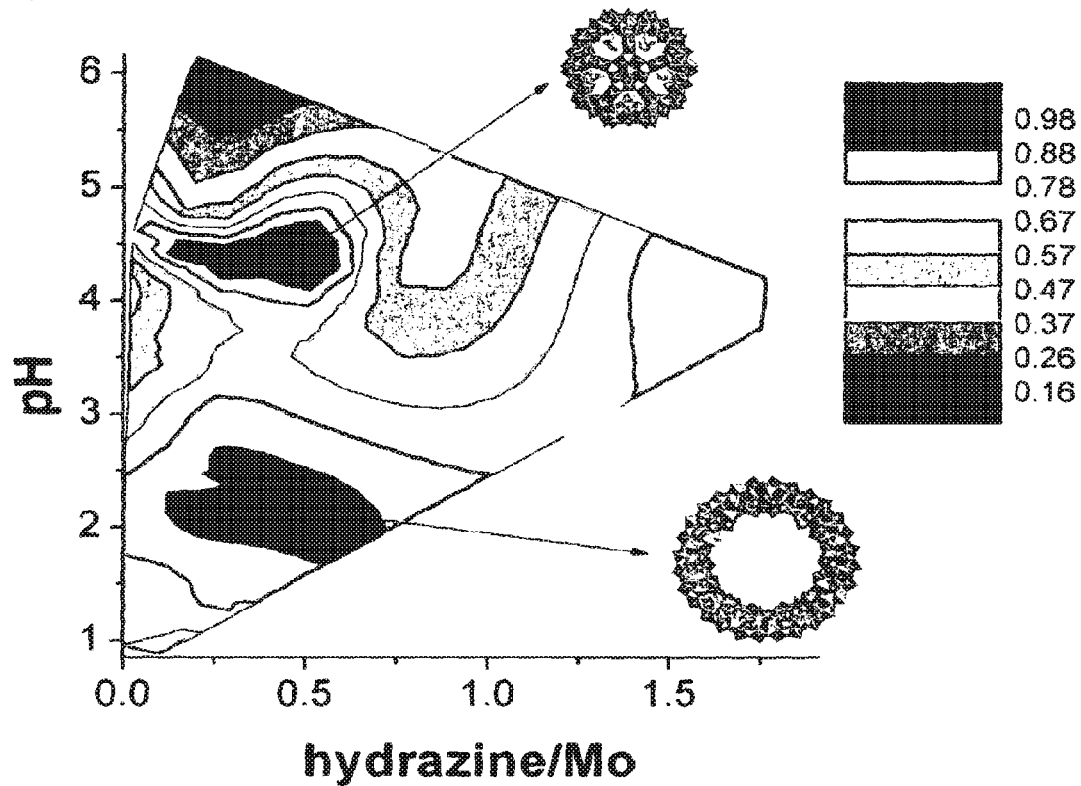
FIG. 11 shows the combined fitness landscape obtained for the synthesis of {Mo154} and {Mo132} as a function of the pH and the ratio of reducing agent (hydrazine) to Mo source. The results indicate the space regions where the J functions were maximized.

FIG. 11 shows the combined fitness landscape obtained for the synthesis of {Mo154} and {Mo132} as a function of the pH and the ratio of reducing agent (hydrazine) to Mo source. The results indicate the space regions where the J functions were maximized.

Crystallisation

Figure 12:
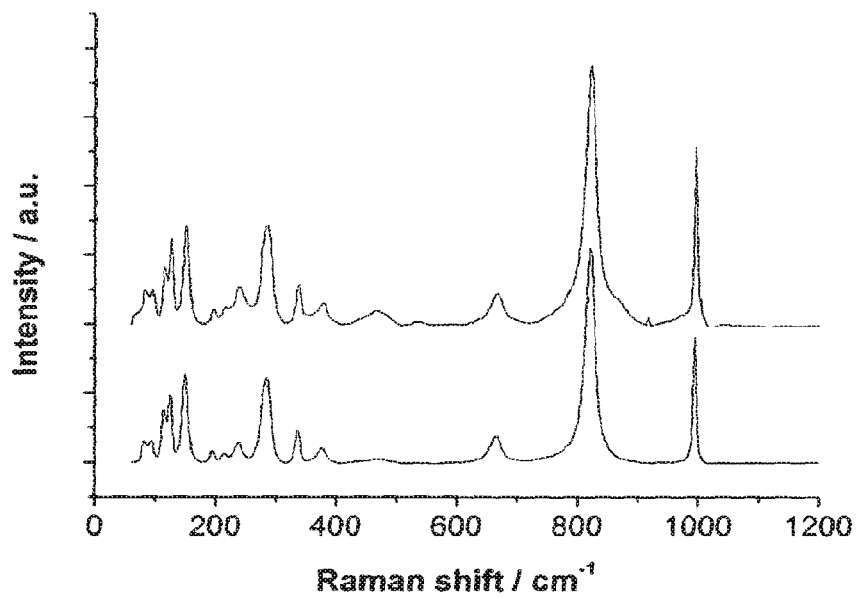
FIG. 12 shows two Raman spectra for the {Mo154} wheel. The upper spectral line corresponds to the experimental compound synthesised in this work. The lower spectral line corresponds to a crystalline sample of {Mo154} which was used as a reference.

The collected samples were left for more than a month to crystallize. In the case of compound 10, there was a considerable amount of precipitate, but optical microscopy did not reveal the presence of crystals big enough to be characterized by single crystal X-ray diffraction. Nevertheless, characterisation by Raman spectroscopy of the powder confirmed the presence of {Mo154} (FIG. 12). A crystalline sample of {Mo154} was used as a reference and no significant differences were observed. Since the conditions of the experiment are not optimised for crystallization, it is not surprising that suitable crystals for XRD could not be identified. In the case of {Mo132}, the Raman spectra obtained from the precipitated powder were consistent with the data recently reported by Mueller et al.

Raman analysis was performed with a microscopic crystal detected by means of an optical microscope (Olympus 100×) from the solution. These results confirm the formation of compounds 10 and 11 under the experimental conditions employed.

Conclusions

Described above is a process which uses an autonomous set-up to synthesize complex self-assembled polyoxometalates in an evolutionary fashion, by employing the Nelder-Mead optimization algorithm. The efficiency of the set-up has been demonstrated by synthesizing separately {Mo154} and {Mo132} using three chemical inputs to supply a reaction space. Control of the flow rate and volume provided further, physical inputs to the reaction mixture.

UV-Vis spectroscopy is shown to provide efficient monitoring of the process and the spectra were employed to calculate the fitness function, and thereby control the preparation of further products. The formation of both {Mo154} and {Mo132} was confirmed by DLS. These experiments provide additional information about the pH range in which each compound is formed.

In a more challenging scenario, it has proven possible to synthesize and discriminate between the big {Mo132} keplerate and the {Mo154} wheel under reaction conditions which could potentially form both. The employment of a multi-objective optimization approach based on a simultaneous optimization of the UV-Vis spectra and the pH of the solution has been very effective to form the materials. Raman spectroscopy confirmed the presence of both clusters.

Evolved-Chemical-Entity

The processes of the invention are also suitable for use in the evolution of methods for the preparation of organic compounds, particularly in sequential organic reactions.

The organic chemistry may be guided using a fitness function which can be either property or target based (or a combination thereof). The fitness function, using a random seed, mutations, and sensor-based input is to guide the synthetic path on a pathway through a combinatorial array of reactions without requiring that the whole array is synthesised and tested. This combines a series of reactions in sequence in a flow system.

An example system may use a core skeleton with 'n' orthogonal functional groups and 'm' different reagents per functional group. The system may also allow 'o' different residence times within the flow reactor and 'p' 'other conditions' e.g. temperature, concentration. In one situation, there may be three different residence times, o, which could lead to three different outcomes (for each combination of m, n and p). Where the core has 3 functional groups, and each group may react with one of 9 reagents, at 3 different residence times and at 3 different temperatures, there is the potential for 243 different products. Where there are further options, the number of possible products increases significantly.

It is important to note that reactions that do not go to completion (for example in the residence times permitted in the initial set up) still provide useful information in the evolutionary exploration of the possible reaction space, as such results, in combination with the highly reactive systems, will provide a high level of variation. Reactions that have not gone to complete may be 'reactivated' later if the inputs into that reaction become associated with a desirable product outcome.

Indeed, the use of highly variable reactions will be a good way to establish an evolutionary dynamic and many libraries/arrays are available from the combinatorial chemistry literature.

It is important to note that, in the Evolved-Chemical-Entity (ECE) process, only one pathway through all the options would be taken at a time and each option recorded. The product from each pathway would be measured and compared to the desired outcome (target assay or molecule) and assigned a fitness values against the user specification. The feedback of the information from the pathway, together with the fitness, and with the possibility of random mutation would allow evolution to occur.

In a proof of concept process, the product of a two stage reaction was investigated. The first steps was a Diels-Alder reaction followed by amination as the second step. The general reaction scheme is shown below:

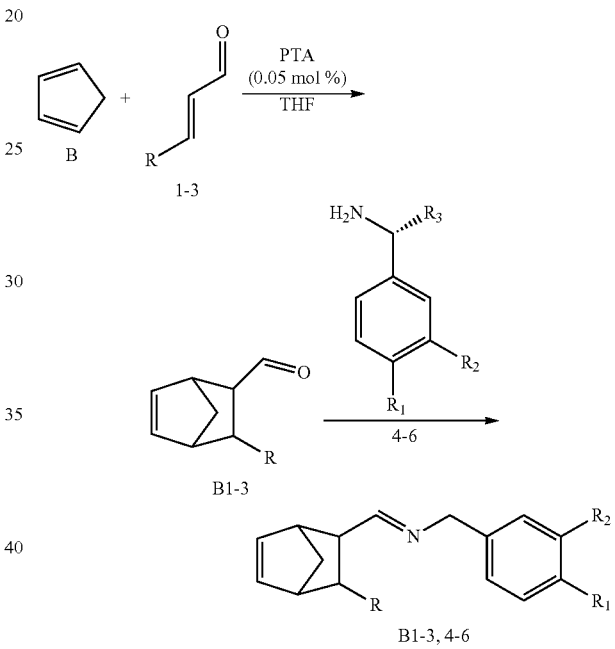

For the validation of the evolutionary steps the initial experiments looked at fitness functions defined by the changes in IR absorptions of the products as compared with the reagents. IR spectroscopy allows for quick analysis of both products and reagents in a flow system, and allows the system to feedback from product to reagents in a very fast way. IR spectroscopy is well known to be useful in allowing a chemist to determine the presence and absence of certain key covalent bonds (e.g. carbonyl bonds).

The reaction system provided the core cyclopentadiene (B) for reaction in a flow system with an aldehyde compound (1-3). The resulting cycloadduct (B1-3) was reacted with by an amine (4-6) to provide nine possible imine products (B1-3,4-6). As part of further work, that imine may be reduced and the resulting amine reacting to provide a tertiary amine product. The initial experiments looked at the first two reaction steps.

In this example, two generations of compound were generated automatically in a flow system using eight syringe-pumps in an automated way. One syringe pump supplied cyclopentadiene, three pumps supplied each aldehyde compound, three pumps supplied each amine, and the final pump was included for a washing cycle. A supply of PTA (0.05 mol %) was also provided to catalyse the Diels-Alder reaction.

The cyclopentadiene and one of the aldehyde compounds was supplied to a first reactor (R1). The product material was taken to a second reactor (R2) which was supplied with one of the amine compounds.

The experiments were conducted using 3 M solutions of reagents in dry THF. The products B1-3 and B1-3,4-6 are shown below:

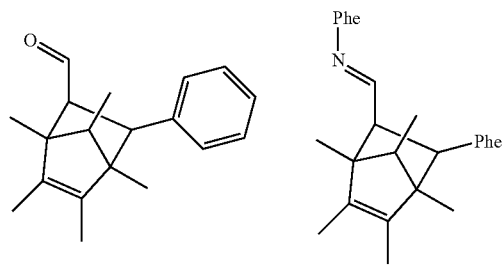

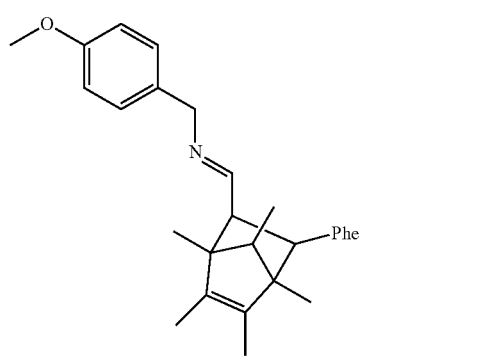

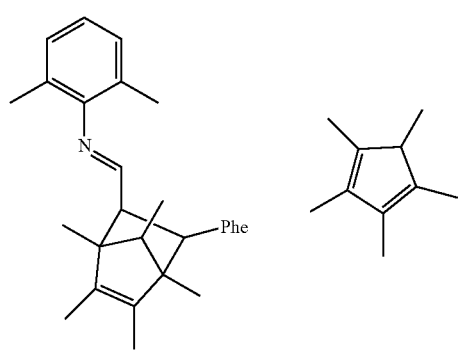

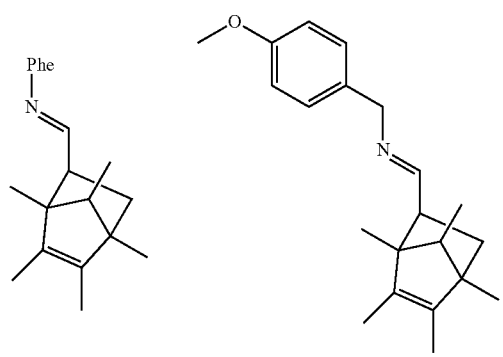

-continued

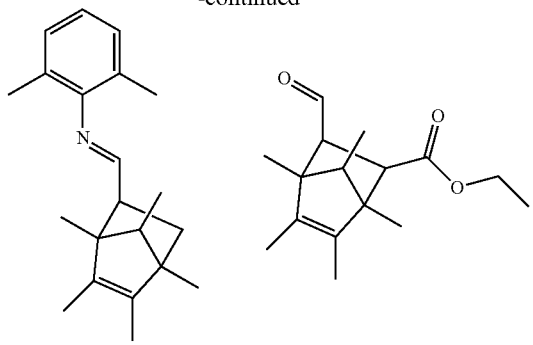

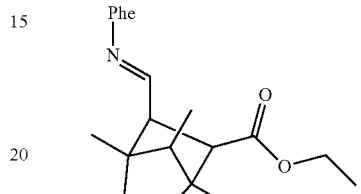

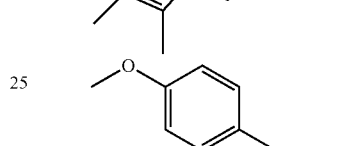

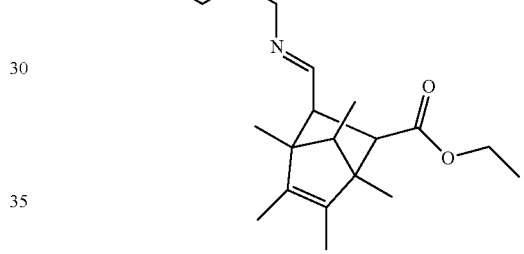

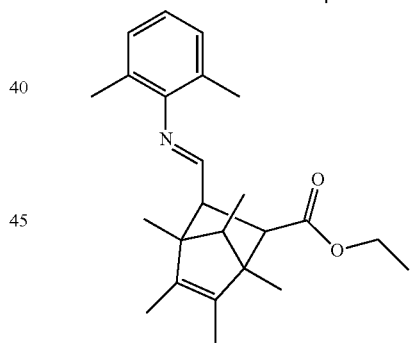

In R1 the core molecule B was combined with an equimolar volume of dienophile 1-3 and catalyst. In R2 the mixture from reactor R1 was added resulting in a 1.5 M solution in dry THF, in which one of the 3 M solutions in THF was flowed at half of the flow rate of the cycloadducts B1-3 to keep the aldehyde:amine ratio as 1:1 (mmol:mmol) of amines 4-6.

The reaction mixture obtained after each complete reaction and containing the compounds B1-3,4-6, was analysed in-line with an ATR-IR flow cell, programmed to acquire the spectra in an automated manner. After each synthesis cycle was completed, the system was cleaned with pump number eight (solvent only) to clean the flow ATR-IR cell before starting to collect a new spectrum. The IR spectra relative to the first generation were acquired in a separated experiment where R1 was directly connected to the ATR-IR flow cell to keep the same residence time than in the two step reactions. In the table below the flow conditions relative to the automated synthesis of the two generations used to carry out these experiments are reported.

TABLE 3

Flow conditions and temperatures used R1 and R2.

| | | 1st generation | | 2nd generation | |
|---|---|---|---|---|---|
| Entry | Temperature (° C.) | $t_{R1}$ (min) | Total flow rate (mL min$^{-1}$) | $t_{R2}$ (min) | Total flow rate (mL min$^{-1}$) |
| 1 | 20 | 12.50 | 0.04 | 3.30 | 0.06 |
| 2 | 20 | 5.00 | 0.10 | 1.30 | 0.15 |
| 3 | 20 | 3.12 | 0.16 | 0.83 | 0.24 |

TABLE 3-continued

Flow conditions and temperatures used R1 and R2.

| | | 1st generation | | 2nd generation | |
|---|---|---|---|---|---|
| Entry | Temperature (° C.) | $t_{R1}$ (min) | Total flow rate (mL min$^{-1}$) | $t_{R2}$ (min) | Total flow rate (mL min$^{-1}$) |
| 4 | 50 | 12.50 | 0.04 | 3.30 | 0.06 |
| 5 | 50 | 8.30 | 0.06 | 2.20 | 0.09 |
| 6 | 50 | 5.00 | 0.10 | 1.30 | 0.15 |
| 7 | 50 | 3.12 | 0.16 | 0.83 | 0.24 |

Where $t_{R1}$ is the residence time in R1 and $t_{R2}$ is the residence time in R2.

As expected the experiments conducted at higher temperature or residence time, are the one which give higher conversion rates. For example in the two experiments conducted at the lowest $t_R$ (Table 3, entry 3 and 7) the conversion of compound B (where the aldehyde moiety peak is at 1699 cm$^{-1}$) to B1 (where the aldehyde moiety peak is at 1715 cm$^{-1}$) is lower when performed at 20° C. than at 50° C.

The experiments were conducted in a random way to be close to the conditions of the planned flow setup, which will navigate the network of the possible pathways according to the reaction outcome, and will find the one with a good outcome thanks to an intelligent algorithm. To achieve that, the ATR-IR data collected from each experiment were differently processed in a semi-automated way in order to find a universal mathematical parameter to correlate to the outcome of a generic reaction. The initial new flow setup was programmed to compare the acquired IR spectrum with a simulated one and it should be automatically stopped to mix reactants once a spectrum with a (80%) similarity to the selected one is found.

To deduce whether a reaction had occurred, the experimental spectra was compared with the sum of the spectra from the starting materials point by point, allowing a calculation of the minimum square error (MSE), which is indicative of how different is one spectrum to the other. For the first generation the value of MSE for each of the experiment is higher than $10^{-3}$ when the conversion of the core molecule in the cycloadduct is higher than 30%; the results for compound B1, B2 and B3 are summarised in the table below.

TABLE 4

MSE and conversion related to each experiment of the first generation.

| | | | | 1st generation | | | | |
|---|---|---|---|---|---|---|---|---|
| | | | | | B1 | | B2 | | B3 | |
| | T (° C.) | $t_{R1}$ (min) | Total flow rate (mL min$^{-1}$) | MSE | Con. (%) | MSE | Con. (%) | MSE | Con. (%) |
| 1 | 20 | 12.50 | 0.04 | 1.55E−03 | 70 | 4.30E−04 | 5 | 8.32E−04 | 7 |
| 2 | 20 | 4.37 | 0.1 | 2.69E−04 | 20 | 5.08E−04 | 0 | 9.96E−04 | 2 |
| 3 | 20 | 3.12 | 0.16 | 2.31E−04 | 30 | 4.09E−04 | 2 | 7.94E−04 | 2 |
| 4 | 50 | 12.50 | 0.04 | 2.19E−03 | 83 | 3.72E−04 | 7 | 8.95E−04 | 11 |
| 5 | 50 | 8.30 | 0.06 | 9.55E−04 | 24 | 4.27E−04 | 0 | 9.90E−04 | 10 |
| 6 | 50 | 4.37 | 0.1 | 1.79E−03 | 68 | 4.46E−04 | 0 | 9.91E−04 | 11 |
| 7 | 50 | 3.12 | 0.16 | 1.50E−03 | 67 | 5.11E−04 | 4 | 8.71E−04 | 7 | where Con. is the percentage conversion to B1, B2 and B3.

In this way it is possible to use the MSE as a fitness function observable to look for new reactions and products. Also, given that the differences between IR spectra are a great indication of molecular diversity (new bonds give new vibrational bends, stretches and other modes), this implementation allows the evolution of new molecular diversity from a limited reagent pool.

REFERENCES

The following references are incorporated by reference herein:

Abou-Hassan et al. *Angew. Chem. Int. Ed.* 2010, 49, 6268-6286
Bogani et al. *Nat. Mater.* 2008, 7, 179-186
Boldini et al. *Advanced Synthesis & Catalysis* 2010, 352, 2365-2370
Coello Coello et al. *Evolutionary Algorithms for Solving Multi-Objective Problems* 2007, Springer Science+Business Media, LLC, Ed. Goldberg
Corma et al. *Chem. Phys. Com.* 2002, 3, 939-945
Corma et al. *Journal of Catalysis* 2005, 229, 513-524
Evangelisti et al. *Dalton Trans.* 2010, 39, 4672-4676
Evangelisti et al. *J. Mater. Chem.* 2006, 16, 2534-2549
Hasenknopf *Front. Biosci.* 2005, 10, 275-287
Henry et al. *J. Mol. Liq.* 2005, 118, 155-162
Inglis et al. *Chem. Commun.* 2008, 45, 5924-5926
Inglis et al. *Chem. Commun.* 2012, 48, 181-190
Inglis et al. *Dalton Trans.* 2009, 18, 3403-3412
Inglis et al. *Dalton Trans.* 2009, 42, 9157-9168
Karotsis et al. *J. Am. Chem. Soc.* 2010, 132, 12983-12990
Kozoni et al. *Dalton Trans.* 2009, 42, 9117-9119

Krebs et al. *Eur. J. Solid State Inorg. Chem.* 1991, 28, 883-903
Kreutz et al. *J. Am. Chem. Soc.* 2010, 132, 3128-3132
Lange et al. *Chemical Science* 2011, 2, 765-769
Lehár et al. (*Nature Chem. Biol.* 2008, 4, 674-681
Lehmann et al. *Nat. Nano* 2007, 2, 312-317
Leuenberger et al. *Nature* 2001, 410, 789-793
Long et al. *Chem. Soc. Rev.* 2007, 36, 105-121
Long et al. *Chem. Soc. Reviews* 2007, 36, 105-121
Long, et al. *Angew. Chem. Int. Ed.* 2010, 49, 1736-1758
Ludlow et al. *Chemical Society Reviews* 2008, 37, 101-108
Maier et al. *Angew. Chem. Int. Ed.* 2007, 46, 6016-6067
McMullen et al. *Angew. Chem. Int. Ed.* 2010, 122, 7230-7234
McMullen et al. *Angew. Chem. Int. Ed.* 2010, 49, 7076-7080
Miras et al. *Science* 2010, 327, 72-74
Miras et al. submitted to *J. Am. Chem. Soc.—Solution Phase Monitoring of the Structural Evolution of a Molybdenum Blue Nano-ring*
Moore et al. *Chemical Science* 2011, 2, 417-424
Moushi et al. *J. Am. Chem. Soc.* 2010, 132, 16146-16155
Müller et al. *Acc. Chem. Res.* 1999, 33, 2-10
Müller et al. *Angew. Chem. Int. Ed.* 1995, 34, 2122-2124
Müller et al. *Angew. Chem. Int. Ed.* 1996, 35, 1206-1208
Müller et al. *Angew. Chem. Int. Ed.* 1998, 37, 3359-3363
Müller et al. *Angew. Chem. Int. Ed.* 2000, 39, 1614-1616
Müller et al. *Angew. Chem. Int. Ed.* 2002, 41, 1162-1167
Müller et al. *Angew. Chem. Int. Ed.* 2003, 42, 2085-2090
Müller et al. *Coord. Chem. Rev.* 2001, 222, 193-218
Müller et al. *Z. Anorg. Allg. Chem.* 1999, 625, 1187-1192
Murrie *Chem. Soc. Rev.* 2010, 39, 1986-1995
Nelder J et al. *Comput. J.* 1965, 7, 308-313
Parrott et al. *Angew. Chem. Int. Ed.* 2011, 50, 3788-3792
Pham *Comp. Chem. Eng.* 2012, 37, 136-142
Rasheed et al. *Angew. Chem. Int. Ed.* 2011, 50, 357-358
Rodriguez-Albelo et al. *J. Am. Chem. Soc.* 2009, 131, 16078-16087
Sans et al. *Analyst* 2011, 136, 3295-3302
Seeberger *Nature Chemistry* 2009, 1, 258-260
Shishido et al. *J. Am. Chem. Soc.* 2008, 130, 10588-10595
Toma et al. *Nat. Chem.* 2010, 2, 826-831
Urakawa et al. *Analyst* 2008, 133, 1352-1354
Wang et al. *Chem. Soc. Rev.* 2011, 40, 3213-3238
Wegner et al. *Chem. Commun.* 2011, 47, 4583-4592
Yu et al. *Introduction to Evolutionary Algorithms* 2010, Springer-Verlag, London
Zheng et al. *J. Am. Chem. Soc.* 2012, 134, 1057-1065
Zhu et al. *Appl. Phys. Express* 2012, 5, 012102

The invention claimed is:

1. A process for generating a method for producing a product, the method having one or more parameters that meet or exceed a user specification, the process comprising the steps of:
   (i) providing:
      (A) a user specification, which is one or more characteristics that is desirable for the method to have;
      (B) a flow chemistry system, wherein the system comprises a series of chemical inputs in fluid communication with a reaction space, and the system optionally comprises one or more physical inputs, wherein the physical inputs are deliverable to one or more of the chemical inputs and/or are deliverable to the reaction space;
      (C) an analytical system adapted for interaction with the flow chemistry system, wherein the analytical system is for the measurement of one or more characteristics of the method or the product;
      (D) a control system adapted for controlling the delivery of the chemical and physical inputs to the reaction space, and for comparing the one or more characteristics measured by the analytical system against the user specification, wherein the control system is provided with a genetic algorithm for selecting combinations of the chemical and physical inputs;
   (ii) selecting a first combination of chemical and physical inputs and supplying those inputs to the reaction space, thereby to generate a first method producing a product;
   (iii) analysing one or more characteristics of the first method and/or the product generated;
   (iv) comparing the one or more characteristics against the user specification;
   (v) permitting the genetic algorithm to select a second combination of chemical optionally together with physical inputs, wherein the second combination differs from the first combination, and supplying those inputs to the reaction space, thereby to generate a method producing the product;
   (vi) analysing one or more characteristics of the method and/or the product generated;
   (vii) comparing the one or more characteristics generated against the user specification;
   (viii) optionally repeating steps (v) to (vii) for further individual combinations of chemical and/or physical inputs,
   wherein the flow chemistry system operates continuously to provide the first and second and optional further methods and/or products, thereby to identify one or more methods meeting or exceeding the user specification.

2. The process of claim 1, further comprising the step of (ix) repeating a method meeting or exceeding the user specification, thereby producing further quantities of the product.

3. The process of claim 1, wherein the genetic algorithm selects a first combination of chemical inputs.

4. The process of claim 2, wherein the genetic algorithm selects a first combination of chemical inputs.

5. The process of claim 1, wherein chemical and physical inputs are available for selection in a combination.

6. The process of claim 3, wherein chemical and physical inputs are available for selection in a combination.

7. The process of claim 1, wherein the number of chemical inputs is five or more.

8. The process of claim 5, wherein the number of chemical inputs is five or more.

9. The process of claim 5, wherein the physical inputs include reaction time, concentration of chemical input, and ratio of chemical inputs.

10. The process of claim 7, wherein the physical inputs include reaction time, concentration of chemical input, and ratio of chemical inputs.

11. The process of claim 1, wherein the characteristic for measurement is a physical property of the product.

12. The process of claim 2, wherein the characteristic for measurement is a physical property of the product.

13. The process of claim 3, wherein the characteristic for measurement is a physical property of the product.

14. The process of claim 5, wherein the characteristic for measurement is a physical property of the product.

15. The process of claim 11, wherein the physical property is selected from the group consisting of:
   optical property,
   mass property,
   electrochemical property, and
   rheological property.

16. The process of claim 11, wherein the physical property is an optical property.

17. The process of claim 1, wherein the product is selected from the groups consisting of polyoxometallate, coordination cluster, nanoparticles, single molecule magnet, quantum dot, dye, an electronic material, a pharmaceutical composition, a personal healthcare product, and a biologically active agent, optionally further including a polymer or organic molecule.

18. The process of claim 2, wherein the product is selected from the groups consisting of polyoxometallate, coordination cluster, nanoparticles, single molecule magnet, quantum dot, dye, an electronic material, a pharmaceutical composition, a personal healthcare product, and a biologically active agent, optionally further including a polymer or organic molecule.

19. The process of claim 5, wherein the product is selected from the groups consisting of polyoxometallate, coordination cluster, nanoparticles, single molecule magnet, quantum dot, dye, an electronic material, a pharmaceutical composition, a personal healthcare product, and a biologically active agent, optionally further including a polymer or organic molecule.

20. The process of claim 17, wherein the product is a polyoxometallate.

* * * * *